US008045254B2

(12) United States Patent
Ichikawa et al.

(10) Patent No.: US 8,045,254 B2
(45) Date of Patent: Oct. 25, 2011

(54) STRUCTURE BODY ELECTRICALLY CONNECTED VIA SEMICONDUCTOR MATERIAL LAYER

(75) Inventors: Hirotoshi Ichikawa, Tokyo (JP); Yoshihiro Maeda, Tokyo (JP); Fusao Ishii, Pittsburgh, PA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 0 days.

(21) Appl. No.: 12/590,754

(22) Filed: Nov. 13, 2009

(65) Prior Publication Data
US 2010/0067096 A1    Mar. 18, 2010

Related U.S. Application Data

(63) Continuation-in-part of application No. 12/378,658, filed on Feb. 18, 2009, now Pat. No. 7,760,415, which is a continuation-in-part of application No. 11/894,248, filed on Aug. 18, 2007, now Pat. No. 7,835,062, and a continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(51) Int. Cl.
*G02B 26/00* (2006.01)
*G02B 26/08* (2006.01)
(52) U.S. Cl. ..................................... 359/290; 359/224.1
(58) Field of Classification Search .............. 359/212.1, 359/223.1, 224.1, 224.2, 290, 295
See application file for complete search history.

(56) References Cited

U.S. PATENT DOCUMENTS

| 6,744,550 | B2 | 6/2004 | Neukermans et al. | |
|---|---|---|---|---|
| 7,022,249 | B2 * | 4/2006 | Valette | ............................ 216/24 |
| 7,274,104 | B2 | 9/2007 | Takewaki | |
| 7,436,573 | B2 | 10/2008 | Doan et al. | |

\* cited by examiner

*Primary Examiner* — William Choi
(74) *Attorney, Agent, or Firm* — Bo-In Lin

(57) ABSTRACT

The present invention discloses an image display system implemented with a spatial light modulator (SLM) having a plurality of pixel elements wherein each of the pixel elements further comprises an electrode having a structural body comprising: a first electrically conductive layer; a second electrically conductive layer; and a semiconductor layer disposed adjacently to the first electric conductive layer and second electric conductive layer and the semiconductor layer further comprises a doped conductive area for electrically connecting the first electric conductive layer and second electric conductive layer.

22 Claims, 38 Drawing Sheets

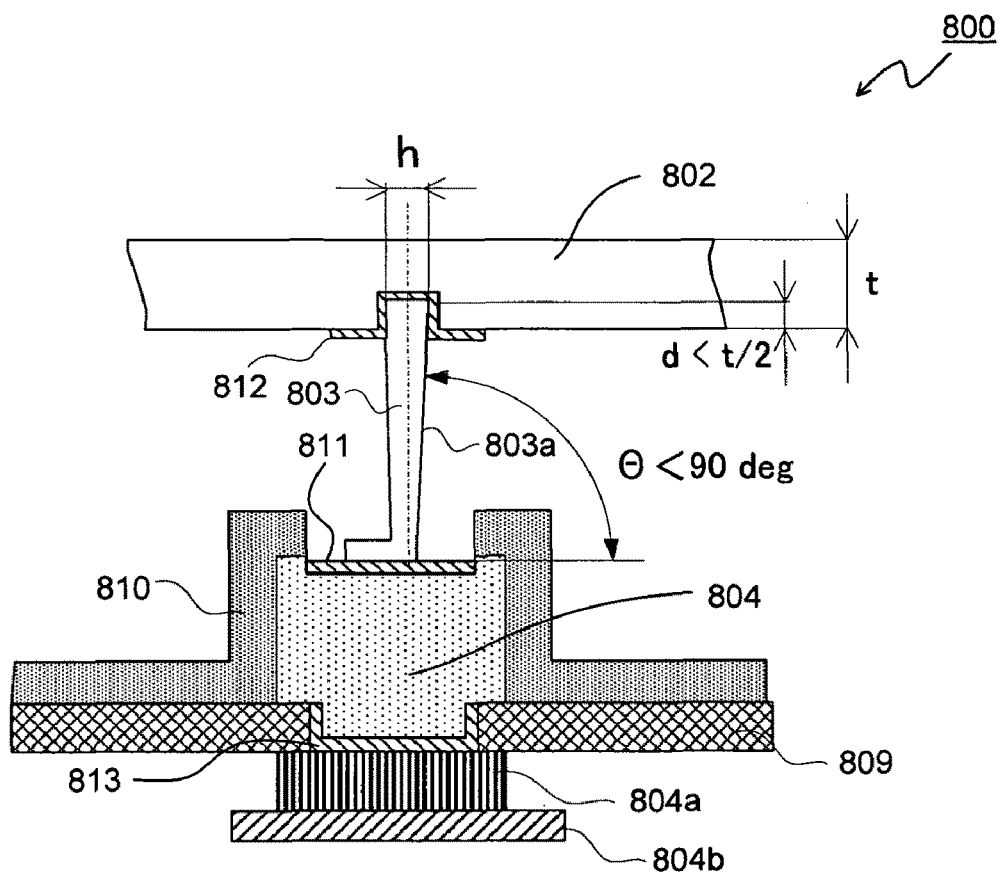
FIG. 10A
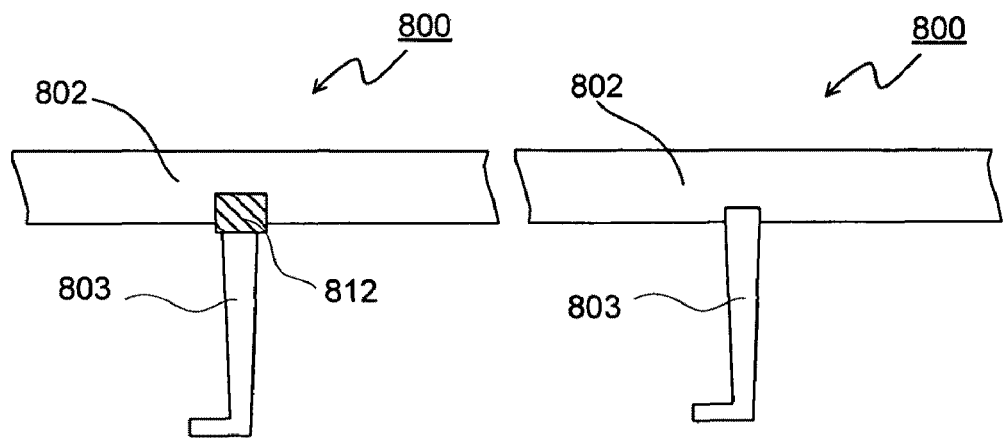
FIG. 10B     FIG. 10C

STRUCTURE BODY ELECTRICALLY CONNECTED VIA SEMICONDUCTOR MATERIAL LAYER

CROSS REFERENCE TO RELATED APPLICATIONS

This application is a Continuation in Part (CIP) Application of a patent application Ser. No. 12/378,658 filed on Feb. 18, 2009 now U.S. Pat. No. 7,760,415 and application Ser. No. 12/378,658 is a Continuation in Part Application of another patent application Ser. No. 11/894,248 filed on Aug. 18, 2007 now U.S. Pat. No. 7,835,062 by one of common Inventors of this Patent Application. The Non-provisional application Ser. No. 11/894,248 is a Continuation in Part (CIP) Application of U.S. patent application Ser. No. 11/121, 543 filed on May 4, 2005, now issued into U.S. Pat. No. 7,268,932. The application Ser. No. 11/121,543 is a Continuation in part (CIP) Application of three previously filed Applications. These three Applications are Ser. Nos. 10/698,620 now abandoned; 10/699,140, now issued into U.S. Pat. No. 6,862,127; and Ser. No. 10/699,143, now issued into U.S. Pat. No. 6,903,860. All three patents were filed on Nov. 1, 2003 by one of the Applicants of this Patent Application. The disclosures made in these Patent Applications are hereby incorporated by reference in this Patent Application.

BACKGROUND OF THE INVENTION

1. Field of the Invention

The present invention relates to an image display system implemented with a mirror device manufactured as a MEMS device to function as a spatial light modulator (SLM). More particularly this invention relates to a technique used to manufacture a mirror element includes a structural body having no border surface straddling a semiconductor material layer.

2. Description of the Related Art

Even though in recent years, there have been significant advances made in the technologies for implementing an electromechanical mirror device as a spatial light modulator (SLM), there are still limitations and difficulties when state of the art current technologies are applied to provide a high quality image. Specifically, when the images are digitally controlled, the image quality is adversely affected due to the limitation that the images are not displayed with sufficient number of gray scales.

An electromechanical mirror device is drawing a considerable interest and commonly employed as a spatial light modulator (SLM) in the image project apparatuses. The electromechanical mirror device is typically implemented with a "mirror array" comprising a large number of mirror elements. In general, the number of mirror elements may range from 60,000 to several millions of micromirror pieces are manufactured as two-dimensional array on a surface of a substrate in an electromechanical mirror device.

Referring to FIG. 1A for an image display system 1 disclosed in U.S. Pat. No. 5,214,420 that comprises a screen 2. The display system 1 further includes a light source 10 to project an illumination light for displaying images on the screen 2. The illumination light 9 from the light source is further focused and directed toward a lens 12 by a mirror 11. Lenses 12, 13 and 14 function together as a beam culminator to culminate light 9 into a culminated light 8. A spatial light modulator (SLM) 15 is controlled on the basis of data input by a computer 19 via a bus 18 to selectively redirect portions of light from a path 7 toward an enlarger lens 5 and onto screen 2. The SLM 15 is implemented with a mirror array comprising large number of mirror 33 each includes a deflectable reflective element shown as elements 17, 27, 37, and 47 depicted in FIG. 1B. Each mirror 33 is connected by a hinge 30 on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 to display an illuminated pixel 3. When the element 17 is in another position, the light is redirected away from screen 2 and hence the pixel 3 is displayed as a dark pixel on the display screen 2.

The mirror device comprises a plurality of mirror elements to function as spatial light modulator (SLM) wherein each mirror element comprises a mirror and electrodes. A voltage applied to the electrode(s) generates a coulomb force between the mirror and the electrode(s) to control the mirror to tilt to an inclined angle. According to a common term used in this specification, the mirror is "deflected" to an angular position for describing the operational condition of a mirror element.

When a voltage applied to the electrode(s) controls the mirror to deflect to a controlled angular position, the deflected mirror also reflects an incident light to a controlled direction. The direction of the reflected light is therefore controlled in accordance with the deflection angle of the mirror and that in turn is controlled by a voltage applied to the electrode. The present specification refers to a state of the mirror as an ON state when the mirror reflects substantially the entirety of an incident light a projection path designated for image display and as an OFF state when the mirror reflects the incident light to a direction away from the designated projection path for image display.

Specifically, FIG. 1C exemplifies a control circuit for controlling a mirror element according to the disclosure in the U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based on a typical Static Random Access switch Memory (SRAM) design. The transistor M9 connected to a Row-line receives a data signal via a Bit-line. The memory cell 32 written data is accessed when the transistor M9 which has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

The control circuit, as illustrated in FIG. 1C, controls the mirrors to switch between two states, and the control circuit drives the mirror to oscillate to either the ON or OFF deflected angle (or position), as shown in FIG. 1A.

The minimum intensity of light controllable to reflect from each mirror element for image display, i.e., the resolution of gray scale of image display for a digitally controlled image display apparatus, is determined by the least length of time that the mirror is controllable to be held in the ON position. The length of time that each mirror is controlled to be held in the ON position is in turn controlled by multiple bit words.

As a simple illustration, FIG. 1D shows the "binary time intervals" when controlling micromirrors with a four-bit word. As shown in FIG. 1D, the time durations have relative values of 1, 2, 4, 8, which in turn define the relative brightness for each of the four bits where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has n bit-planes. Then, each bit-plane has a 0 or 1 value for each mirror element.

When adjacent image pixels are displayed with a very coarse gray scale caused by great differences in the intensity of light, thus, artifacts are shown between these adjacent image pixels. That leads to the degradations of image quality. The image degradations are especially pronounced in the bright areas of image where there are "bigger gaps" between of the gray scales of adjacent image pixels. The artifacts are generated by technical limitations in that the digitally controlled image does not provide a sufficient number of the gray scale.

As the mirrors are controlled to operate in a state of either ON or OFF, the intensity of light of a displayed image is determined by the length of time each mirror is in the ON position. In order to increase the number of gray scales of a display, the switching speed of the ON and OFF positions for the mirror must be increased. Therefore the digital control signals need be increased to a higher number of bits. However, when the switching speed of the mirror deflection is increased, a stronger hinge for supporting the mirror is necessary to sustain the required number of switches between the ON and OFF positions for the mirror deflection. In order to drive the mirrors with a strengthened hinge, a higher voltage is required. The higher voltage may exceed twenty volts and may even be as high as thirty volts. The mirrors produced by applying the CMOS technologies are probably not appropriate for operating the mirror at such a high range of voltages, and therefore DMOS mirror devices may be required. In order to achieve a higher degree of gray scale control, more complicated production processes and larger device areas are required to produce the DMOS mirror. Conventional mirror controls are therefore faced with a technical problem in that accuracy of gray scales and range of the operable voltage have to be sacrificed for the benefits of a smaller image display apparatus.

Furthermore, a mirror device is commonly produced by applying a process typically applied to the production process of a semiconductor. An etchant such as hydrogen fluoride or a similar etchant is used in the process. In the production process of a mirror device, a desired structure is eventually obtained by using different materials for multiple structural layers by applying different etching process using the aforementioned etchant. An unnecessary region or a sacrifice layer is removed. A protective layer (i.e., an etch-stop layer) is used to protect a part manufactured as a structural layer. Therefore, in the production process of the mirror device is carried out by selecting the material of the structural layer, the material of an inter-layer insulation film for securing the insulation between individual layers the material of a sacrifice layer, and selecting an etchant for carrying out the manufacturing processes. There are however situations the etchant may migrate from an obscure gap between individual layers cause an area originally not design for exposure to the etchant inadvertently invaded by the etchant. The manufacturing processes thus cause an undesirable electrical shorting and a collapsed structural layer.

In the meantime, there are reference materials related to the present invention proposal.

U.S. Pat. No. 6,744,550 has disclosed a layered electrode having a step.

U.S. Pat. No. 6,552,840 has disclosed an electrode having a step or a slope surface.

U.S. Pat. No. 5,673,139 has disclosed a vertical silicon hinge.

U.S. Pat. No. 6,128,121 has disclosed a configuration in which electrodes are respectively placed on both sides of a vertical silicon hinge.

U.S. Pat. No. 7,068,417 has disclosed a configuration in which electrodes are respectively placed on both sides of a vertical silicon hinge.

U.S. Pat. No. 7,022,249 has disclosed a configuration in which a drive electrode and a mirror abut on each other.

U.S. Pat. No. 6,735,008 has disclosed a structure in which electrodes, each of which is constituted by an insulation layer and an electric conductor, are respectively placed on both sides of a vertical hinge.

U.S. Pat. No. 5,447,600 has discloses an electrode, on which a mirror abuts, and a drive electrode.

U.S. Pat. No. 6,914,709 has disclosed the structure of an electrode of a mirror.

U.S. Pat. No. 7,079,301 has disclosed the structure of an electrode of a mirror.

U.S. Pat. No. 6,912,336 has disclosed a metal-deposited electrode.

U.S. Pat. No. 6,962,419 has disclosed an electrode having different heights depending on the deflecting direction of a mirror.

U.S. Pat. No. 7,206,110 has disclosed a configuration using a metallic layer for shielding light.

U.S. Pat. No. 5,818,095 has disclosed a configuration using a metallic layer for shielding light.

However, these disclosures have not yet provided an effective configuration and method to overcome the technical limitations encountered in the conventional image display systems. Therefore, a need still exists in the art of image display systems applying digital control of a mirror array as a spatial light modulator to provide new and improved systems such that the above-discussed difficulties can be resolved.

SUMMARY OF THE INVENTION

In consideration of the situation described above, the present invention aims at providing a technique for protecting an electrode and a circuit from an etchant by using a structural body having no border surface straddling semiconductor material layers in a technique used for a structural body electrically connected by way of a semiconductor material layer.

A first embodiment of the present invention provides an image display system implemented with a spatial light modulator (SLM) having a plurality of pixel elements wherein each of the pixel elements further comprises an electrode having a structural body comprising: a first electrically conductive layer; a second electrically conductive layer; and a semiconductor layer disposed adjacently to the first electric conductive layer and second electric conductive layer and the semiconductor layer further comprises a doped conductive area for electrically connecting the first electric conductive layer and second electric conductive layer.

A second embodiment of the present invention provides An image display system implemented with a mirror device comprising a plurality of micromirrors each supported on a deflectable hinge electrically connected to the micromirror; a hinge electrode for applying a voltage to the hinge and the micromirror electrically connected to the hinge; a drive electrode for applying a second voltage independent of the voltage applied to of the hinge electrode; a drive circuit for controlling the hinge electrode and the drive electrode; and a semiconductor layer comprises a doped conductive area for electrically connecting the hinge and hinge electrode, hinge electrode and drive circuit, or the drive electrode and drive circuit.

A third embodiment of the present invention provides a mirror device, comprising: an image display system implemented with a mirror device comprising a plurality of micromirrors each supported on a deflectable hinge electrically connected to the micromirror; a hinge electrode for applying a voltage to the hinge and the micromirror electrically connected to the hinge; a drive electrode for applying a second voltage independent of the voltage applied to of the hinge electrode; and a drive circuit for controlling the hinge electrode and the drive electrode; wherein an interface between the mirror and hinge, between the hinge and hinge electrode, between hinge electrode and drive circuit, and between drive electrode and drive circuit comprises surface-to-surface interface without a face straddling both sides of the interface.

BRIEF DESCRIPTION OF THE DRAWINGS

The present invention is described in detail below with reference to the following Figures.

FIG. 10A is a diagram for describing, in further detail, of the elastic hinge of a mirror element according to the second embodiment;

FIG. 10B is a diagram showing an exemplary modification of the configuration for connecting the mirror to the elastic hinge of the mirror element according to the second embodiment;

FIG. 10C is a diagram showing another exemplary modification of the configuration for connecting the mirror to the elastic hinge of the mirror element according to the second embodiment;

DESCRIPTION OF THE PREFERRED EMBODIMENTS

The following is a description, in detail, of the preferred embodiments of the present invention with reference to the accompanying drawings. The first is a description of an example of a premising configuration of a mirror device according to the present embodiment followed by a description of each preferred embodiment.

Figure 1A:
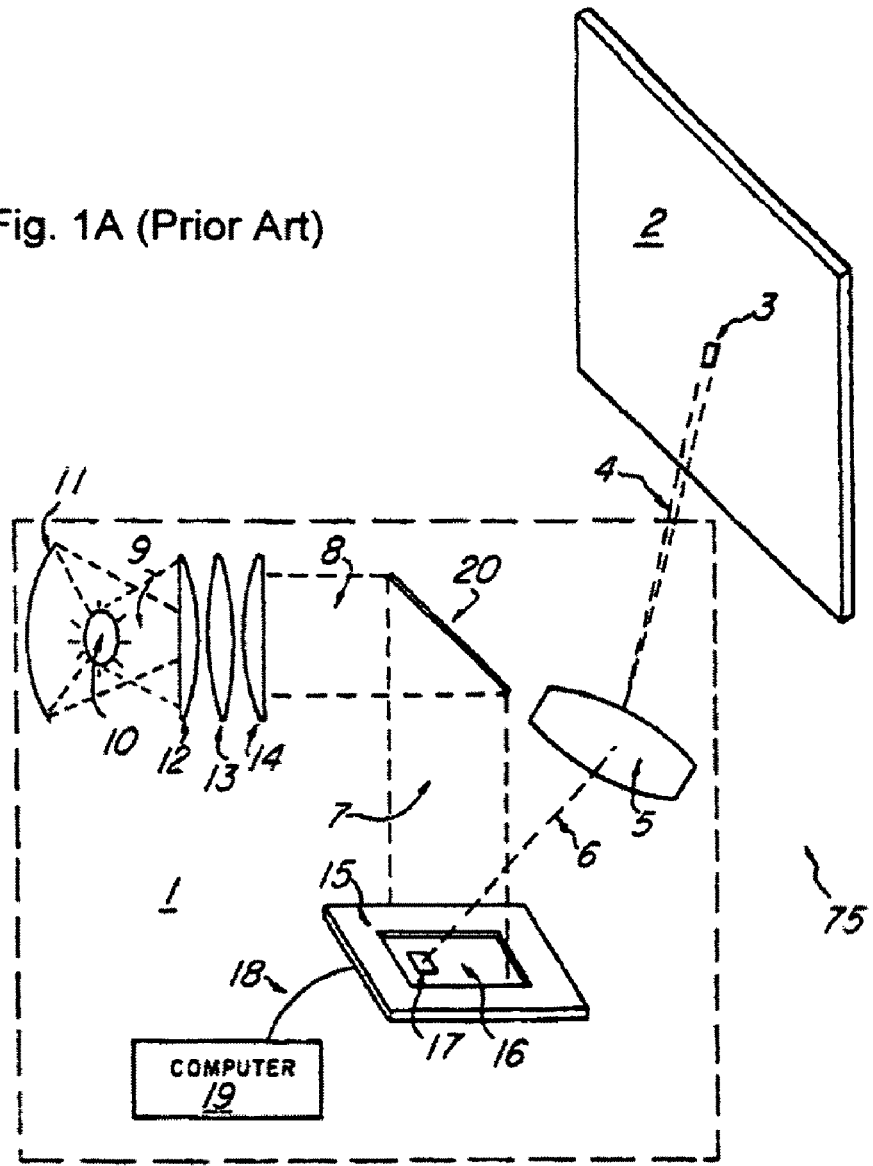
FIG. 1A is a conceptual diagram showing the configuration of a projection apparatus according to a conventional technique.
Figure 1B:
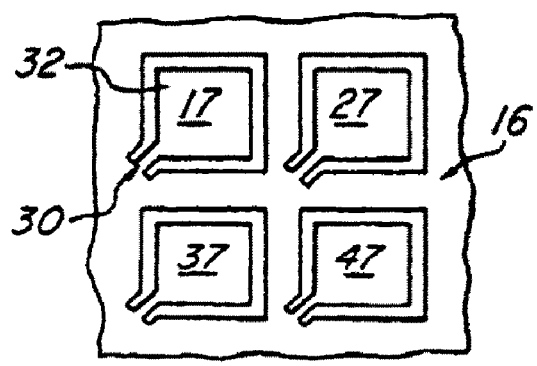
FIG. 1B is a conceptual diagram showing the configuration of a mirror element of a projection apparatus according to a conventional technique.
Figure 1C:
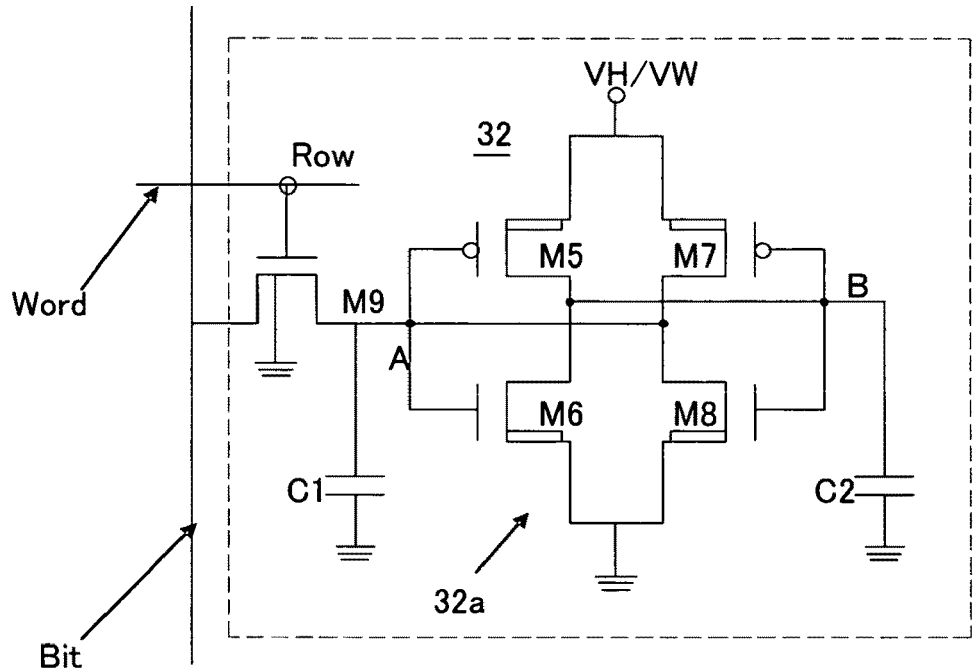
FIG. 1C is a conceptual diagram showing the configuration of the drive circuit for a mirror element of a projection apparatus according to a conventional technique.
Figure 1D:
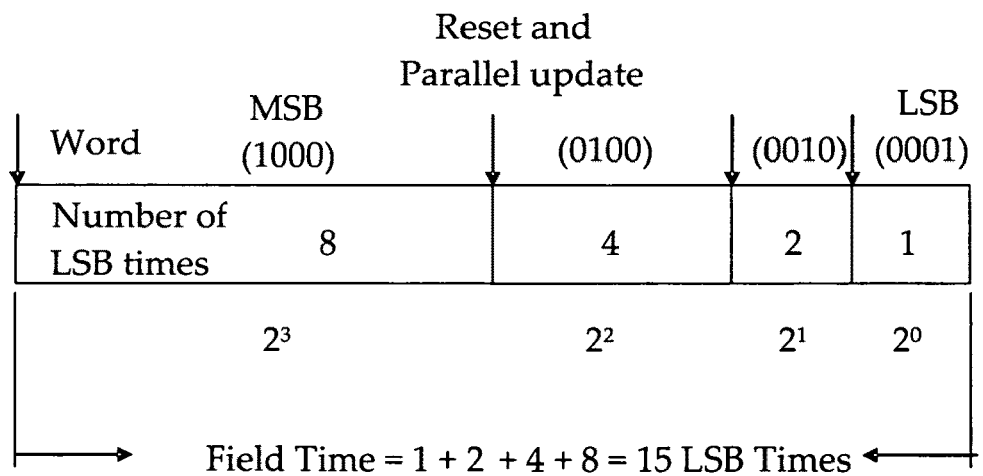
FIG. 1D is a conceptual diagram showing the format of image data used in a projection apparatus according to a conventional technique.
Figure 2:
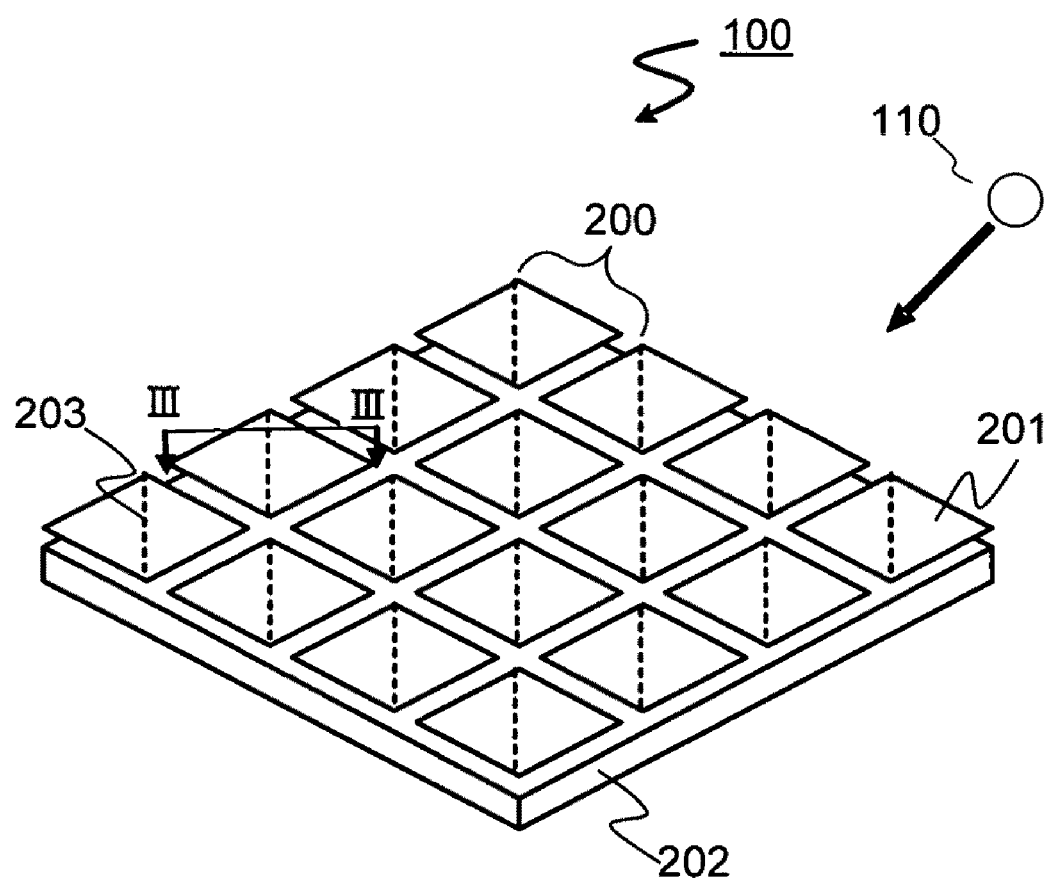
FIG. 2 is a diagonal view diagram showing a mirror device in which a plurality of mirror elements used for controlling the reflecting direction of incident light by deflecting mirrors is arrayed in two dimensions on a device substrate.

FIG. 2 is a diagonal view diagram showing a mirror device in which a plurality of mirror elements used for controlling the reflecting direction of incident light by deflecting mirrors is arrayed in two dimensions on a device substrate. Specifically, the mirror device is a kind of a micro-electromechanical system (MEMS) device.

The mirror device 100 shown in FIG. 2 is utilized as, for example, a spatial light modulator for a projection apparatus. The mirror device 100 is configured to place a plurality of mirror element each comprising an address electrode (not shown in a drawing herein), an elastic hinge (not shown in a drawing herein) and a mirror 201 supported by the elastic hinge crosswise on a device substrate 202.

In the configuration shown in FIG. 2, the mirror elements 200 each comprising a square mirror 201 are arranged crosswise at constant intervals (simply noted as "arrayed" hereinafter) on the device substrate 202. The mirror 201 can be controlled by applying a voltage to an address electrode placed on the device substrate 202.

Referring to FIG. 2, a deflection axis 203 around which the mirror 201 is deflected is depicted in a dotted line. To the mirror 201, a light emitted from a variable light source 110 is incident so as to be perpendicular to the deflection axis 203 or form an inclined angle.

Figure 3A:
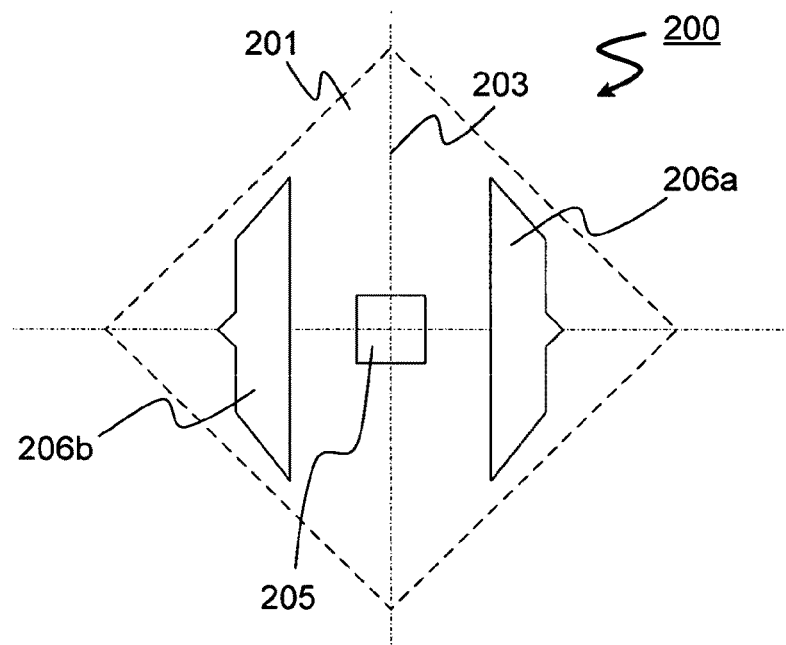
FIG. 3A is a top view diagram of the mirror element shown in FIG. 2.
Figure 3B:
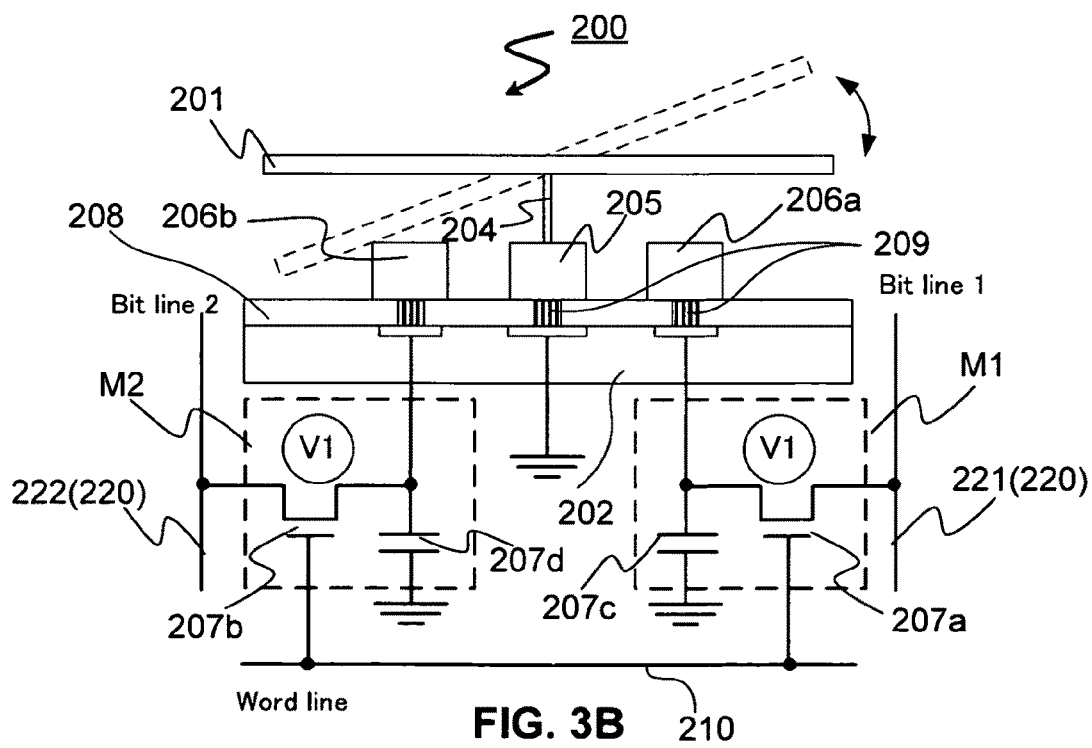
FIG. 3B is a conceptual diagram showing a cross-sectional configuration of the mirror element shown in FIG. 2.

FIG. 3A is a top view diagram of the mirror element 200 shown in FIG. 2. FIG. 3B is a conceptual diagram showing a cross-sectional configuration, on a plane indicated by III-III, of the mirror element 200 shown in FIG. 2.

The mirror element 200 includes the aforementioned mirror 201, an elastic hinge 204 for supporting the mirror 201, a hinge electrode 205 connected to the elastic hinge 204, two address electrodes 206a and 206b placed so as to be opposite to the mirror 201, and a first and second memory cells M1 and M2 corresponding to the respective address electrodes 206a and 206b.

Each memory cell has a dynamic random access memory (DRAM) structure respectively including gate transistors (207a or 207b) and capacitors (207c or 207d) and is commonly equipped inside of the device substrate 202. An insulation layer 208 is equipped on the substrate. Therefore, the memory cell and the address electrode on the insulation layer 208 are connected together by way of a Via 209 equipped in the insulation layer 208. Likewise, the hinge electrode 205 on the insulation layer 208 is connected to the ground (GND) by way of the Via 209 equipped in the insulation layer 208.

The mirror element 200 configured as described above is controlled for the deflecting direction of the mirror 201 by controlling each memory cell in accordance with image data signal. The mirror element 200 can modulate and reflect incident light.

Next is a description of the basic control for the mirror 201 of the mirror element 200. Specifically, "Va (1, 0)" means that a predetermined voltage Va is applied to the address electrode 206b and that no voltage is applied to the address electrode 206a in the following description. "Va (0, 1)" means that no voltage is applied to the address electrode 206b and that a voltage Va is applied to the address electrode 206a. "Va (0, 0)" means a voltage Va is applied to neither the address electrode 206a nor the address electrode 206b. "Va (1, 1)" means a voltage Va is applied to both the address electrode 206a and address electrode 206b.

Figure 4A:
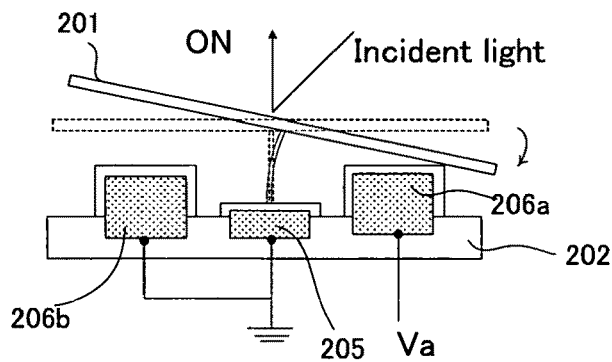
FIG. 4A is a diagram showing the situation of a mirror element when a mirror is in a state (i.e., an ON state) of reflecting an incident light to the projection optical system of a projection apparatus.
Figure 4B:
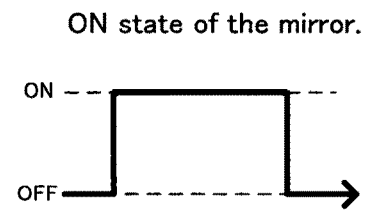
FIG. 4B shows the volume of light projected in the ON state exemplified in FIG. 4A.

FIG. 4A is a diagram showing the situation of a mirror element 200 when a mirror 201 is in a state (i.e., an ON state) of reflecting an incident light to the projection optical system of a projection apparatus. In the state of FIG. 4A, a predetermined voltage Va is applied to only the address electrode 206a (i.e., Va (0, 1) by way of the memory cell M1. This operation causes the mirror 201 to be tilted from a neutral state to become an ON state by being attracted to the address electrode 206a. In the ON state of the mirror 201, the reflection light by way of the mirror 201 is captured by the projection optical system and is projected as a projection light. FIG. 4B shows the volume of light (also noted as "light volume" hereinafter) projected in the ON state.

Figure 4C:
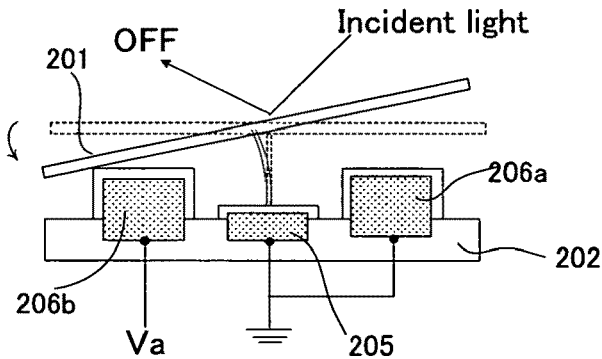
FIG. 4C is a diagram showing the situation of a mirror element when a mirror is in a state (i.e., an OFF state) of not reflecting an incident light to the projection optical system of a projection apparatus.
Figure 4D:
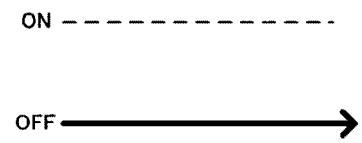
FIG. 4D shows the volume of light projected in the OFF state exemplified in FIG. 4C.

FIG. 4C is a diagram showing the situation of a mirror element 200 when a mirror 201 is in a state (i.e., an OFF state) of not reflecting an incident light to the projection optical system of a projection apparatus. In the state of FIG. 4C, a predetermined voltage Va is applied to only the address electrode 206b (i.e., Va (1, 0) by way of the memory cell M2. This operation causes the mirror 201 to be tilted from a neutral state to become an OFF state by being attracted to the address electrode 206b. In the OFF state of the mirror 201, the reflection light is shifted from the projection optical system and therefore does not constitute a projection light. FIG. 4D shows the volume of light projected in the OFF state.

Figure 4E:
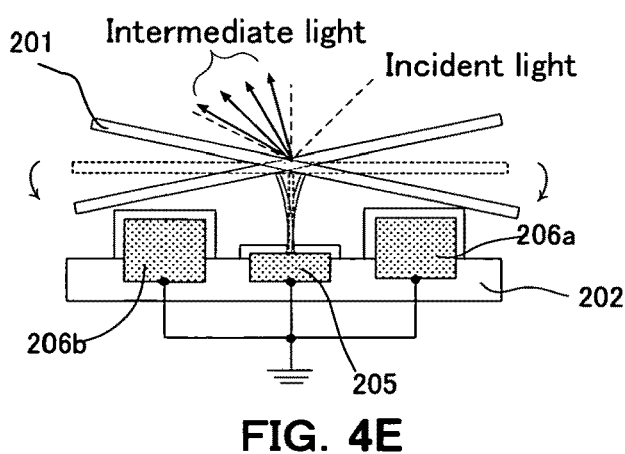
FIG. 4E is a diagram showing the situation of a mirror element when a mirror is in the state (i.e., an oscillation state) of a free oscillation.
Figure 4F:
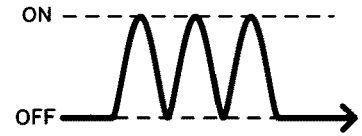
FIG. 4F shows the volume of light projected in the oscillation state exemplified in FIG. 4E.

FIG. 4E is a diagram showing the situation of a mirror element 200 when a mirror 201 is in a state (i.e., an oscillation state) of a free oscillation. In the state of FIG. 4E, the voltage that was applied to the address electrode 206a or 206b is removed (i.e., Va (0, 0). This operation causes the mirror 201 to freely oscillate between a tilt position (i.e., a Full ON), in which the mirror 201 abuts on the address electrode 206a, and a tilt position (i.e., a Full OFF), in which the mirror 201 abuts on the address electrode 206b, by the maximum amplitude A0. When the mirror 201 is in the oscillation state, the light volume of an incident light reflected to an ON direction and a portion of the light volume of the incident light reflected to a direction between the ON direction and OFF direction are incident to the projection optical system and are projected as the brightness of an image (i.e., a projection light). FIG. 4F shows the light volume projected in the oscillation state.

That is, in the ON state of the mirror 201 shown in FIG. 4A, approximately all of the flux of light (noted as "light flux" hereinafter) of the reflection light proceeds to the ON direction to be captured by the projection optical system and is projected as the projection light. In the OFF state of the mirror 201 shown in FIG. 4C, the reflection light proceeds to the OFF direction shifted from the projection optical system and therefore a light to be projected as a projection light does not exist. In the oscillation state of the mirror 201 as shown in FIG. 4E, a portion of the light flux of the reflection light, a diffraction light and/or diffuse reflection light are captured by the projection optical system and are projected as projection light.

Specifically, the above described FIGS. 4A, 4B, 4C, 4D, 4E and 4F exemplify the case of applying a voltage Va, which is expressed by a binary value, i.e., 0 or 1, to the two address electrodes 206a and 206b, respectively; the value of the voltage Va may be controlled under multiple values. This configuration increases the steps magnitude of coulomb force generated between the mirror 201 and each respective address electrode, thereby enabling more minute control for the mirror 201.

Furthermore, the above described FIGS. 4A, 4B, 4C, 4D, 4E and 4F exemplify the case of setting the mirror 201 (i.e., the hinge electrode 205) at the ground potential; alternatively, an offset voltage may be applied to the mirror 201. This configuration enables more minute control for the mirror 201.

Specifically, the coulomb force generated between the mirror 201 and address electrode 206a or 206b) is represented by the following expression:

$$F = k' \frac{eS^2 V^2}{2h^2}, \quad (1)$$

where "S" is the area size of the address electrode 206a or 206b, "h" is the distance between the mirror 201 and address electrode 206a or 206b, "e" is the permittivity between the mirror 201 and address electrode 206a or 206b, "V" is a voltage applied to the address electrode 206a or 206b and "k" is a correction factor.

A mirror device as described above can be produced by a process similar to the production process of a semiconductor. The production process mainly includes chemical vapor deposition (CVD), photolithography, etching, doping and chemical mechanical polishing (CMP).

Specifically, the present specification document specifically denotes an electrode connected to memory described above as an address electrode, and an electrode not connected to memory described later as a plate electrode. Furthermore, when a drive electrode is not distinguished from a hinge electrode, both of them are collectively denoted as a stationary electrode.

Next is a description of a projection apparatus utilizing a mirror device as a spatial light modulator.

Figure 5:
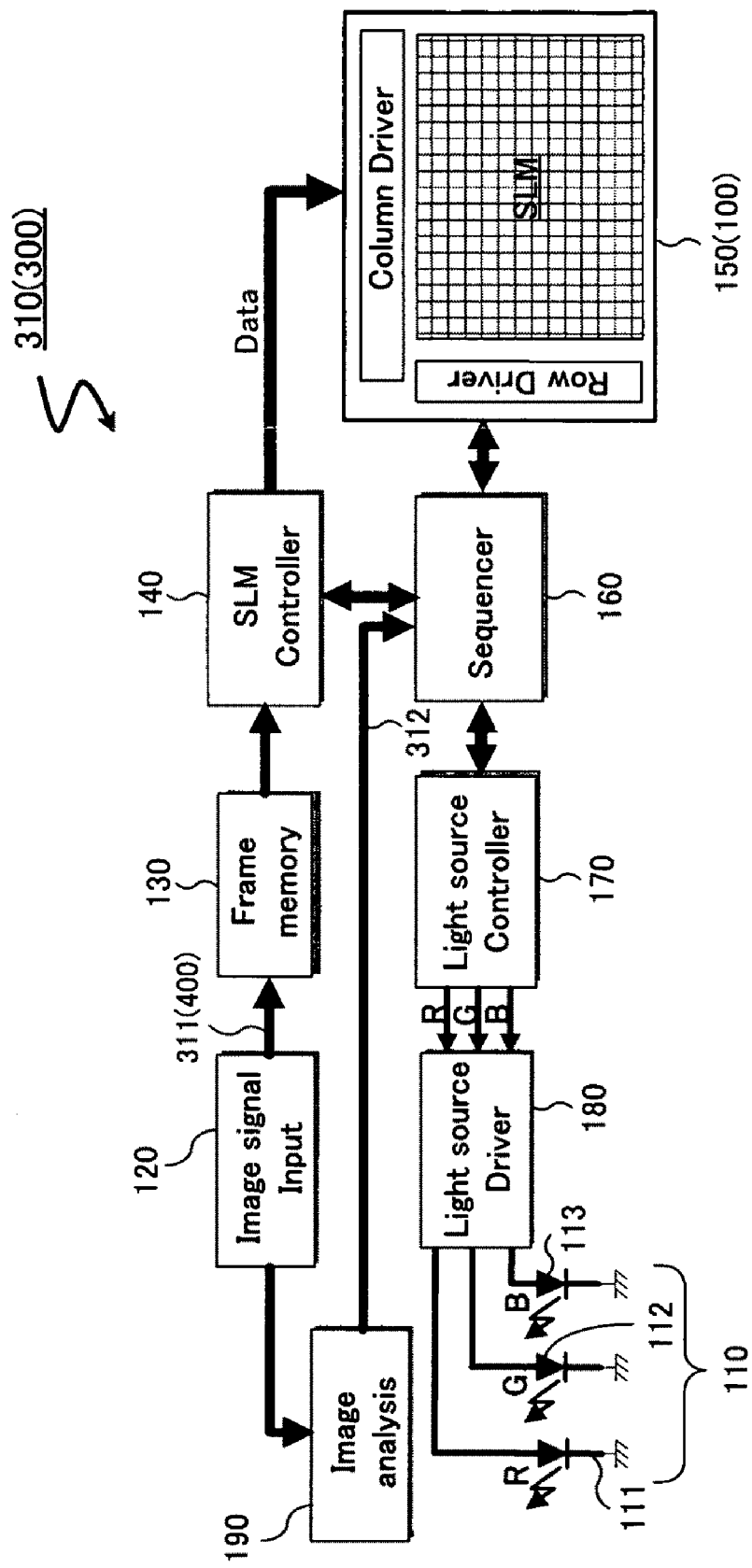
FIG. 5 is a functional block diagram showing an exemplary configuration of a control unit comprised in a projection apparatus.

FIG. 5 is a functional block diagram showing an exemplary configuration of a control unit comprised in a projection apparatus. The control unit 310 of the projection apparatus 300 includes frame memory 130, an SLM controller 140, a sequencer 160, a light source control unit 170 and a light source drive circuit 180. Specifically, the projection apparatus 300 utilizes the above described mirror device 100 as a spatial light modulator 150.

The following is a brief description of the role of each functional block of the projection apparatus 300. The sequencer 160, being constituted by a microprocessor, et cetera, controls the operation timing, and the like, of the entirety of the control unit 310 and spatial light modulator 150. The frame memory 130 retains input digital video data 311 (e.g., a binary video signal 400), for the amount of, for example, one frame, the data which is received from an external device (not shown in a drawing herein) that is connected to a video signal input unit 120. The input digital video data 311 is updated moment by moment at every time the display of one frame is completed. The SLM controller 140 divides input digital video data 311 that is read from the frame memory 130 into a plurality of subfields and outputs the divided subfields to the spatial light modulator 150 as control data for attaining the ON/OFF control (i.e., the PWM control) and oscillation control (i.e., the OSC control) for the mirror 201 of the spatial light modulator 150. The sequencer 160 outputs a timing signal to the spatial light modulator 150 in synchronous with the SLM controller 140 generating data.

A video image analysis unit 190 outputs a video image analysis signal 312 used for generating various light source pulse patterns on the basis of the input digital video data 311 input from the video signal input unit 120. The light source control unit 170 controls the operation of emitting an illumination light performed at a light source 110 on the basis of the video image analysis signal 312 obtained from the video image analysis unit 190 by way of the sequencer 160. The light source drive circuit 180 performs the operation of driving the red laser light source 111, green laser light source 112 and blue laser light source 113 of the variable light source 110 so as to emit light, respectively, on the basis of an instruction from the light source control unit 170.

In the projection apparatus configured as described above, the mirror device is controlled with a combination of the ON/OFF control and oscillation control. Specifically, the ON/OFF control means a control in which a mirror is controlled under an ON state or OFF state, and the oscillation control (i.e., the OSC control) means a control in which the mirror is controlled under an oscillation state or OFF state.

Figure 6:
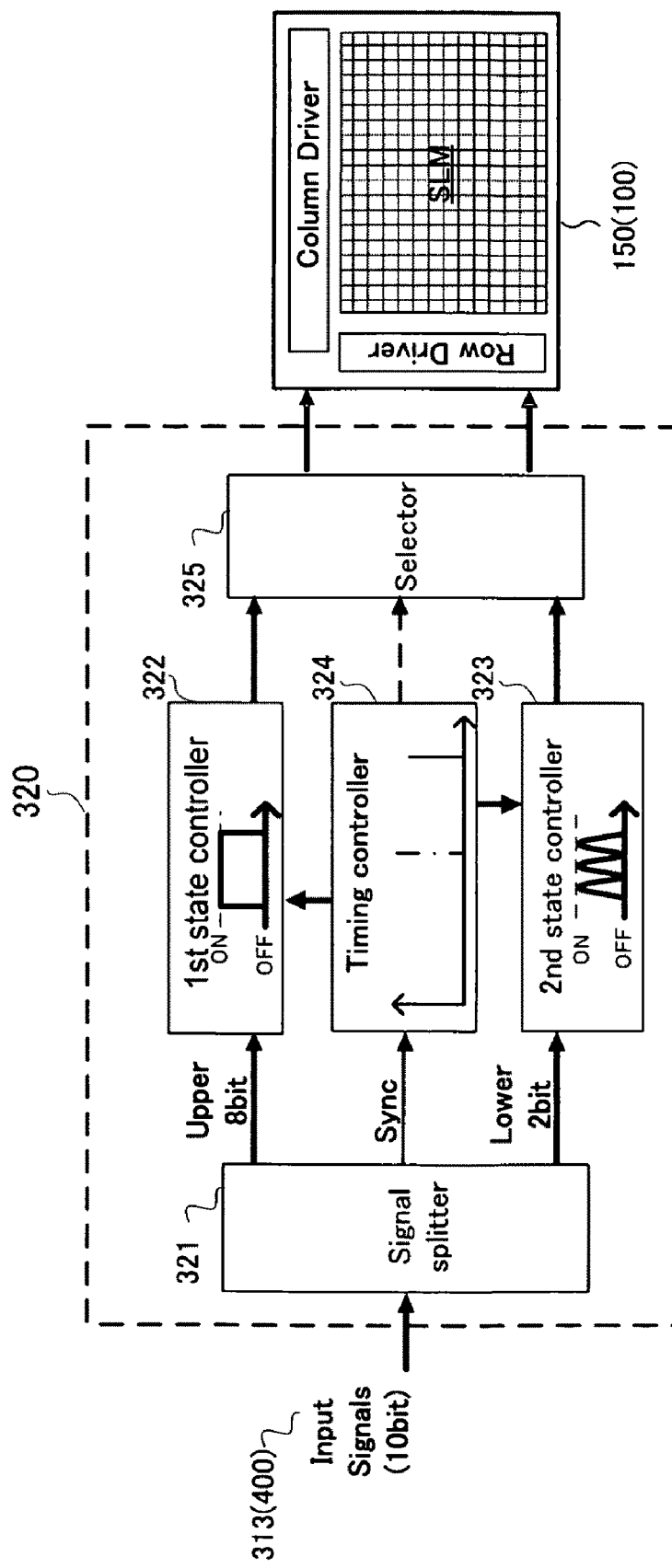
FIG. 6 is a conceptual diagram showing how a spatial light modulator (i.e., a mirror device) is controlled by a combination between an ON/OFF control and an oscillation control.

FIG. 6 is a conceptual diagram showing how the spatial light modulator 150 (i.e., the mirror device 100) is controlled by a combination between the ON/OFF control and an oscillation control. FIG. 6 exemplifies the case of allocating a 10-bit binary video signal 400 as an input signal 313 corresponding to one sub-field. A signal split unit 321 (i.e., Signal splitter) splits the inputted binary video signal 400 into upper 8 bits and lower 2 bits and outputs them to a first state control unit 322 (i.e., a 1st state controller) and a second state control unit 323 (i.e., 2nd state controller), respectively. The signal split unit 321 further outputs a timing signal (i.e., Sync) to a timing control unit 324 (i.e., a Timing controller).

The first state control unit 322 controls the mirror device 100 under the ON/OFF control (i.e., the PWM control) on the basis of a signal that is inputted. Meanwhile, the second state control unit 323 controls the mirror device 100 under the oscillation control (i.e., the OSC control) on the basis of a signal that is inputted. The timing control unit 324 controls a selection unit 325 (i.e., Selector) on the basis of a timing signal that is input. For the mirror device 100, a state in which it is controlled by the first state control unit 322 and a state in which it is controlled by the second state control unit 323 are changed over by the selection unit 325.

As described above, the mirror device is controlled, within the projection apparatus, with a combination of the ON/OFF control and oscillation control.

Next is a description of each preferred embodiment of the present invention with the above described premising configuration in mind.

First Embodiment

Figure 7A:
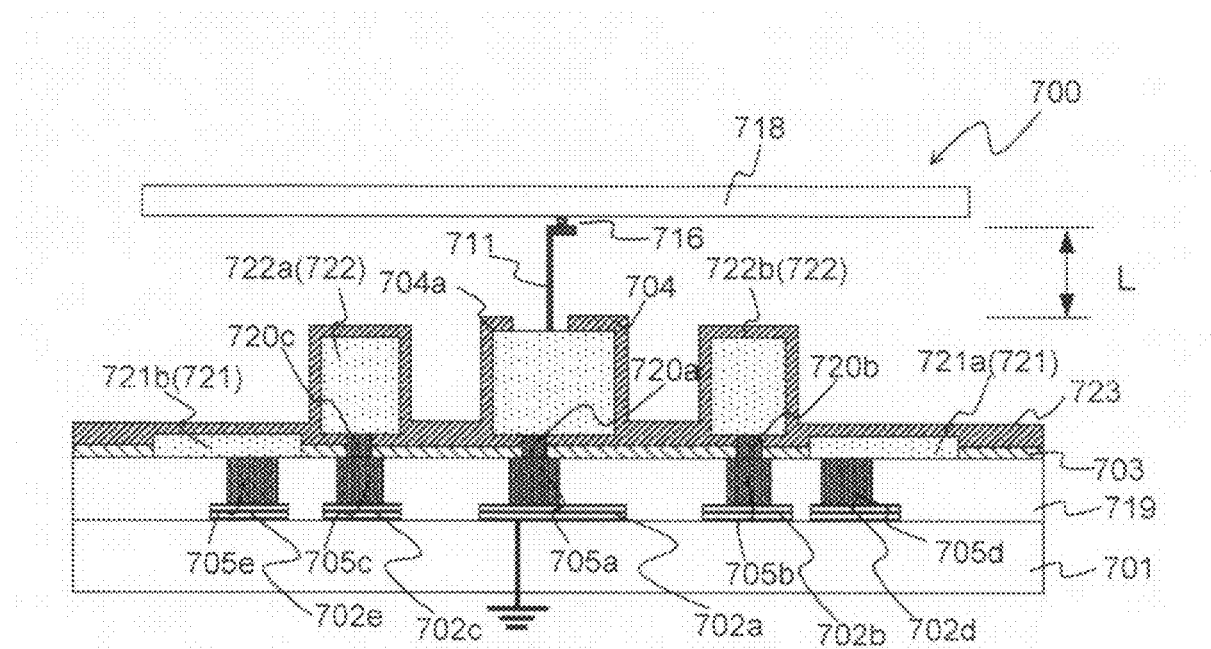
FIG. 7A is a cross-sectional diagram of a mirror element according to a first preferred embodiment.

FIG. 7A is a cross-sectional diagram of a mirror element according to the present embodiment. In contrast to the mirror element 200 exemplified in FIGS. 3A and 3B, the mirror element 700 exemplified in FIG. 7A is configured to further include two drive electrodes (i.e., surface electrodes 721). The following is a further detail description of the mirror element 700.

The wirings 702a, 702b, 702c, 702d and 702e of a drive circuit for driving and controlling the mirror 718, and first Vias 705a, 705b, 705c, 705d and 705e, which are connected to the aforementioned wirings and a first insulation layer 719 are formed on the substrate 701 of the mirror element 700.

Here, on the wirings 702a, 702b, 702c, 702d and 702e, the first Vias 705a, 705b, 705c, 705d and 705e are respectively equipped in the first insulation layer 719.

As described above, the first insulation layer 719 is equipped with five Vias. Specifically, the number of the Vias may be different for individual wirings. Furthermore, the number of Vias may be larger or smaller than five.

Furthermore, second Vias 720a, 720b, 720c and surface electrodes 721a and 721b are respectively equipped on the first Vias 705a, 705b, 705c, 705d and 705e. Then a protective layer 703 is deposited on the first insulation layer 719.

Specifically, the semiconductor wafer substrate 701 is preferred to be a silicon substrate. The wirings 702a, 702b, 702c, 702d and 702e of the drive circuit are preferred to be aluminum wirings. The first Vias 705a, 705b, 705c, 705d and 705e and second Vias 720a, 720b and 720c are desired to be made of a metallic material containing tungsten or copper.

The surface electrodes 721a and 721b may use, for example, a material (e.g., tungsten) that is the same as, or similar to, the material of the first Vias 705a, 705b, 705c, 705d and 705e and second Vias 720a, 720b and 720c, or a material with high electric conductivity, such as aluminum. Furthermore, the forms of the surface electrodes 721a and 721b may be appropriately determined. Furthermore, although the surface electrodes 721a and 721b are formed on the first Vias 705d and 705e, they may be formed directly on the wirings 702d and 702e.

The first insulation layer 719 and protective layer 703 are preferred to be made of a material containing silicon, such as silicon carbide (SiC), amorphous silicon and silicon dioxide (SiO2). If aluminum is used for the surface electrodes 721a and 721b and if amorphous silicon directly contacts with aluminum, the aluminum-made surface electrodes 721a and 721b will be corroded. Therefore, a silicon carbide (SiC) layer is preferred to be provided between the amorphous silicon and the aluminum-made surface electrodes 721a and 721b. It is also possible to form an electrode by mixing aluminum with an impurity such as silicon, or to form a barrier layer using tantrum (Ta) or titanium (Ti) on the top or bottom of an electrode. Such barrier layer may conceivably be structured in two or more layers.

Specifically, a stiction phenomenon generated by the mirror 718 contacting with the electrode 722 or 722b can be prevented by equipping a stopper on the substrate 701 so as to not allow the mirror 718 to abut on the electrode 722a or 722b.

The mirror element 700 is equipped with the hinge electrode 704 and electrodes 722a and 722b so as to secure electric conduction with the second Vias Via 720a, 720b and 720c. The hinge electrode 704 and electrodes 722a and 722b may preferably use a material with high electrical conductivity, such as aluminum. Specifically, the hinge electrode 704 is connected to the ground (GND).

The hinge electrode 704 is an electrode equipped for an elastic hinge 711 and is configured to be the same height as that of the electrodes 722a and 722b on the left and right sides. The forming of the individual electrodes so that the height of the center, left and right is the same makes it possible to form the hinge electrode 704 and electrodes 722a and 722b in the same production process.

Furthermore, adjusting the height of the hinge electrode 704 at production makes it possible to determine the height of the center part on which the elastic hinge 711 is placed. The elastic hinge 711 is made of, for example, amorphous silicon. The thickness of the elastic hinge 711 is preferred to be a certain size between approximately 150- and 400 angstroms.

Meanwhile, a plurality of elastic hinges may be provided for one mirror 718, with the width of each elastic hinge reduced. For example, two elastic hinges with a smaller width than that of the elastic hinge used for the case of providing one mirror 718 with a single elastic hinge may be respectively placed on both sides of the mirror.

Furthermore, if the elastic hinge 711 is made of a silicon (Si) material, the elastic hinge 711 is preferred to have electrical conductivity through application of an In-situ doping with boron, arsenic, phosphorus or the like, or diffusing an ion-implanted material or metallic silicide such as nickel silicide (NiSi) and titanium silicide (TiSi). If the elastic hinge 711 is made of silicon (Si) that is the group IV of a semiconductor material, an additive may be appropriately selected from among the materials belonging to the group III or V.

Moreover, in the mirror element 700, a second insulation layer (i.e., a protective film) 723 is deposited on the surface of the structural part of the substrate 701. The second insulation layer 723 is preferred to be a layer containing silicon such as silicon carbide (SiC) and amorphous silicon. This layer is formed in order to prevent the hinge electrode 704, surface electrodes 721a and 721b, and electrodes 722a and 722b from being corroded by hydrogen fluoride (HF), if they are made of aluminum.

Furthermore, the top surface of the elastic hinge 711 may be provided with a coupled layer. A layer made of the same material as that of the elastic hinge 711 may be equipped as the coupled layer by forming the same area size and form as those of the mirror 718. Configuring the coupled layer as the minimum possible area size makes it possible to prevent a deformation and/or warping of the mirror 718 due to the difference in the coefficients of linear expansion between the mirror 718 and coupled layer.

Furthermore, a joinder layer 716 is deposited on the coupled layer of the elastic hinge 711 for obtaining an electric connection between the elastic hinge 711 and mirror 718 while eliminating a variation in the height among the individual mirror elements.

The joinder layer 716 is preferred to be made of, for example, single crystal silicon (Si), amorphous silicon or poly-silicon, to any of which an In-Situ doping with boron, arsenic or phosphorous is applied, or ion-implanted; or made of an annealed semiconductor material. Alternatively, the joinder layer 716 is preferred to possess electrical conductivity through application of diffusing a metallic silicide such as nickel silicide (NiSi) and titanium silicide (TiSi). If the joinder layer 716 is made of silicon (Si), which is found in the group IV among semiconductor materials, an additive may be appropriately selected from among the materials belonging to the group III or group V. The resistance of the joinder layer 716 is approximately the same as that of the elastic hinge 711 or mirror 718, and is lower than the resistance of the protective layer 703.

If the mirror 718 is made of aluminum and if the elastic hinge 711 is constituted by a silicon material, a barrier layer (not shown in a drawing herein) may be deposited on the top and bottom of the joinder layer 716 so that the mirror 718 does not come to contact with the elastic hinge 711. Such a barrier layer may be constituted by two or more layers.

Then, the mirror 718 is formed on the joinder layer 716 of the elastic hinge 711 to complete the mirror element 700.

The mirror 718 is preferred to be made of a member, e.g., aluminum, which possesses a high reflectance of light (i.e., electromagnetic waves, especially visible light). Furthermore, the aluminum used for it may be an alloy containing titanium (Ti) and/or silicon (Si). For example, silicon (Si) may preferably be added to aluminum by about 5%. Meanwhile, the top surface of the mirror 718 may be provided with an aluminum oxide layer. Furthermore, a material with a low refractive index and a material with a high refractive index may alternately be deposited onto the top surface of the mirror 718 to improve the reflectivity thereof.

Furthermore, the mirror 718 is preferred to be a square or a diamond shaped, with each side being a size between about 4- and 11 μm. Further, the gap between individual mirrors 718 is preferred to be any gap between about 0.15- and 0.55 μm. Further, a preferred design is such that the aperture ratio of an individual mirror element is no less than 85%, or further preferably, no less than 90%. Specifically, the configuration is also such that the reflection region preferably occupies about 85% of the region in which the mirrors 718 are placed even when a torsion hinge is used.

Figure 7B:
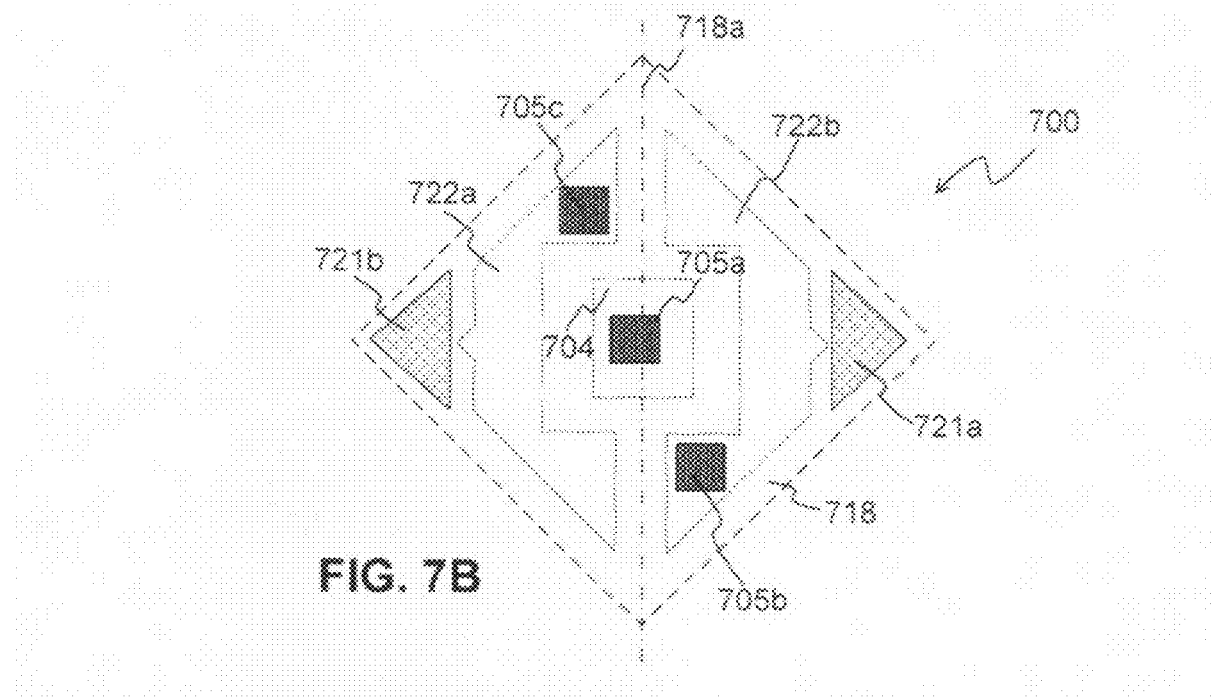
FIG. 7B is a top view diagram of a mirror element according to the first embodiment.

As the surface part of the substrate 701 is a perspective view of the device shown in FIG. 7B, the mirror 718, the electrodes 722a and 722b and the hinge electrode 704 are enclosed by the dotted lines. Meanwhile, the deflection axis 718a of the mirror 718 is indicated by a single-dot chain line.

Figure 7C:
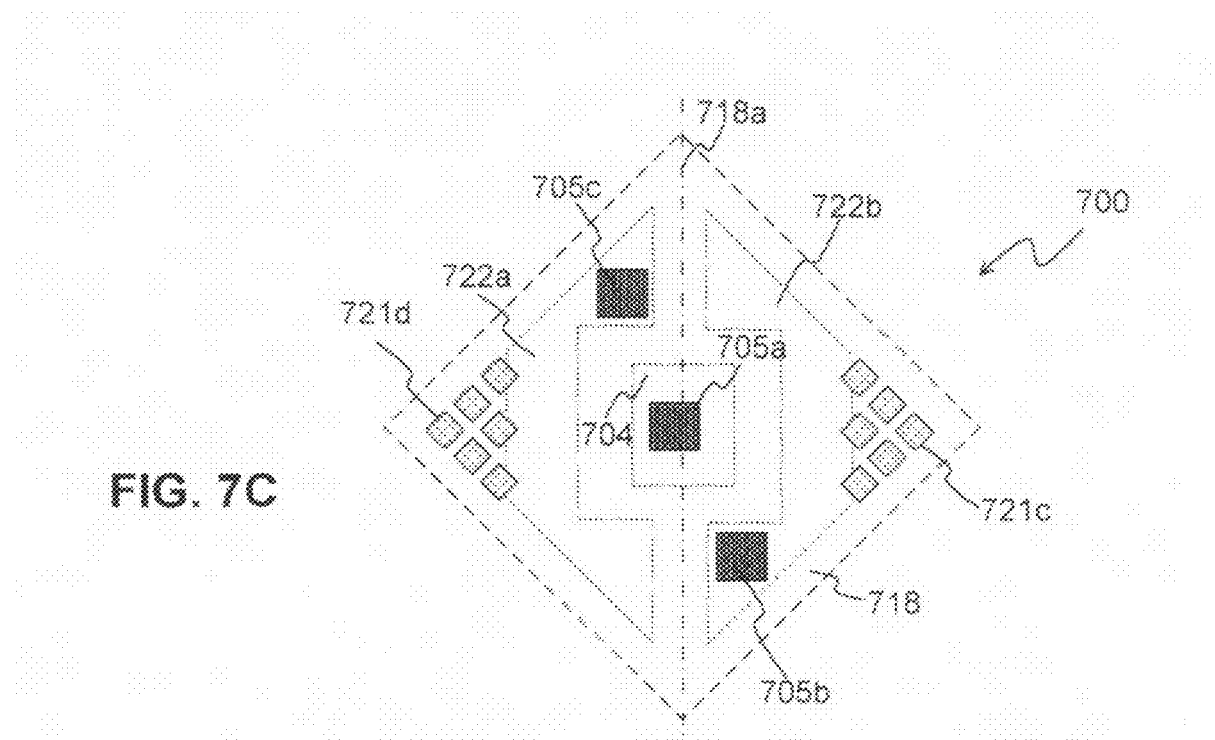
FIG. 7C is a top view diagram of a mirror element according to the first embodiment.

As exemplified in FIG. 7B, the surface electrodes 721a and 721b represent the appearance of a rectangle in the plain view, and are placed under the opposite corners of the mirror 718. Further, the surface electrodes 721a and 721b are respectively placed so as to form point symmetry about the center of the mirror 718. Specifically, the surface electrode 721 may be provided by arraying a plurality of miniature electrodes as indicated by the electrodes 721c and 721d which are shown in FIG. 7C. The individual miniature electrodes are respectively connected to the same Via so as to be maintained at the same electric potential (simply noted as "potential" hereinafter). The individual miniature electrodes can be formed by the same production process as that for forming a Via, which connects between metallic layers, in the semiconductor production process, and thus the production of the miniature electrode is eased.

The electrodes 722a and 722b are placed at the positions under the mirror 718 excluding positions where the surface electrodes 721a and 721b and hinge electrode 704 are placed. Alternatively, the electrodes 722a and 722b may be placed by overlapping with the entirety, or a part, of the surface electrodes constituted by the electrodes 721c and 721d as exemplified in FIG. 7C. If the voltages applied to the surface electrodes 721 and electrodes 722 are applied at the same time or with the same potential, the surface electrodes 721 and electrodes 722 may be electrically continuous to each other. In contrast, if the voltages are applied to the surface electrodes 721 and electrodes 722 in different timings or with different potentials, then different drive circuits may be connected to the respective electrodes 721 and electrodes 722 by placing them electrically separately.

Furthermore, the electrodes 722a and 722b are also placed so as to form point symmetry about the center of the mirror 718 likewise the case of the surface electrodes 721a and 721b.

Figure 7D:
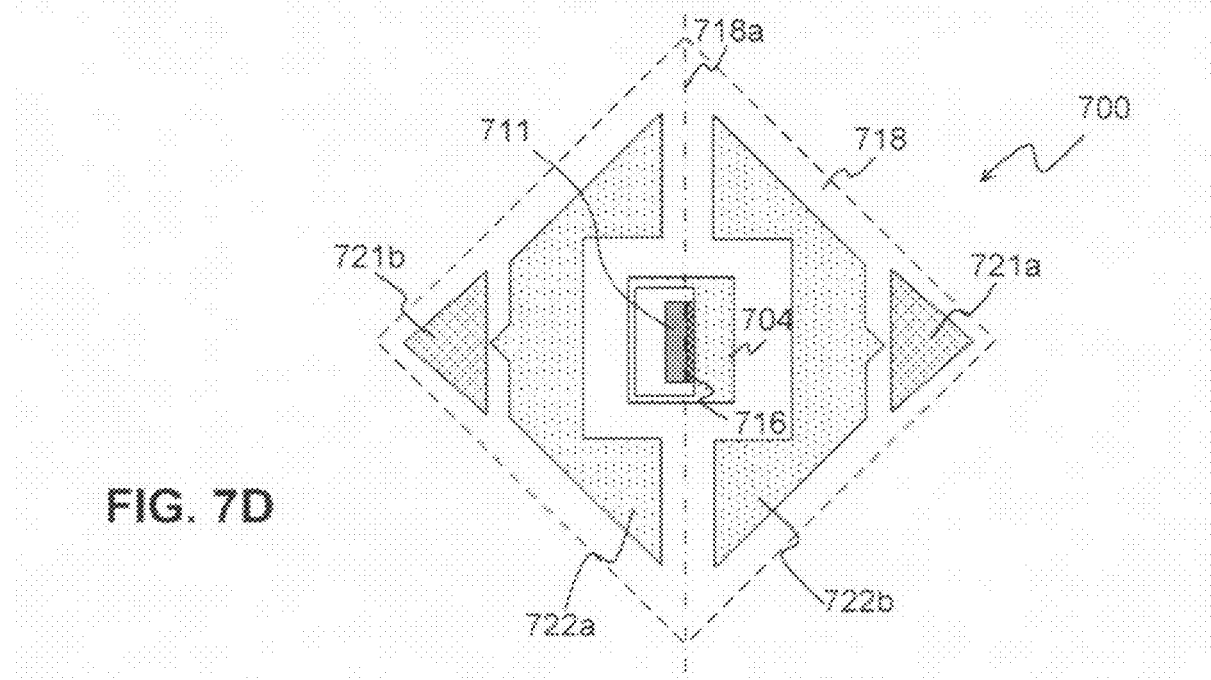
FIG. 7D is a top view diagram of a mirror element according to the first embodiment.

FIG. 7D is a plain view diagram of the mirror element 700 excluding the mirror 718. In FIG. 7D, the mirror 718 is depicted by a dotted line box.

As exemplified in FIGS. 7A and 7D, the electrodes 722a and 722b are formed to be projecting from the substrate 701. Further, the electrodes 722a and 722b are formed so that the mirror 718 contacts with the electrodes 722a and 722b, respectively, when the mirror 718 deflects, and thereby the upper limit of the deflecting angle of the mirror 718 is determined.

A preferred design is such that the electrodes 722a and 722b are formed in such a manner so as to make the deflection angle of the mirror 718 anywhere between 12- and 14 degrees. Such a deflection angle of the mirror 718 is preferably designed in compliance with the designs of the light source and optical system of a projection apparatus. A preferable design also includes the height of the elastic hinge 711 of each mirror element 700 to be no larger than 2 μm and the mirror 718 of each mirror element 700 to be a square with each side being no larger than 10 μm.

Figure 7E:
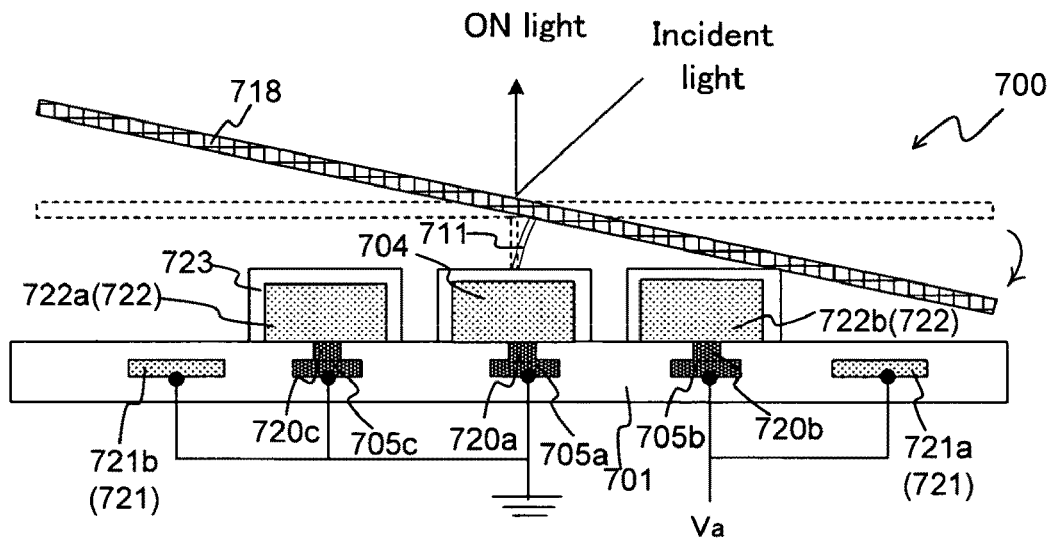
FIG. 7E is a diagram showing the situation of a mirror element, in an ON state, according to the first embodiment.

FIG. 7E is a diagram showing the situation of the mirror element 700 when the mirror 718 is in a state (i.e., an ON state) in which an incident light is reflected to the projection optical system of a projection apparatus. In the state of FIG. 7E, a predetermined voltage Va is applied to the electrode 722b and surface electrode 721a, while other electrodes are grounded by connecting them to the GND. With this operation, the mirror 718 is tilted by being attracted from the neutral state to the electrode 722b and surface electrode 721a so that the mirror 718 is controlled under the ON state.

Figure 7F:
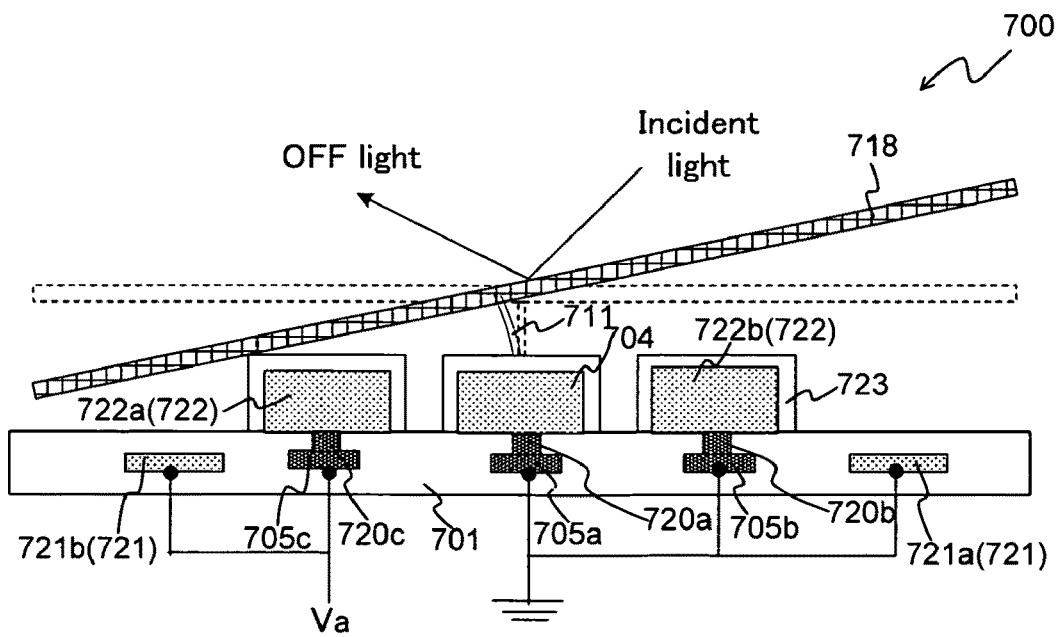
FIG. 7F is a diagram showing the situation of a mirror element, in an OFF state, according to the first embodiment.

FIG. 7F is a diagram showing the situation of the mirror element 700 when the mirror 718 is in a state (i.e., an OFF state) in which the incident light is not reflected to the projection optical system. In the state of FIG. 7F, a predetermined voltage Va is applied to the electrode 722a and surface electrode 721b, while other electrodes are grounded by being connected to the GND. With this operation, the mirror 718 is tilted by being attracted from the neutral state to the electrode 722a and surface electrode 721b so that the mirror 718 is controlled under the OFF state.

In addition to the above described control, the mirror can also be controlled under an oscillation state as exemplified in FIG. 4C in the mirror element 700, as in the case of the above described mirror element 200.

Specifically, the case of applying the same voltage to the electrode 721 and surface electrode 722 is shown here; it is also possible to apply different voltage to the electrode 721 and surface electrode 722, respectively. It is further possible to carry out a control in which multi-step voltages are applied to the surface electrodes 721a and 721b, and electrodes 722a and 722b, of the mirror element 700.

Furthermore, if the forms of the mirror 718 and elastic hinge 711 are respectively changed, or if the elastic hinge 711 is made to possess different restoring force, or if the deflection control for the mirror 718 is changed, between the left side (i.e., the OFF side) and right side (i.e., the ON side) of the mirror element 700, a voltage is applied by changing the area size, height and/or placement (i.e., the layout) of the respective surface electrodes 721a and 721b or respective electrodes, 722a, 722b or hinge electrode 704, between the right and left sides of the mirror element 700, and thereby the deflection of the mirror 718 is controlled.

Furthermore, at least either surface electrode 721 of the surface electrode 721a and surface electrode 721b of the mirror element 700 may be protruded from the substrate.

Figure 7G:
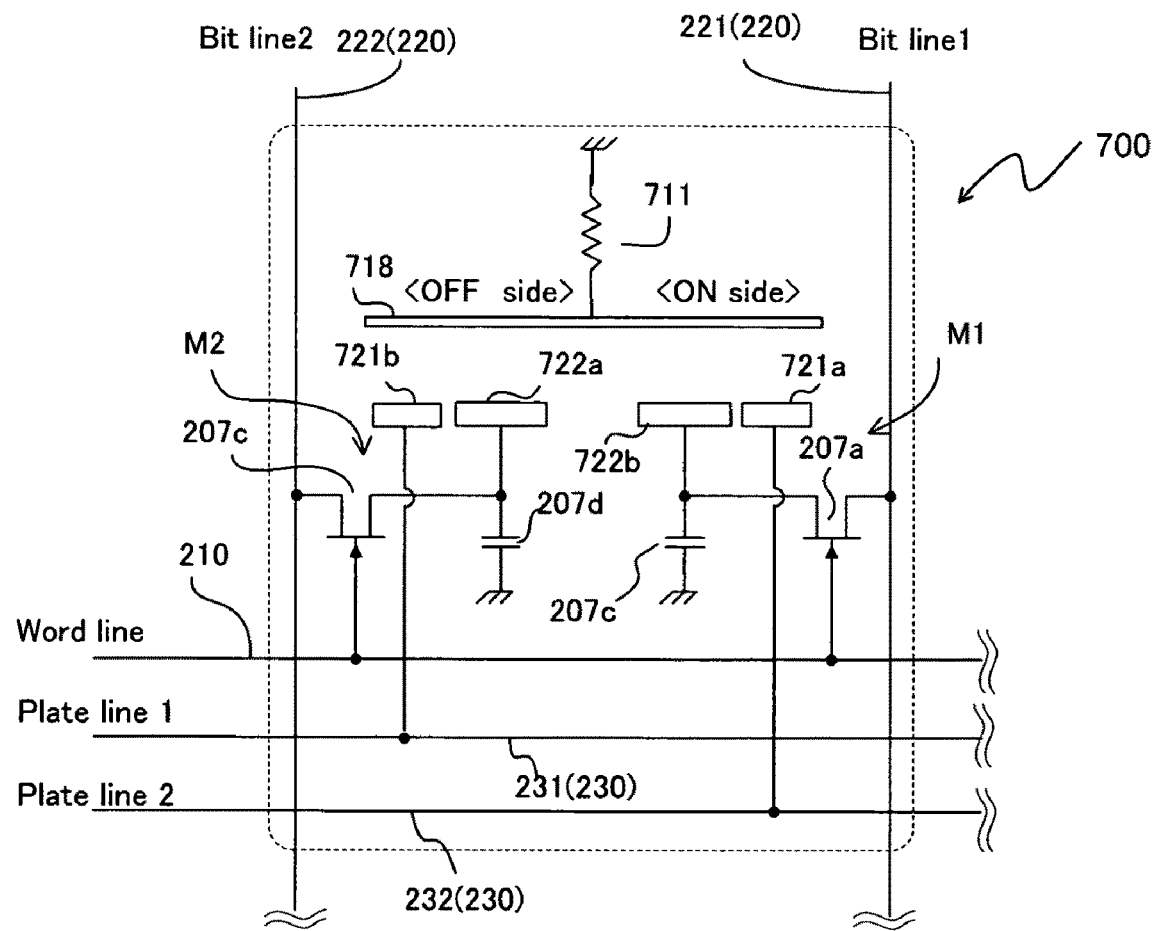
FIG. 7G is a conceptual diagram showing an exemplary circuit configuration of a mirror element.

Next is a description of the circuit configuration of the mirror element 700 with reference to FIG. 7G.

FIG. 7G is a conceptual diagram showing an exemplary circuit configuration of the mirror element 700. In the mirror element array of a mirror device, the mirror elements 700 are arrayed in a grid-like fashion at each of the positions where bit lines 220 (e.g., bit lines 221 and 222) vertically extended from the bit line driver (not shown in a drawing herein) and word lines 210 horizontally extended from the word line driver (not shown in a drawing herein) cross each other. Furthermore, a plurality of plate lines (e.g., a first plate line 231 and a second plate line 232) is equipped correspondingly to each word line.

An ON capacitor 207c is connected to the electrode 722b on the ON side, and the ON capacitor 207c is connected to the bit line 221 by way of a gate transistor 207a that is constituted by a field effect transistor (FET) or the like.

An OFF capacitor 207d is connected to the electrode 722a on the OFF side, and the OFF capacitor 207d is connected to the second bit line 222 (220) by way of a gate transistor 207b that is constituted by an FET or the like.

That is, the ON capacitor 207c and gate transistor 207a of the ON-side electrode 722b constitute a memory cell in so-called DRAM structure. Likewise, the memory cell M2 has a DRAM structure and includes an OFF capacitor 207d and gate transistor 207b of the OFF-side electrode 722a.

Furthermore, the surface electrode 721b on the OFF side is configured to be connected to the first plate line 231 and to be controlled separately from the memory cell M2. Likewise, the surface electrode 721a on the ON side is configured to be connected to the second plate line 232 and to be controlled separately from the memory cell M1.

The elastic hinge 711 supporting the mirror 718 is depicted as a circuit element possessing a hinge resistor R711. If the stray capacitance of the elastic hinge 711 is large, it is possible to constitute a circuit also including a capacitor (not shown in a drawing herein). One end of the elastic hinge 711 is connected to the ground (GND).

In this case, both the gap between the mirror 718 and ON-side electrodes (i.e., the electrode 722b and surface electrode 721a) and the gap between the mirror 718 and OFF-side electrodes (i.e., electrode 722a and surface electrode 721b) can be regarded as variable-capacitance capacitors, and the deflecting operation of the mirror 718 is controlled by the difference in potentials of the variable-capacitance capacitors. That is, the individual electrodes (i.e., the electrodes 722a and 722b, and the surface electrodes 721a and 721b) are drive electrodes used for driving the mirror 718.

The application of a voltage to the OFF-side electrode 722a and ON-side electrode 722b is controlled in accordance with the presence and absence of data written to the respective memory cells M2 and M1, that is, charging to, and discharging from, the corresponding respective capacitors. In other words, both the electrodes 722a and 722b are address electrodes.

More specifically, an arbitrary word line 210 is selected by the word line driver, and the opening and closing of the gate transistors 207a and gate transistors 207b of the mirror elements 700 horizontally lined up with the selected word line 210 are controlled. Associated with this operation, the charging and discharging of the charge to and from the ON capacitor 207c and OFF capacitor 207d, respectively, are controlled by the bit line driver through the bit lines 221 and 222.

Meanwhile, the application of a voltage to the ON-side surface electrode 721a and OFF-side surface electrode 721b is controlled through the respective plate lines 230 (i.e., the first plate line 231 and second plate line 232) in lieu of causing a memory cell to intervene. That is, both the surface electrodes 721a and 721b are plate electrodes.

In other word, the potential of the address electrode is changed synchronously with the selection timing of the word line, with which the electric charge is charged to, or discharged from, the memory. Therefore, the potential of the address electrode is controlled in a predetermined interval (noted as "one time-slot" hereinafter), in which an individual word line is selected, as a unit of control (i.e., a minimum control interval), which is the enabled minimum control interval. In contrast, the potential of a plate electrode can be controlled in a shorter interval than one time-slot because there is no intervention of memory.

As such, the deflecting operation of the mirror 718 is controlled by applying a voltage to the electrode 722a and surface electrode 721b on the OFF side and the electrode 722b and surface electrode 721a on the ON side.

Here, if the electrical resistance of the elastic hinge 711 (i.e., the hinge resistor R711) is small when a voltage is applied to the electrodes (i.e., the surface electrode 721*b* and electrode 722*a*, or the surface electrode 721*a* and electrode 722*b*), the electric charge generated in the mirror 718 flows instantly to the ground (GND). If the resistance of the elastic hinge is large, the electric charge generated in the mirror 718 flows slowly to the ground (GND). This generates a transient characteristic in the tilting operation of the mirror 718, causing a delay in the deflecting operation of the mirror 718.

In contrast, if the resistance of the elastic hinge 711 is large and if there is a photoelectric effect caused by an illumination light in the state of the mirror 718 being retained to the OFF-side electrodes (i.e., the electrode 722*a* and surface electrode 721*b*) or ON-side electrodes (i.e., the electrode 722*b* and surface electrode 721*a*), the potential of the mirror 718 cannot be retained at constant and therefore the mirror 718 cannot be retained on the OFF side or ON side as a result of the difference in potentials decreasing in a passage of certain time.

Furthermore, if the resistance of the elastic hinge 711 is large and if a voltage applied to the OFF-side or ON-side electrode is steep, the alternate current (AC) component is actually applied to the mirror 718 by flowing through the variable-capacitance capacitors between the mirror 718 and individual electrodes. If the potential of the electrode is reduced from 5 volts to zero volts when the mirror 718 abuts on the electrode on the OFF side or ON side, a voltage between −4 volts and −5 volts is applied to the mirror 718. This causes the mirror 718 to be kept retained onto the electrode for a while by the applied voltage even if the mirror 718 is tried to be released from the electrode. In order to prevent such a state, a stopper for determining the deflecting angle of the mirror 718 is separately provided and the stopper is connected to the ground (GND), and thereby the operation of the mirror element 700 can be controlled in high speed or high reliability.

Figure 7H:
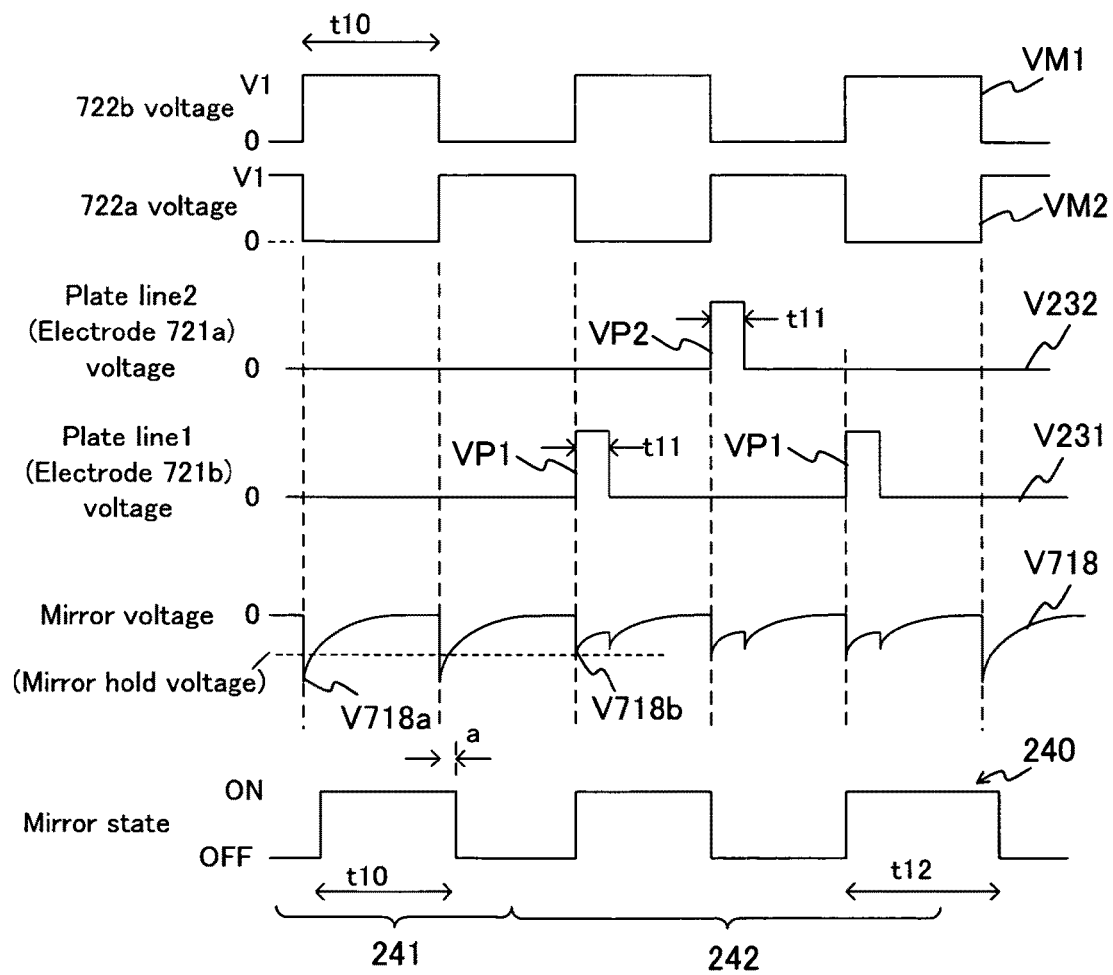
FIG. 7H is a timing chart showing an exemplary operation of the circuit configuration exemplified in FIG. 7G.

FIG. 7H is a timing chart showing an exemplary operation of the circuit configuration exemplified in FIG. 7G. FIG. 7H exemplifies the case of applying a voltage V1 alternately to the OFF-side electrode 722*a* and ON-side electrode 722*b* for each time slot (in the pulse width t10). Specifically, when a high definition image (i.e., a full high definition television) is expressed in 10 bits, it is necessary to perform within 40 microseconds (μsec) to drive the entirety of ROW lines. Therefore, the pulse width t10 is, for example, 40 [μsec].

If a voltage is not applied to the plate line 230 and if an ON-side electrode potential VM1, which is applied to the ON-side electrode 722*b* in the state of the mirror 718 tilting onto the ON side, is changed from a voltage V1 (e.g., 10 volts) to zero volts, the potential of the mirror 718 (i.e., the mirror potential V718) nears a voltage close to −V1 (i.e., a peak potential V718*a*), followed by gradually dropping to zero volts because the hinge resistance R711 of the elastic hinge 711 is large. Specifically, the peak potential V718*a* is a voltage exceeding a mirror-hold potential Vh (i.e., a voltage necessary to retain the mirror).

Consequently, strong coulomb force is generated between the ON-side electrode 722*b* and mirror 718 even when the ON-side electrode potential VM1 of the ON-side electrode 722*b* is changed to L (i.e., zero volts) as exemplified in the front half period 241 of a mirror displacement profile 240. As a result, the mirror 718 is kept retained onto the ON side (for the period a) even if the OFF-side electrode potential VM2 of the OFF-side electrode 722*a* is already at the voltage V1. Then, the mirror 718 deflects so as to transition to the OFF side as the potential of the mirror 718 decreases.

In contrast, the peak potential V718*b* of the mirror potential V718 can be suppressed to a voltage lower than the mirror-hold potential Vh by giving a pulse potential VP2 (or a pulse potential VP1) with a pulse width t11 (e.g., 10 [μsec]) to the second plate line 232 (or the first plate line 231) at a timing of the mirror 718 starting to tilt from the ON state (or OFF state). As a result, the deflecting operation of the mirror 718 can be so controlled as to be responsive to a change in the OFF-side electrode potential VM2 and ON-side electrode potential VM1 without delay as seen in the latter half period 242 of the mirror displacement profile 240. In this case, the width of the ON period is in synchronous with the change in potentials of the electrodes 722*a* and 722*b*, and therefore is the same as the pulse width t10.

Furthermore, if a pulse potential VP1 is applied to only the first plate line 231 at a timing of the mirror 718 shifting from the OFF state to ON state, the mirror displacement profile 240 becomes a waveform that extends the ON period for a period "a" (i.e., a mirror ON period t12 (e.g., 45 μsec)). In contrast, if a pulse potential VP2 is applied to only the second plate line 232 at a timing of the mirror 718 shifting from the ON state to OFF state, the mirror displacement profile 240 becomes a waveform that narrows the ON period (e.g., 35 μsec) for a period "a".

As such, the application of voltage to the surface electrode 721*a* and surface electrode 721*b* using the first plate line 231 and second plate line 232 enables the mirror 718 to respond quickly to a change in potentials of the electrodes (i.e., the electrodes 722*a* and 722*b*). Also, generating a voltage only in one side, i.e., the first plate line 231 or second plate line 232, also makes it possible to change the ON periods of the mirror 718.

That is, controlling the potentials of the first plate line 231 and second plate line 232 makes it possible to change the ON/OFF operations of the mirror 718 variously in a shorter interval than one time-slot, thereby attaining a high level of gradation.

Figure 8:
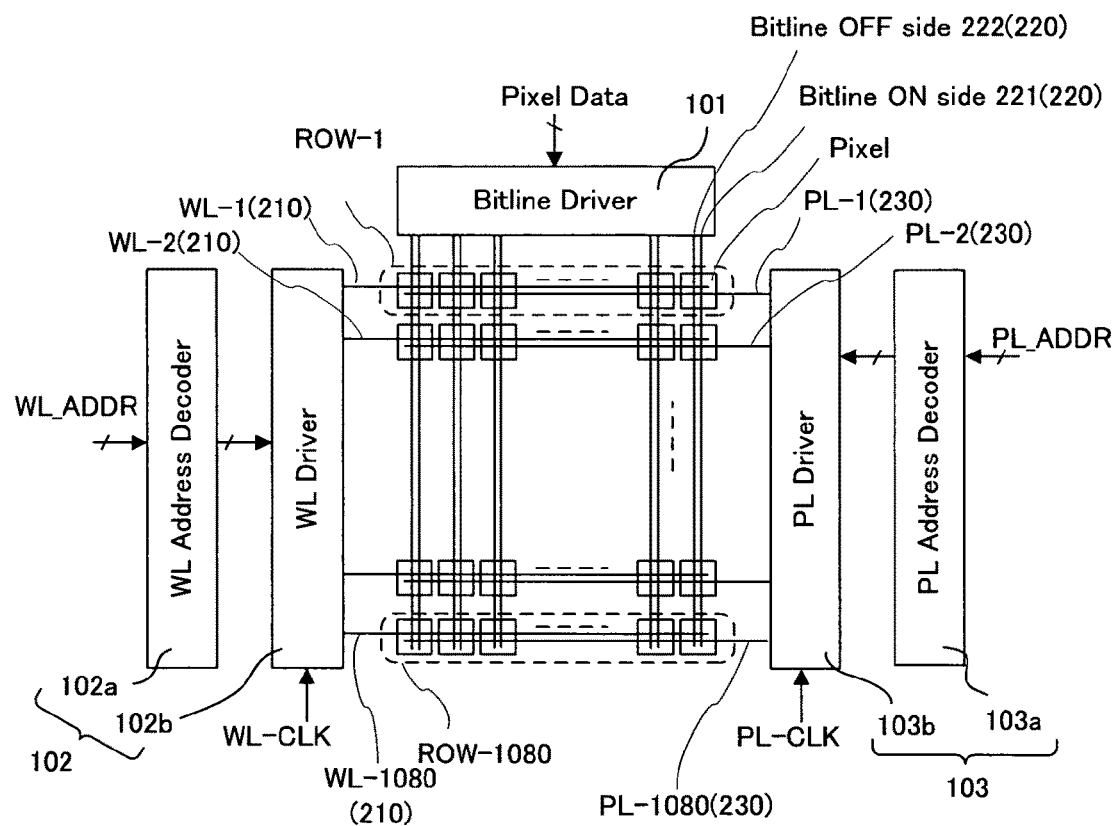
FIG. 8 is a diagram showing an exemplary configuration of the layout of a control circuit placed in a pixel array in which pixel units (i.e., mirror elements) are arrayed.

FIG. 8 shows an exemplary configuration of the layout of a control circuit placed in a pixel array in which pixel units (i.e., mirror elements 700) are arrayed. As exemplified in FIG. 8, a bit line driver unit 101, a word line driver unit 102 and a plate line driver unit 103 are placed on the circumference of the pixel array.

The word line driver unit 102 comprises a word line address decoder 102*a* and a word line driver 102*b*, which are used for selecting a word line 210 (WL). Furthermore, the plate line driver unit 103 comprises a plate line driver 103*b* and a plate line address decoder 103*a*, which are used for selecting a plate line 230 (PL).

Each pixel unit is connected to the bit line 221 and bit line 222 of the bit line driver unit 101 (Bitline driver). Data from the bit lines 220 (i.e., bit lines 221 and 222) is written to the pixel units belonging to a ROW line selected through the word line 210 (WL).

The word line 210 (WL) is selected when external serial data of WL_ADDR is converted into parallel data at the word line address decoder 102*a* (WL Address Decoder) and the parallelized data is converted into a necessary voltage at the word line driver 102*b*.

Furthermore, the plate electrodes (i.e., the surface electrodes 721*a* and 721*b*) are controlled separately from the word line 210 (WL) through the plate line 230 (PL). The plate line 230 (PL) is selected when external serial data of PL_ADDR is converted into parallel data at the plate line address decoder 103*a* (PL Address Decoder) and the parallelized data is converted into a necessary voltage at the plate line driver 103*b* (PL Driver).

Here, the number of ROW lines comprising a plurality of pixel units lined up in horizontal one row can be configured to be, for example, 720 lines at the minimum. In this case, a data signal inputted to the memory cells M1 and M2 from each of the bit lines 221 and 222 is transmitted to one line of memory at the speed of no higher than 23 nanoseconds ("nsec").

That is, in order to process 720 ROW lines, with 256 gray scale steps for each color, by dividing a display period into four parts allocated to four colors, i.e., red (R), green (G), blue (B) and white (W), at the rate of 60 frames per second, the speed is:

1/60 [sec]/4 [division]/256 [steps of gray scale]/720 [lines]=22.6 [nsec]

Furthermore, in order to process 1080 ROW lines, with 256 gray scale steps for each color, by dividing a display period into three parts allocated to three colors, i.e., red (R), green (G) and blue (B), at the rate of 60 frames per second, the speed is:

1/60/3/256/1080=20 [nsec]

Second Embodiment

Figure 9A:
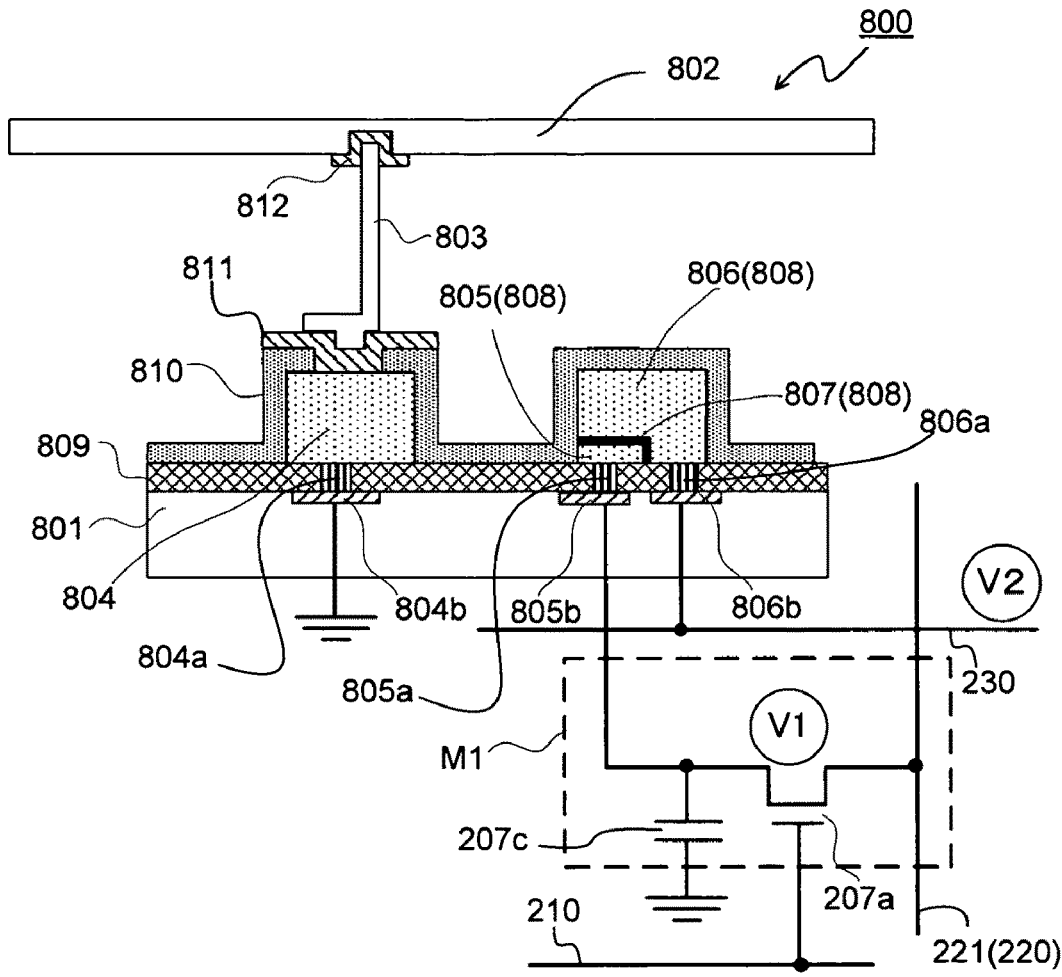
FIG. 9A is a conceptual diagram showing a cross-sectional configuration of a mirror element according to a second preferred embodiment.
Figure 9B:
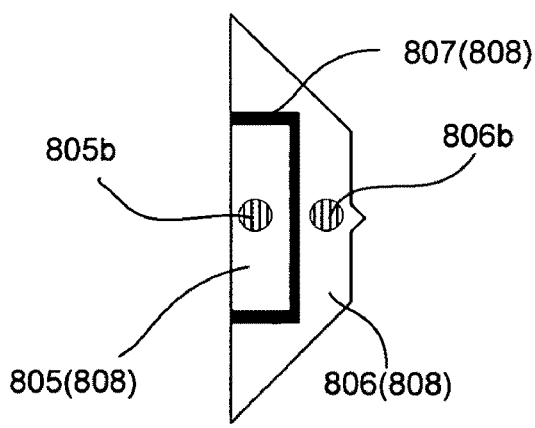
FIG. 9B is a bottom view diagram of a drive electrode included in the mirror element exemplified in FIG. 9A.

The following is a description of a mirror element according to the present embodiment. FIG. 9A is a conceptual diagram showing a cross-sectional configuration of a mirror element according to the present embodiment. FIG. 9B is a bottom view diagram of a drive electrode included in the mirror element exemplified in FIG. 9A.

Incidentally, the mirror element 700 according to the first embodiment exemplified in FIG. 7A comprises a plate electrode (i.e., an electrode not connected to memory), in addition to comprising an address electrode (i.e., an electrode connected to memory), thereby making it possible to variously change the ON/OFF operation of the mirror and attain a high level of gradation as a result.

The mirror element 800 according to the present embodiment exemplified in FIGS. 9A and 9B is similar to the mirror element 700 shown in FIG. 7A in terms of comprising the address electrode and plate electrode, whereas the mirror element 800 is different from the mirror element 700 where the former is configured to place the address electrode and plate electrode in layer, with an insulation layer (i.e., a dielectric body layer) intervening between them.

The layering of the address electrode and plate electrode makes it possible to increase the size of them, enabling an effective use of the region under a mirror. Associated with the increased size of the electrodes, the coulomb force generated between the electrode and mirror also increases, enabling a reduction in the drive voltage and a utilization of a hinge with larger restoration force. Furthermore, high efficient generation of coulomb force relative to the mirror size is enabled and therefore the configuration is effective to a miniaturization of the mirror element, leading to attaining a miniaturization of the mirror device.

The following is a description of the mirror element 800, in detail, with reference to FIGS. 9A and 9B. The first is a description of the configuration of the mirror element 800.

The mirror element 800 is configured to include a substrate 801, a mirror 802 (i.e., a movable electrode) placed oppositely to the substrate 801, an elastic hinge 803 for supporting the mirror 802 so as to be deflectable, a hinge electrode 804 (i.e., a stationary electrode) electrically connected to the mirror 802 and a drive electrode 808 (i.e., a stationary electrode) for driving the mirror 802.

The drive electrode 808 is configured to comprise a plurality of regions (i.e., parts) and to layer a lower electrode 805 (i.e., a first electrode) (i.e., a substrate-side electrode unit) and an upper electrode 806 (i.e., a second electrode) (i.e., a mirror-side electrode) together, with an insulation layer 807 (Insulator) (i.e., a dielectric body layer) intervening between the aforementioned two electrode layers. In specific, the lower electrode 805 is formed on a part of the bottom surface of the drive electrode 808, and the upper electrode 806 is so placed as to cover the lower electrode 805, with the insulation layer 807 intervening between them, as exemplified in FIGS. 9A and 9B.

In a drive electrode including a plurality of electrodes layered as described above, a mirror is controlled by means of an electric field generated by an interaction of individual electrodes. That is, a lower electrode (i.e., a first electrode) actually causes coulomb force to act on the mirror by way of an upper electrode (i.e., a second electrode).

Specifically, FIGS. 9A and 9B exemplify the configuration of only one side of the elastic hinge 803 of the configuration of the mirror element 800 in which a single drive electrode exemplified in FIG. 3B is included on the other side of the elastic hinge 803. Specifically, the other side may also be configured to include the layered drive electrode that is exemplified in FIGS. 9A and 9B. Meanwhile, the gap between the hinge electrode 804 and drive electrode 808 is desired to be no more than 0.2 µm.

The substrate 801 is equipped with a drive circuit including, for example, word lines 210, bit lines 220, plate lines 230, a ground (GND), memory and wirings, for driving the mirror 802. The substrate 801 is desired to be a silicon substrate.

A first protective layer 809 is formed on the substrate 801, and the respective electrodes (i.e., the hinge electrode 804, lower electrode 805 and upper electrode 806) are placed on the first protective layer 809. Furthermore, a second protective layer 810 is formed on the surfaces of the hinge electrode 804 and drive electrode 808. The material of the first protective layer 809 and second protective layer 810 is desired to be silicon or silicon carbide (SiC).

The drive circuit and each electrode is electrically connected by way of a Via equipped in the first protective layer 809. In specific, the hinge electrode 804 is connected to the wiring 804b of the drive circuit by way of the Via 804a. Meanwhile, the lower electrode 805 and upper electrode 806 are respectively connected to the wiring 805b and wiring 806b by way of Via 805a and Via 806a, respectively. That is, the individual electrodes are connected to respectively different drive circuits. Specifically, each electrode and Via are desired to use a material with high electric conductivity, for example, aluminum, tungsten, titanium, copper, or a silicon (Si) material possessing electrical conductivity. Furthermore, the individual electrodes and Vias may be made of respectively different materials.

The individual electrodes are respectively different wirings. The wiring 804b is connected to the GND of the drive circuit. Therefore, the potential of the hinge electrode 804 is maintained at the GND potential. The wiring 805b is connected to memory M1 constituted by gate transistor 207a and capacitor 207c. That is, the lower electrode 805 is an address electrode connected to the drive circuit including the memory, and the potential of the lower electrode 805 is controlled in accordance with the presence and absence of data written to the memory M1 through the word line 210 and bit line 220 (i.e., the first bit line 221), that is, controlled by charging and discharging of electric charge to and from the capacitor 207c. Meanwhile, the wiring 806b is connected to the plate line 230. That is, the upper electrode 806 is a plate electrode so that the potential of the upper electrode 806 is controlled independently of the memory M1.

Note that although the case of forming the lower electrode 805 on the first protective layer 809 is exemplified here, the lower electrode 805 may alternatively be formed in the first protective layer 809. That is, the Via 805 is eliminated, and the lower electrode 805 is formed in the first protective layer 809 (i.e., the Via layer) so as to connect the lower electrode 805 directly to the wiring 805b (i.e., the wiring layer). In such a configuration, the lower electrode 805 can be formed in the same production process as the Via, and the production process is simplified, if the lower electrode 805 and each Via are made of the same material (e.g., tungsten, aluminum).

The elastic hinge 803 is placed on the hinge electrode 804, and the mirror 802 is placed on the elastic hinge 803. The mirror 802 is electrically connected to the hinge electrode 804 by way of the elastic hinge 803, and therefore the potential of the mirror 802 is maintained at the same potential as that of the hinge electrode 804, that is, at the GND potential. As a result, the mirror 802 is controlled for the deflecting direction in accordance with the difference in potentials between the mirror 802 and the drive electrode 808 to which a voltage is applied. The mirror 802 is made of aluminum or a material obtained by adding about 5% of silicon (Si) to aluminum.

Incidentally, in order to attain a high speed deflecting operation of the mirror 802, the mirror 802 needs to be securely connected to the GND and also the electric resistance of the elastic hinge needs to be substantially low. That is, the elastic hinge is configured to secure a sufficient level of electric conductivity between the mirror 802 and hinge electrode 804 so as to attain a high speed operation of the mirror 802 and support it so as to be deflectable.

Such elastic hinge 803 is formed by depositing amorphous silicon by means of, for example, a chemical vapor deposition (CVD) method. Furthermore, for securing electrical conductivity, it is desirable to use, when a material such as amorphous silicon is deposited, an annealed material by applying an In-Situ doping with the group III atom and group V atom, such as boron, arsenic, phosphorus, et cetera, or a material in which a metallic silicide, such as nickel silicide (NiSi) and titanium silicide (TiSi), is diffused. Specifically, the electric conductivity is further improved if a doping process is applied with two kinds of materials, that is, boron and phosphorus. Likewise, in order to secure electric conductivity, the elastic hinge 803 is formed in the region where a part of the second protective layer 810 is removed by applying etching.

The electrical resistance of the elastic hinge 803 is desired to be no higher than 1 giga-ohms, whereas the resistance value will be higher by two to three digits if the material of the elastic hinge 803 is amorphous silicon and the above described doping process is not applied. Such a high resistance causes the mirror 802 to be electrically floated so that even if a high voltage is applied to the drive electrode 808, the difference in potentials between the mirror 802 and drive electrode 808 will not be generated. Even if a higher voltage is applied to the electrode to generate a certain level of difference in potentials, a long period of time is needed until a desired difference in potentials is generated, making it impossible to attain a high speed operation. Furthermore, if an illumination light is irradiated on the elastic hinge 803, an influence of photo-electric effect causes a current to flow in the mirror 802 through the elastic hinge 803. Consequently, in the state of the mirror 802 deflecting in the direction of the drive electrode 808 and being retained there, the difference in potentials gradually decreases, thus unable to retain the mirror 802. If the elastic hinge is made of aluminum or the like, the electrical resistance is very small. However, such an elastic hinge 803 is faced with deterioration due to metallic fatigue and the like, making it inferior in durability. Therefore, the use of a material with good mechanical strength such as silicon (Si) by lowering the electrical resistance gives substantial superiority to a display device in need of a high speed operation over an extended time period.

The configuration as described above secures the electrical conductivity between the mirror 802 and hinge electrode 804 by way of the elastic hinge 803. Incidentally, if the elastic hinge 803 is made of electrically conductive silicon and if the mirror 802 and hinge electrode 804 are made of aluminum, there is a known problem called migration occurring when silicon and aluminum directly contact with each other to allow a current to flow. The phenomenon of the migration is a problem degrading the reliability of an electric connection and thus needing to be avoided. Accordingly the present embodiment is configured to form a barrier metal layer 811 between the elastic hinge 803 and hinge electrode 804, and form a barrier metal layer 812 between the elastic hinge 803 and mirror 802, thereby preventing a migration phenomenon. Specifically, the barrier metal layers 811 and 812 use, for example, titanium or the like.

FIG. 10A is a diagram for describing, in further detail, of the elastic hinge 803 of the mirror element 800 according to the present embodiment. As exemplified in FIG. 10A, the elastic hinge 803 is approximately perpendicularly placed on the barrier metal layer 811 that is provided between the elastic hinge 803 per se and hinge electrode 804. More specifically, a side surface 803a of the elastic hinge 803 is formed in an angle less than 90 degrees relative to the barrier metal layer 811. That is, the width (i.e., the left/right direction of FIG. 10A) of the elastic hinge 803 is the maximum width "h" at the part contacting with the mirror 802, with the width gradually decreasing toward the hinge electrode 804. This is a form attributable to the production method, that is, such a form is due to forming the elastic hinge 803 by means of an etching process.

Furthermore, the elastic hinge 803 and mirror 802 are connected together by the structure of the tip of the elastic hinge 803 piercing into the mirror 802. The structure of the connecting part is formed by depositing the barrier metal layer 812 and mirror 802 on the elastic hinge 803, making the production easy. Specifically, the length "d" of the part of the elastic hinge 803 piercing into the mirror 802 is configured to be less than half of the thickness t (i.e., <t/2) of the mirror 802. This configuration makes it possible to suppress, to the minimum, an influence of the aforementioned structure on the flatness of the reflecting surface of the mirror 802.

Specifically, the barrier metal layer 811 is formed only on the hinge electrode 804 in FIG. 10A, the barrier metal layer 811, however, may be formed by extending to the top surface of the second protective layer 810 as exemplified in FIG. 9A. Further in FIG. 10A, a barrier metal layer 813 is formed also between the hinge electrode 804 and Via 804a. The barrier metal layer 813 is provided for preventing a migration phenomenon occurring between the hinge electrode 804 and first protective layer 809. As such, a migration phenomenon tends to occur on the border between silicon and aluminum, the border existing nearby a Via that is the path of an electric current flowing toward the GND, and therefore a barrier metal layer may be formed for protection.

Specifically, a migration phenomenon occurring between the first protective layer 809 and hinge electrode 804, and between the second protective layer 810 and hinge electrode 804, may be prevented by using silicon carbide (SiC) for the first protective layer 809 and second protective layer 810, or by forming the hinge electrode 804 using a material obtained by mixing aluminum with silicon (Si).

FIGS. 10B and 10C is a diagram showing the exemplary modifications of the configuration for connecting the mirror 802 to the elastic hinge 803. FIG. 10B shows an exemplary configuration of connecting them by piercing the mirror 802 with only a barrier metal layer 812 that is formed on the elastic hinge 803. Meanwhile, FIG. 10C shows an exemplary configuration of piercing the mirror 802 directly with the elastic hinge 803 in lieu of going through a barrier metal layer 812. The configuration exemplified in FIG. 10C can be used if the combination of the materials between the mirror 802 and elastic hinge 803 makes it difficult to allow a migration phenomenon to occur, or if the mirror 802 is made of a material produced by mixing aluminum with silicon (Si).

As such, the forming of a barrier metal layer makes it possible to prevent a migration phenomenon occurring between silicon and aluminum while securely connecting the mirror 802 to the GND.

In the meantime, a sacrifice layer between the mirror 802 and each electrode is made of, for example, silicon dioxide (SiO2), and hydrogen fluoride and the like is used as etchant to remove a sacrifice layer, in the production of the mirror element 800.

The first protective layer 809 and second protective layer 810 protect the electrode and drive circuit, which are formed with aluminum or the like, from the etchant, in addition to functioning as insulation layer for preventing a shorting. The respective parts of the first protective layer 809 and second protective layer 810 are removed by etching and electric conductive members (e.g., Vias and barrier metals) are embedded in the aforementioned layers in order to secure electric connection straddling the layers.

In such a structure, a border surface straddling protective layers is actually formed between the protective layers (i.e., first protective layer 809 and second protective layer 810) and electric conductive members. Consequently, there is a possibility of failure occurring in the electrode and drive circuit resulting from etchant invading into the inside from the border surface.

Accordingly, the following is a description of a method for securing sufficient electrical conductivity in a part of the protective layer without needing to form a border surface straddling protective layers by means of etching, et cetera.

Figure 11:
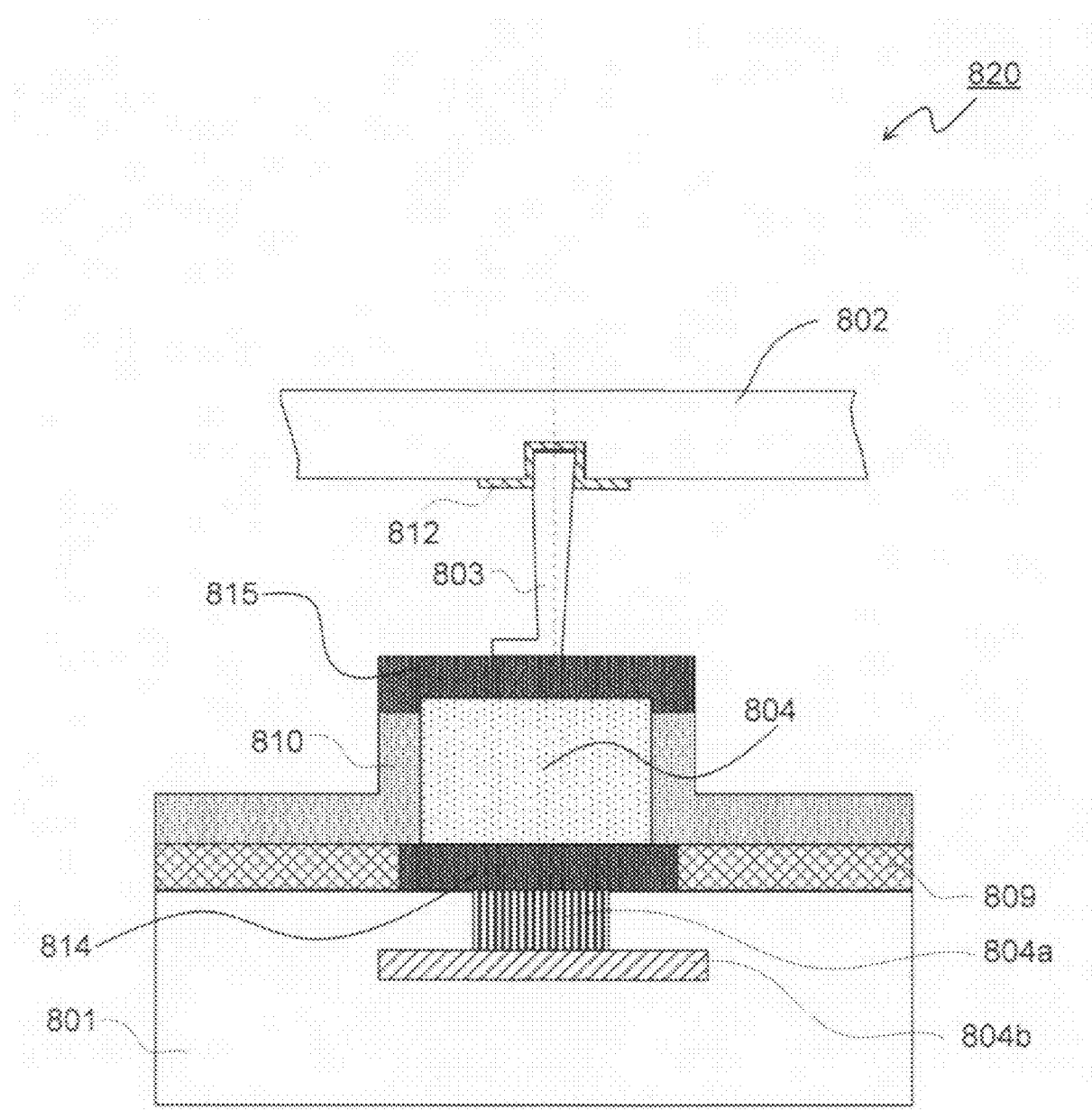
FIG. 11 is a diagram for describing the configuration of an exemplary modification of a mirror element according to the second embodiment.

FIG. 11 is a diagram for describing the configuration of an exemplary modification of a mirror element according to the present embodiment. The mirror element 820 according to the present exemplary modification is configured to apply a doping process to a part of a protective layer (i.e., a semiconductor material layer) with an electric conductive impurity, thereby causing a part of the protective layer to possess electrical conductivity.

The following is a description of the configuration of the mirror element 820 according to the present exemplary modification with reference to FIG. 11. The mirror element 820 exemplified in FIG. 11 differs from the mirror element 800 exemplified in FIG. 10A in the following two aspects.

The first aspect is the structure of the part connecting the elastic hinge 803 (i.e., the first conductive layer) to the hinge electrode 804 (i.e., the second conductive layer). In the mirror element 800 of FIG. 10A, a part of the second protective layer 810 (i.e., the semiconductor material layer) on the hinge electrode 804 is etched. Then, the elastic hinge 803 and hinge electrode 804 are connected together by way of the barrier metal layer 811 that is formed in the etched region. In contrast, the second protective layer 810 (i.e., the semiconductor material layer) on the hinge electrode 804 is not etched for the mirror element 820 exemplified in FIG. 11. Instead, the entirety of the top surface of the hinge electrode 804 is formed as a doping region 815 by means of a later described method, and the elastic hinge 803 and hinge electrode 804 are electrically connected together by way of the doping region 815.

The second aspect is the structure of the part connecting the hinge electrode 804 (i.e., the first conductive layer) and Via 804a (i.e., the second conductive layer). In the mirror element 800 shown in FIG. 10A, a part of the first protective layer 809 (i.e., the semiconductor material layer) is etched. Then, the hinge electrode 804 and Via 804a are connected together by way of the barrier metal layer 811 that is formed in the etched region. In contrast, in the mirror element 820 exemplified in FIG. 11, the first protective layer 809 (i.e., the semiconductor material layer) is not etched. Instead, the entirety of the part between the hinge electrode 804 (i.e., the first conductive layer) and Via 804a (i.e., the second conductive layer), of the first protective layer 809, is formed as a doping region 814, and the hinge electrode 804 and Via 804a are electrically connected together by way of the doping region 814.

The other configurations are common between the mirror element 800 and mirror element 820. Therefore, a description of the mirror element 820 for the part common with the mirror element 800 is not provided here. Note that FIG. 11 exemplifies only the vicinity of the hinge electrode 804, of the mirror element 820.

Such doping regions (i.e., the doping region 814 and doping region 815) having electrical conductivity are formed in the following process.

First, a semiconductor material layer constituted by silicon (Si) or silicon carbide (SiC) is forms as a protective layer by means of a method similar to the case of FIG. 10A (process of forming protective layer).

Next, the electric conductive impurity are ion-injected, with energy of tens [keV] to hundreds [keV], to a region of the semiconductor material layer requiring conductivity. In this event, the doping region (that is the region to which the electric conductive impurity are ion-injected) is determined to be the same size as, or larger than, a region where the first conductive layer contacts with the doping region and also the same size as, or larger than, a region where the second conductive layer contacts with the doping region as exemplified in FIG. 11. The reason is there is a possibility that an electrical characteristic may be unstable at the border between the doping region and not-doped region of the semiconductor material layer (i.e., the protective layer). The forming of a doping region rather widely makes it possible to secure a stable electrical connection between the first conductive layer and second conductive layer. Furthermore, if a wider doping region is taken, a mask which is used for ion-injecting the electric conductive impurity into a desired region can be made easily. Note that the electric conductive impurity for doping may use either a P-type group III atom (e.g., boron and aluminum) or an N-type group V atom (e.g., arsenic, phosphorus and antimony) (doping process).

Then, the electric conductive impurity are activated by applying an annealing process at a temperature (e.g., in the range of 400 and 450 degrees C.) that does not melt aluminum that is used for electrodes and wirings (annealing process). Specifically, it is desirable to form, using a material containing aluminum, at least either of conductive layers that are adjacent to the semiconductor material layer, and apply the annealing process under the gaseous environment containing hydrogen. This process alloys silicon in the semiconductor material layer with aluminum in the conductive layer, thereby obtaining a good ohmic property. Further, the process terminates the unattached hands between Si and SiO2 with H2, thereby stabilizing the interfacial property.

The above described processes form a doping region having electrical conductivity with the resistance value no larger than ones giga-ohms on the semiconductor material layer (i.e., the protective layer). As described already, the resistance value between the mirror 802 (i.e., the movable body) and drive circuit (i.e., the wiring 804b) is desired to be no higher than 1 giga-ohms in order to attain a high speed operation of the mirror 802. Therefore, the resistance value of the doping region is also desired to be no higher than 1 giga-ohms.

The distribution of impurity atoms within a doping region is determined by conditions such as the mass of injected ion, the injection energy and the temperature of heat treatment. Therefore, the density of the electric conductive impurity in the doping region is set at no lower than $10^{16}/cm^3$, and thereby the resistance value can be decreased to no higher than 1 giga-ohms. Meanwhile, if the resistance value cannot be reduced to a sufficient level due to a temperature limitation of a heat treatment, a plurality of doping regions is provided and connected together, and thereby the combined resistance value is reduced to no higher than 1 giga-ohms. Further, if the resistance value between the mirror 802 and wiring 804a cannot be reduced to a sufficient level due to a limitation in the size of a Via 804a adjacent to the doping region, a combined resistance value may be reduced by providing a plurality of doping regions.

Figure 12A:
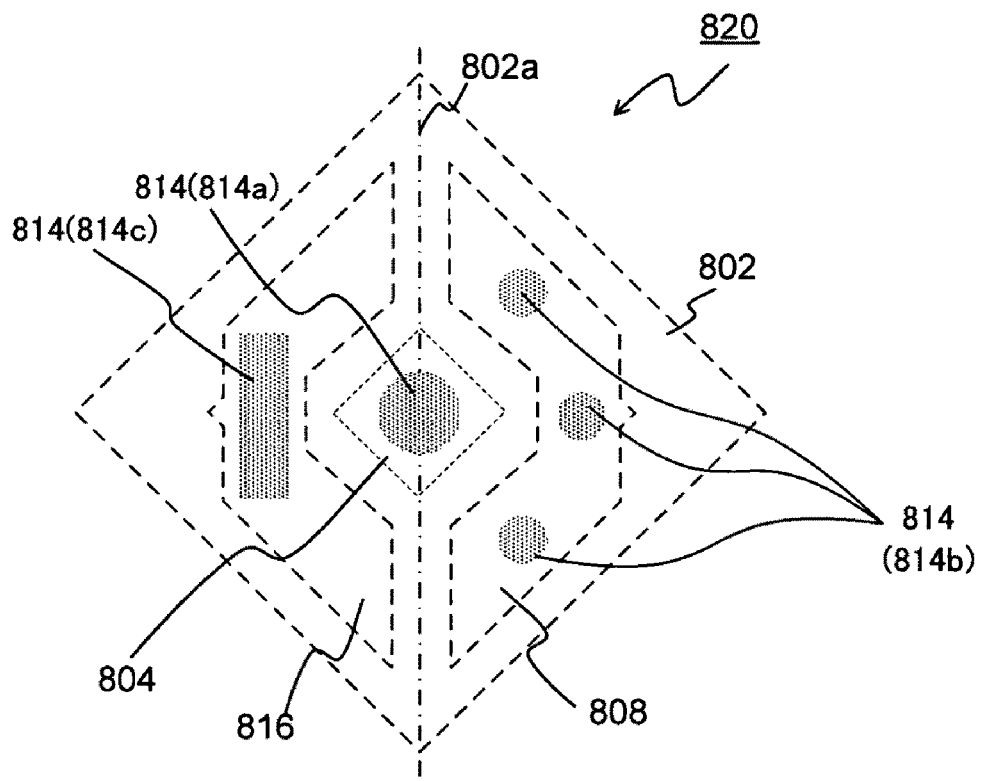
FIG. 12A is a top view diagram of a mirror element according to the second embodiment, with upper layers than a first protective layer removed.
Figure 12B:
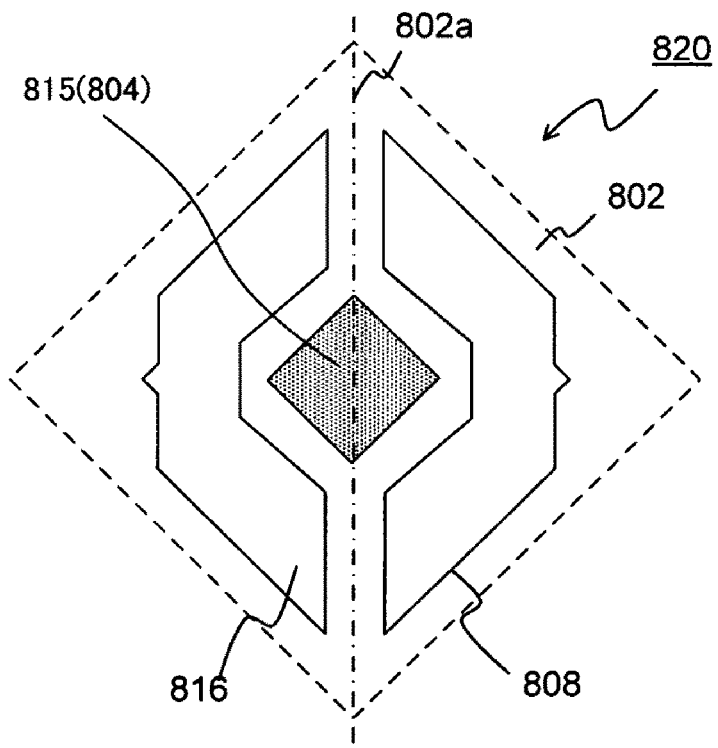
FIG. 12B is a top view diagram of a mirror element according to the second embodiment, with upper layers than a second protective layer removed.

FIGS. 12A and 12B are top view diagram of a mirror element 820 according to the present exemplary modification. FIG. 12A shows the state with upper layers than the first protective layer 809 removed. FIG. 12B shows the state with upper layers than the second protective layer 810 removed. Note that FIG. 12A indicates the forms of the mirror 802 and individual electrodes with dotted lines. FIG. 12B indicates the form of the mirror 802 with dotted lines.

The utilization of the method for securing an electric connection between the electric conductive layers adjacent to the above described semiconductor material layer by applying a doping process to a part of the semiconductor material layer with the electric conductive impurity is not limited to utilizing for the protective layers between the elastic hinge 803, hinge electrode 804 and Via 804a. The method can also be similarly utilized for the protective layer (i.e., the semiconductor material layer) between the drive electrodes (i.e., the drive electrode 808 and drive electrode 816) and Via. In the meantime, although the elastic hinge 803 and mirror 802 (i.e., the movable body) are connected together with the barrier metal layer 812 intervening between them, the barrier metal layer 812 may be eliminated by applying the above described method.

That is, between the mirror 802 and elastic hinge 803, between the elastic hinge 803 and hinge electrode 804, between the hinge electrode 804 and the drive circuit, and between the drive electrode and the drive circuit, can respectively be electrically interconnected with a semiconductor material layer intervening there-in-between, without forming a border surface straddling the semiconductor material layer.

FIG. 12A exemplifies the cases of forming: one spot of a circular doping region 814a in the region of the first protective layer 809, where the hinge electrode 804 is adjacent to; three spots of circular doping regions 814b in the region of the first protective layer 809, where the drive electrode 808 is adjacent to; and one spot of a rectangular doping region 814c in the region of the first protective layer 809, where the drive electrode 816 is adjacent to. If a plurality of electrodes is layered, such as the drive electrode 808, an alternative configuration may be such that one doping region 814b, of a plurality of doping regions, is connected to the lower electrode 805, with the remaining doping regions connected to the upper electrode 806. As another option, the number of doping regions to be formed may be different between the drive electrodes on the left and right sides (i.e., the drive electrodes 808 and 816). Incidentally, Vias (not shown in a drawing herein) are formed under the respective doping regions 814. FIG. 12B exemplifies the case of forming a doping region 815 in the region of the second protective layer 810, where the hinge electrode 804 is adjacent to.

Specifically, in FIGS. 12A and 12B, the rectangular hinge electrode 804 is so placed as to align the diagonal line of the hinge electrode 804 with the deflection axis of the mirror 802. That is, the hinge electrode 804 shown in FIGS. 12A and 12B is placed with 45 degrees rotated relatively to the hinge electrode 804 exemplified in FIGS. 7B through 7D. The placing of the hinge electrode 804 as described above makes it possible to form a larger size of the drive electrodes (i.e., the drive electrodes 808 and 816).

As described above, the applying of the doping to a part of the semiconductor material layer that is formed between two electric conductive layers (i.e., the first conductive layer and second conductive layer) with the electric conductive impurity makes it possible to electrically connect two conductive layers together without a need to form a border surface straddling the semiconductor material layer. That is, the first conductive layer and second conductive layer of a structural body constituted by the first conductive layer, second conductive layer and semiconductor material layer are electrically connected together by the doping region, and thereby the structural body comes to possess electrical conductivity as a whole. As a result, the first conductive layer and second conductive layer are controlled under the same electric potential.

As such, maintaining the semiconductor material layer as a seamless structure, while securing the electric conductivity, makes it possible to prevent an invasion of etchant by way of the above described border surface and prevent a failure associated with the invasion.

Next is a description of the circuit configuration of the mirror element 800 according to the present embodiment. Note that the circuit configuration described below can also be used as that of the mirror element 820 that is an exemplary modification of the mirror element 800.

Figure 13:
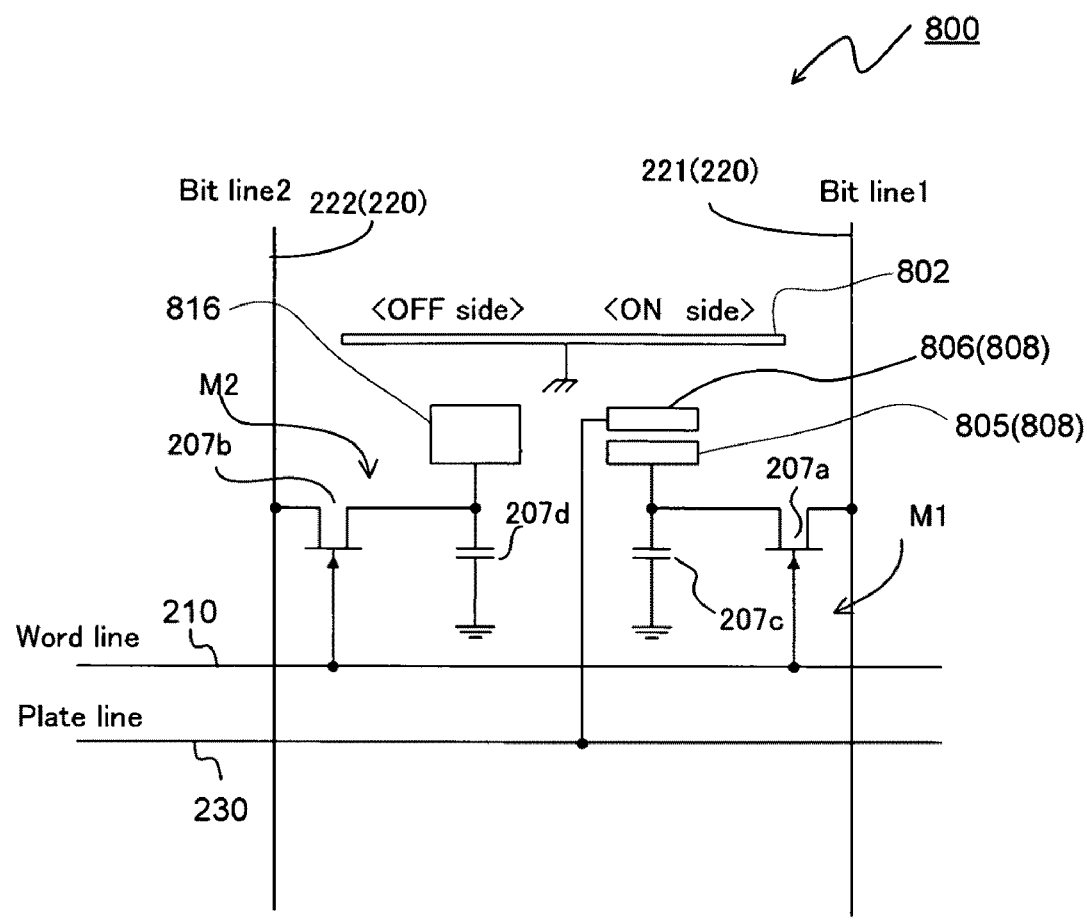
FIG. 13 is a conceptual diagram showing an exemplary circuit configuration of a mirror element according to the second embodiment.

FIG. 13 is a conceptual diagram showing an exemplary circuit configuration of a mirror element 800 according to the present embodiment.

The mirror element 800 according to the present embodiment has an electrode structure that only the ON-side drive electrode 808 is layered.

Of the ON-side drive electrode 808, an ON capacitor 207c is connected to the lower electrode 805 (i.e., a first electrode), and the ON capacitor 207c is connected to a bit line 221 by way of a gate transistor 207a constituted by a field effect transistor (FET) and the like. That is, the ON-side lower electrode 805 is configured as an address electrode connected to a memory cell M1 (i.e., a first drive circuit) that is constituted by the ON capacitor 207c and gate transistor 207a. Meanwhile, of the ON-side drive electrode 808, an upper electrode 806 (i.e., a second electrode) is configured to be connected to the plate line 230 (i.e., a second drive circuit) and controlled independently of the memory cell M1. That is, the ON-side upper electrode 806 is configured as a plate electrode.

An OFF capacitor 207d is connected to the OFF-side drive electrode 816, and the OFF capacitor 207d is connected to a second bit line 222 (220) by way of a gate transistor 207b constituted by an FET and the like. That is, the OFF-side drive electrode 816 is configured as an address electrode connected to a memory cell M2 that is constituted by the OFF capacitor 207d and gate transistor 207b.

Note that, in a plurality of mirror elements 800, the lower electrodes 805 are connected to individually different memory cells M1 and memory cells M2. In contrast, the upper electrode 806 is connected to a plate line 230 that is commonly provided for a plurality of mirror elements 800 lined up with the same ROW lines.

The following is a description of the operation of the circuit configuration exemplified in FIG. 13. As described for the first embodiment, a use of a plate electrode in addition to using the address electrode makes it possible to attain an ON/OFF control and an oscillation control in a shorter interval than one time-slot (i.e., the minimum interval in which the potentials of an address electrode change). The control performed in a shorter interval than one time-slot using the plate electrode can also be implemented for a mirror element 800 including a drive electrode in which an address electrode and a plate electrode are layered as exemplified in FIG. 13.

Incidentally, the potential at which each electrode can be positioned (that is, voltages that can be applied; noted as "possible potential" hereinafter) are as follows. The possible potential for the address electrodes (i.e., the lower electrode 805 and drive electrode 816) is either of the potentials (i.e., a predetermined potential) of H level and L level. The possible potential for the plate electrode (i.e., the upper electrode 806) is, in addition to the potential of H level or L level (i.e., a predetermined potential), high impedance Hiz (i.e., floating). "L level" means a potential not generating coulomb force between the electrode and mirror 802, creating a state of, for example, the same potential as that of the mirror (e.g., 0 volts and GND potential). "High impedance Hiz (i.e., floating)" is a third state of potential, neither H level nor L level, that is, a state of an electrode electrically floating.

In the mirror element 800 in which the upper electrode 806 is a plate electrode, an address electrode that is the lower electrode 805 (i.e., the first electrode) causes the mirror 802, by way of the plate electrode (i.e., the upper electrode 806) (i.e., the second electrode), to function with coulomb force. Therefore, controlling the potential of the plate electrode (i.e., the upper electrode 806) makes it possible to change over between a state in which a electric field generated in the address electrode (i.e., the lower electrode 805) is shut off by the plate electrode (i.e., the upper electrode 806) and a state in which the aforementioned electric field is transmitted to the mirror 802. In specific, setting the potential of the upper electrode 806 at L level shuts off the electric field generated at the lower electrode 805. That is, a change defined as shutting off an electric field occurs. Setting the potential of the upper electrode 806 at the high impedance Hiz (i.e., floating) transmits the electric field generated in the lower electrode 805. That is, a change defined as releasing the shut-off electric field occurs. Incidentally, in this event, the electric field generated in the lower electrode 805 is transmitted to the upper electrode 806 so that the field acts on the mirror from the entirety of the surface of the upper electrode 806. Therefore, the electric field generated in the lower electrode 805 can be efficiently functioned to the mirror without being affected by the size of the lower electrode 805. Furthermore, setting the potential of the upper electrode 806 at H level makes it possible to transmit the electric field generated in the lower electrode 805 by amplifying the field.

That is, the changing of the potentials of the plate electrode (i.e., the upper electrode 806) (i.e., the second electrode) through the plate line 230 (i.e., the second drive circuit) makes it possible to change the field formed by the address electrode (i.e., the lower electrode 805) (i.e., the first electrode) controlled by the memory M1 (i.e., the first drive circuit), thereby enabling the control of the mirror.

As described above, the action of the address electrode (i.e., the lower electrode 805) to the mirror 802 is controlled through the plate electrode (i.e., the upper electrode 806), and thereby the control of the mirror can be attained in a shorter interval than one time-slot (i.e., the minimum interval in which the potentials of the first electrode are changed), in the mirror element 800.

The following are specific descriptions with reference to FIGS. 14A, 14B, 14C, 14D and 14E, FIGS. 15A, 15B and 15C.

FIGS. 14A through 14E are timing charts showing an exemplary function of the circuit configuration exemplified in FIG. 13. FIGS. 14A through 14E exemplify the case of adjusting a period (that is, adjusting the volume of light), in which the mirror 802 is in the ON state, in a shorter interval than one time-slot using a plate electrode, thereby attaining a high grade of gradation.

Note that FIGS. 14A through 14E exemplify the case of constituting one frame (i.e., one screen) of each color by a plurality of subfields 250 (i.e., a first subfield 251, a second subfield 252 and a third subfield 253).

Figure 14A:
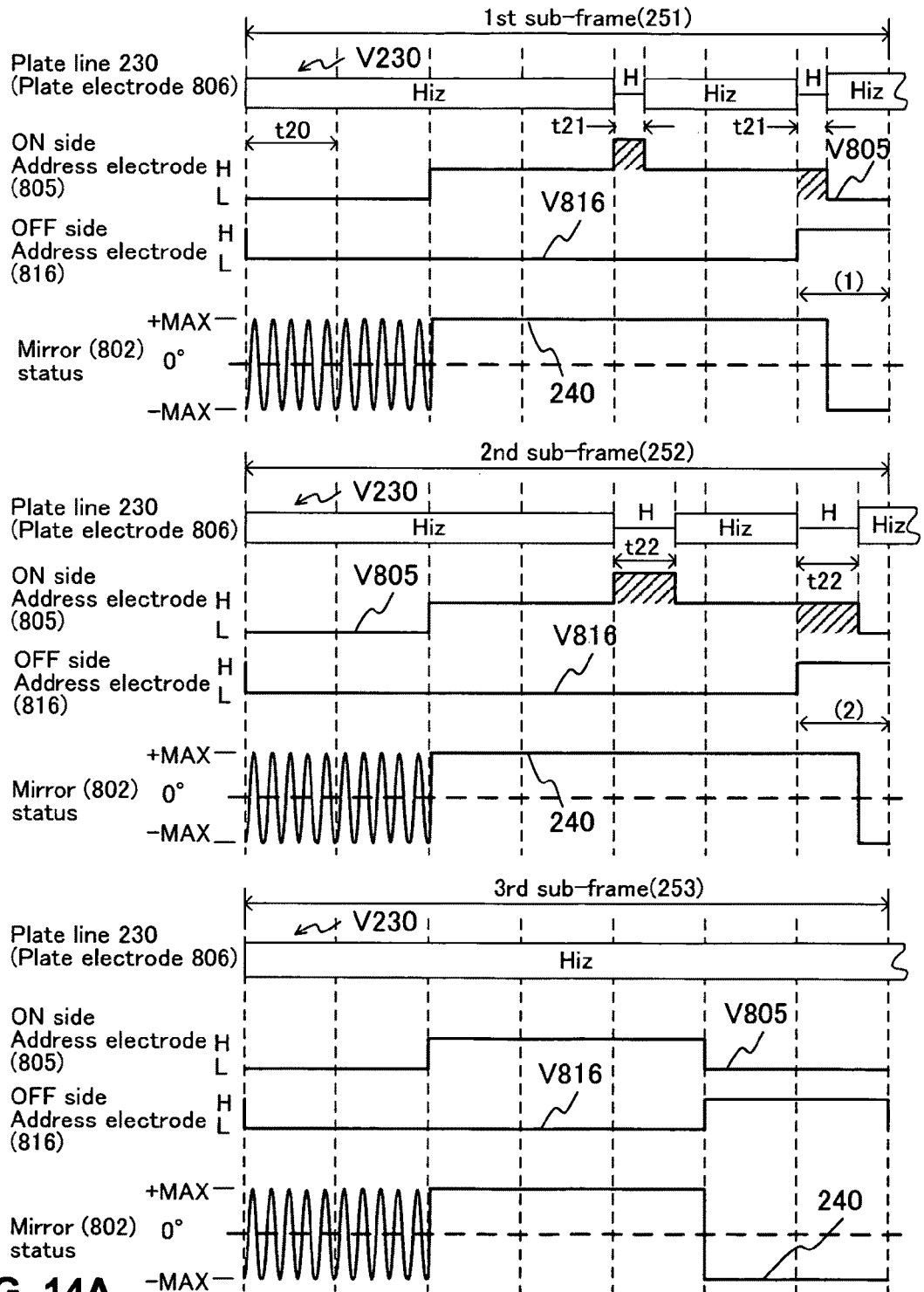
FIG. 14A is a timing chart showing an exemplary function of the circuit configuration of a mirror element according to the second embodiment.

FIG. 14A shows that, even when an OFF-side address electrode potential V816 and an ON-side address electrode potential V805 (i.e., the potential of the first electrode) are changed from (L, H) to (H, L) in the mirror element 800 that is in the ON state, the ON state (+MAX) of the mirror 802 is maintained for a predetermined period by setting a plate electrode potential V230 at H level.

Incidentally, the plate electrode potential V230 is always set at the high impedance (Hiz) when the potential is not at H level so that the operation of the mirror is controlled by the potential of the address electrode.

Furthermore, the cross-hatched part of the ON-side address electrode potential V805 shows the influence of the plate electrode potential V230. The ON-side address electrode (i.e., the lower electrode 805) and plate electrode (i.e., the upper electrode 806) are layered together, with the insulation layer 807 intervening between them, and therefore the two electrodes constitute a capacitor. This state can be regarded as a state in which an inter-electrode capacitor, which is constituted by the intervention of the insulation layer 807, and the capacitor 207c of the address electrode are serially connected together. Therefore, a change in the plate electrode potential V230 affects also the ON-side address electrode potential V805. That is, the ON-side address electrode potential V805 indicates a potential of the drive electrode 808 as a whole. In specific, when a voltage V1 is applied to the address electrode (i.e., the lower electrode 805) and a voltage V2 is applied to the plate electrode (i.e., the upper electrode 806), a potential of a voltage V3, which is determined by the ratio of the inter-electrode capacitor to the capacitor 207c and which is different from the voltages V1 and V2, is generated. Specifically, the capacitance of the inter-electrode capacitor constituted by the address electrode (i.e., the lower electrode 805) (i.e., the first electrode) and by the plate electrode (i.e., the upper electrode 806) (i.e., the second electrode) is smaller than the capacitance of the capacitor 207c constituting the memory M1 that is connected to the address electrode.

The light volume obtained during the maintaining period using the plate electrode ((i.e., the upper electrode 806) is controlled to be smaller than the light volume obtained by an oscillation control (OSC control) in one time-slot, and also to be respectively different for the first subfield 251 and second subfield 252, and thereby a larger number of steps of gray scale can be attained.

In the respective of the first subfield 251 and second subfield 252, the periods of the plate electrode potential V230 being controlled to be H level (i.e., a predetermined potential) (that is, the maintaining period through the plate electrode) are a period t21 and a period t22, respectively, (where the period t21<period t22<time slot t20). That is, the period in which the plate electrode potential V230 is controlled to be H level (i.e., a predetermined potential) is shorter than one time-slot.

The period t21 of the first subfield 251 is set at a period in which a light volume is a quarter (¼) of the light volume obtained in one time-slot of an oscillation control (OSC control) (noted as "¼ OSC" hereinafter). Further, the period t22 of the second subfield 252 is set at a period for obtaining a ½ OSC. That is, in the first subfield 251, the light volume is increased by a ¼ OSC compared to the case of only ON/OFF-controlling the address electrode (refer to (1) indicated in FIG. 14A). In the second subfield 252, the light volume is increased by a ½ OSC compared to the case of only ON/OFF-controlling the address electrode (refer to (2) indicated in FIG. 14A). Incidentally, the light volume obtained in one time-slot of an ON/OFF control (i.e., a PWM control) is noted as "1 PWM".

A period for setting the plate electrode potential V230 at H level is designated every other time slot during the ON/OFF control period. This configuration makes it possible to selectively utilize a control of changing over a mirror instantly to the OFF state (−MAX) without maintaining it in the ON state (+MAX) using the plate electrode and a control of maintaining the mirror in the ON state (+MAX) using the plate electrode. Specifically, in the last third subfield 253, a period for setting the plate electrode potential V230 at H level is not provided. As described later, adjusting the number of time slots for maintaining the ON period in the third subfield 253 makes it possible to correct the difference from a desired light volume (i.e., the level of gradation), the difference attributable to providing the above described period in every other time slot. As such, the plate electrode potential V230 is repeatedly changed in a certain pattern.

Figure 14B:
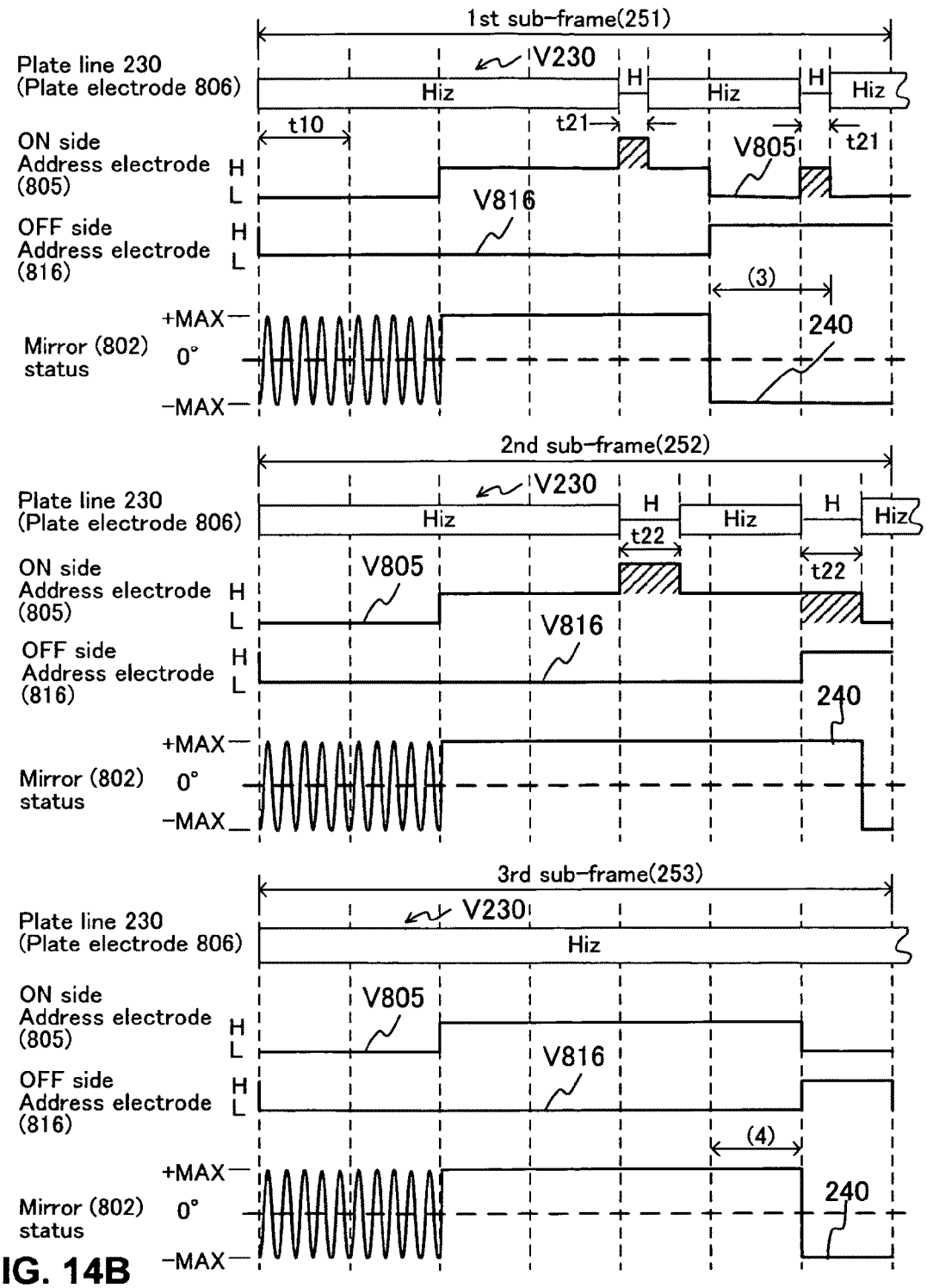
FIG. 14B is a timing chart showing another exemplary function of the circuit configuration of a mirror element according to the second embodiment.

FIG. 14B exemplifies the case of reducing the number of gray scale levels by the light volume equivalent to ¼ OSC starting from the example of FIG. 14A.

If the OFF-side address electrode potential V816 and an ON-side address electrode potential V805 are changed over from (L, H) to (H, L) earlier by one time-slot during the ON/OFF control period of the first subfield 251 shown in FIG. 14A, the light volume is reduced in the amount of 1 PWM+¼ OSC in the first subfield 251 (refer to (3) indicated in FIG. 14B).

Accordingly, the ON period in the third subfield 253 is extended by the equivalence of one time-slot, and the light volume is increased by the equivalence of 1 PWM (refer to (4) indicated in FIG. 14B). This operation makes it possible to attain a reduced light volume by ¼ OSC in the entirety of one frame.

Figure 14C:
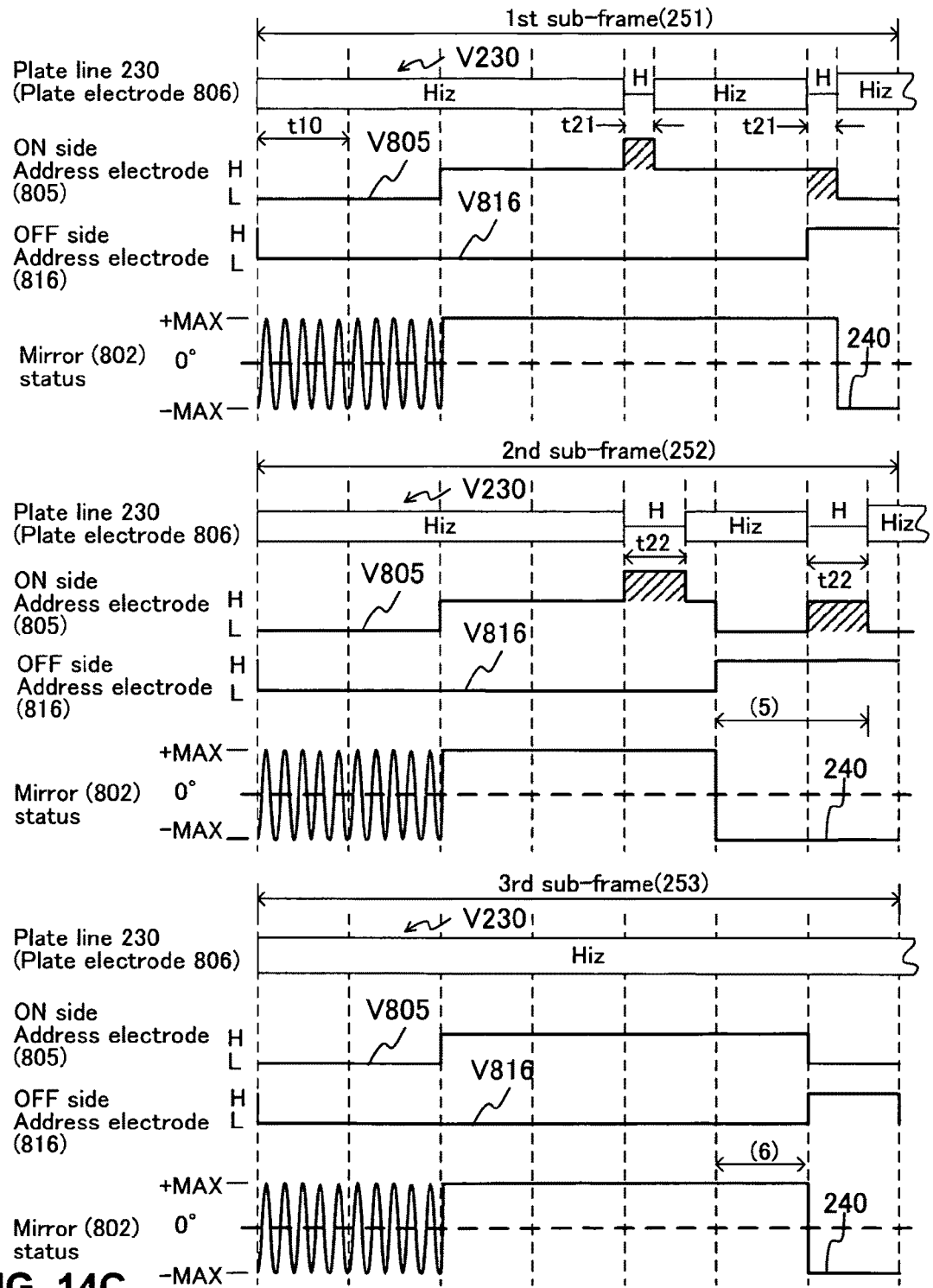
FIG. 14C is a timing chart showing yet another exemplary function of the circuit configuration of a mirror element according to the second embodiment.

FIG. 14C exemplifies the case of reducing the number of gray scale levels by the light volume equivalent to ½ OSC starting from the example of FIG. 14A.

If the OFF-side address electrode potential V816 and an ON-side address electrode potential V805 are changed over from (L, H) to (H, L) earlier by one time-slot during the ON/OFF control period of the second subfield 252 shown in FIG. 14A, the light volume is reduced in the amount of 1 PWM+½ OSC in the second subfield 252 (refer to (5) indicated in FIG. 14C).

Accordingly, the ON period in the third subfield 253 is extended by the equivalence of one time-slot, and the light volume is increased by the equivalence of 1 PWM (refer to (6) indicated in FIG. 14C). This operation makes it possible to attain a reduced light volume by ½ OSC in the entirety of one frame.

Figure 14D:
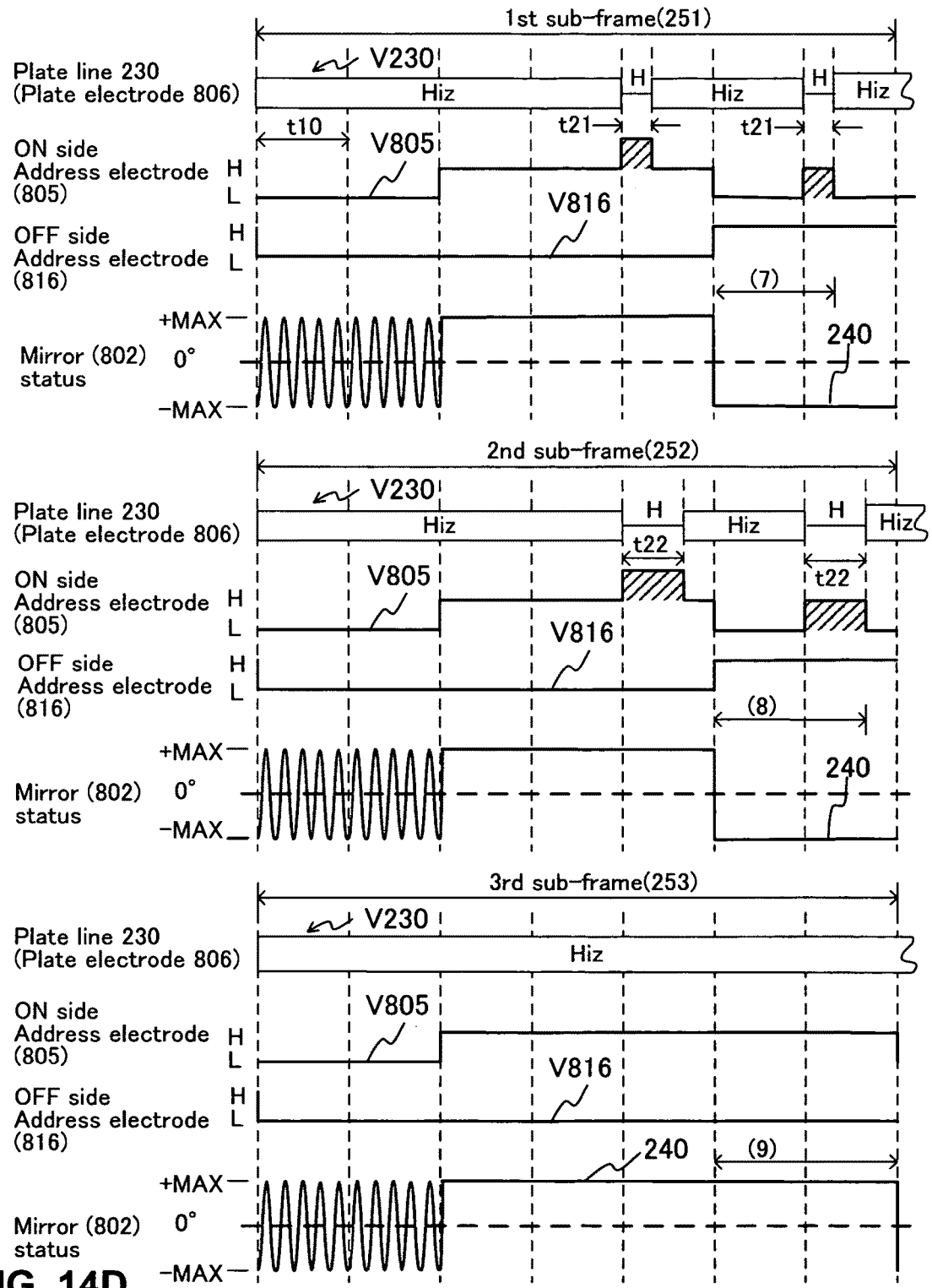
FIG. 14D is a timing chart showing yet another exemplary function of the circuit configuration of a mirror element according to the second embodiment.

FIG. 14D exemplifies the case of reducing the number of gray scale levels by the light volume equivalent to ¾ OSC starting from the example of FIG. 14A.

If the OFF-side address electrode potential V816 and an ON-side address electrode potential V805 are changed over from (L, H) to (H, L) earlier by one time-slot during the ON/OFF control period of the first subfield 251 and second subfield 252 shown in FIG. 14A, the light volume is reduced in the amount of 1 PWM+¼ OSC in the first subfield 251 (refer to (7) indicated in FIG. 14D) and 1 PWM+½ OSC in the second subfield 252 (refer to (8) indicated in FIG. 14D). That is, the light volume is reduced by a total of 2 PWM+¾ OSC.

Accordingly, the ON period in the third subfield 253 is extended by the equivalence of two time-slots, and the light volume is increased by the equivalence of 2 PWM (refer to (9) indicated in FIG. 14D). This operation makes it possible to attain a reduced light volume by ¾ OSC in the entirety of one frame.

Figure 14E:
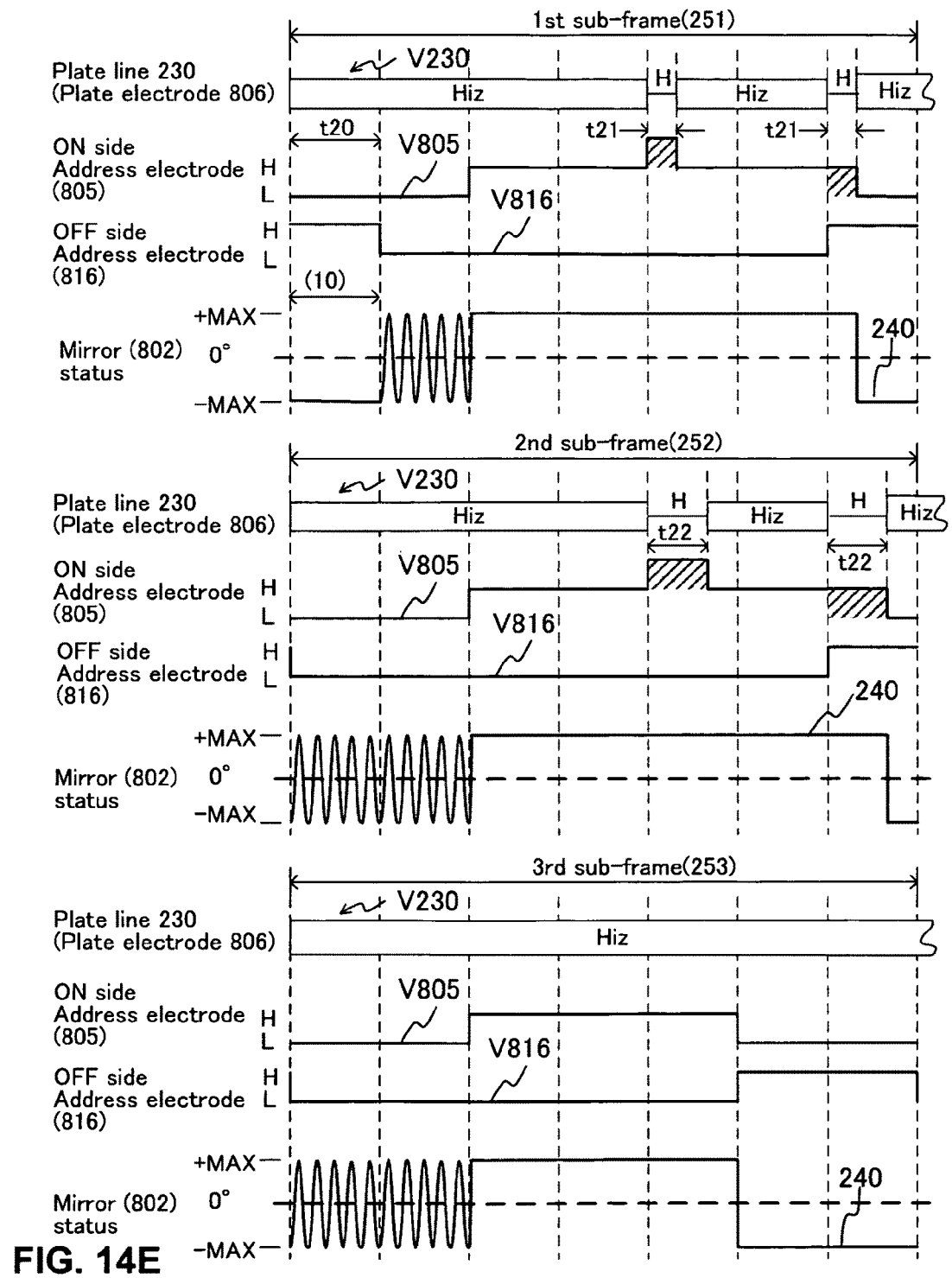
FIG. 14E is a timing chart showing yet another exemplary function of the circuit configuration of a mirror element according to the second embodiment.

FIG. 14E exemplifies the case of reducing the number of gray scale levels by the light volume equivalent to 1 OSC starting from the example of FIG. 14A.

The OFF-side address electrode potential V816 and an ON-side address electrode potential V805 are changed over from (H, L) to (L, L) later by one time-slot during the oscillation control period of the first subfield 251 shown in FIG. 14A. With this operation, an oscillation start is delayed by one time-slot and the light volume is reduced in the amount of 1 OSC in the first subfield 251 (refer to (10) indicated in FIG. 14E).

As such, the combination of light volume controls in the first subfield 251 through third subfield 253 makes it possible to designate the minimum unit (i.e., the least significant bit (LSB)) of a light volume control as ¼ OSC. That is, FIGS. 14A, 14C, 14D and 14E show the control of adjusting the light volumes by 1 LSB, 2 LSB, 3 LSB and 4 LSB, respectively, as compared to the light volume of FIG. 14A.

This control makes it possible to attain a gray scale representation four times the gray scale control by means of the ON/OFF control and oscillation control in units of time slot t20.

Figure 15A:
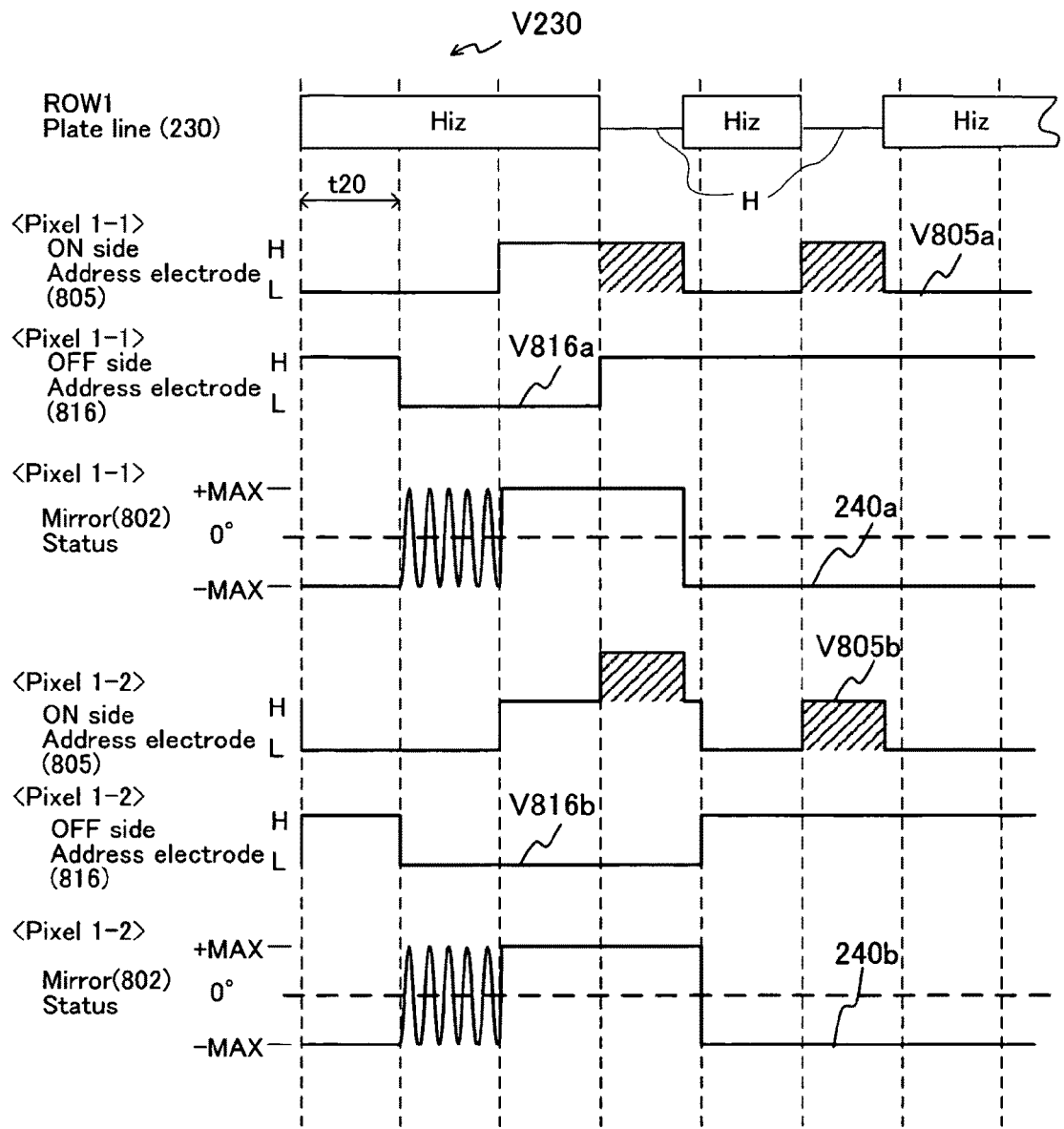
FIG. 15A is a timing chart showing yet another exemplary function of the circuit configuration of a mirror element according to the second embodiment.
Figure 15B:
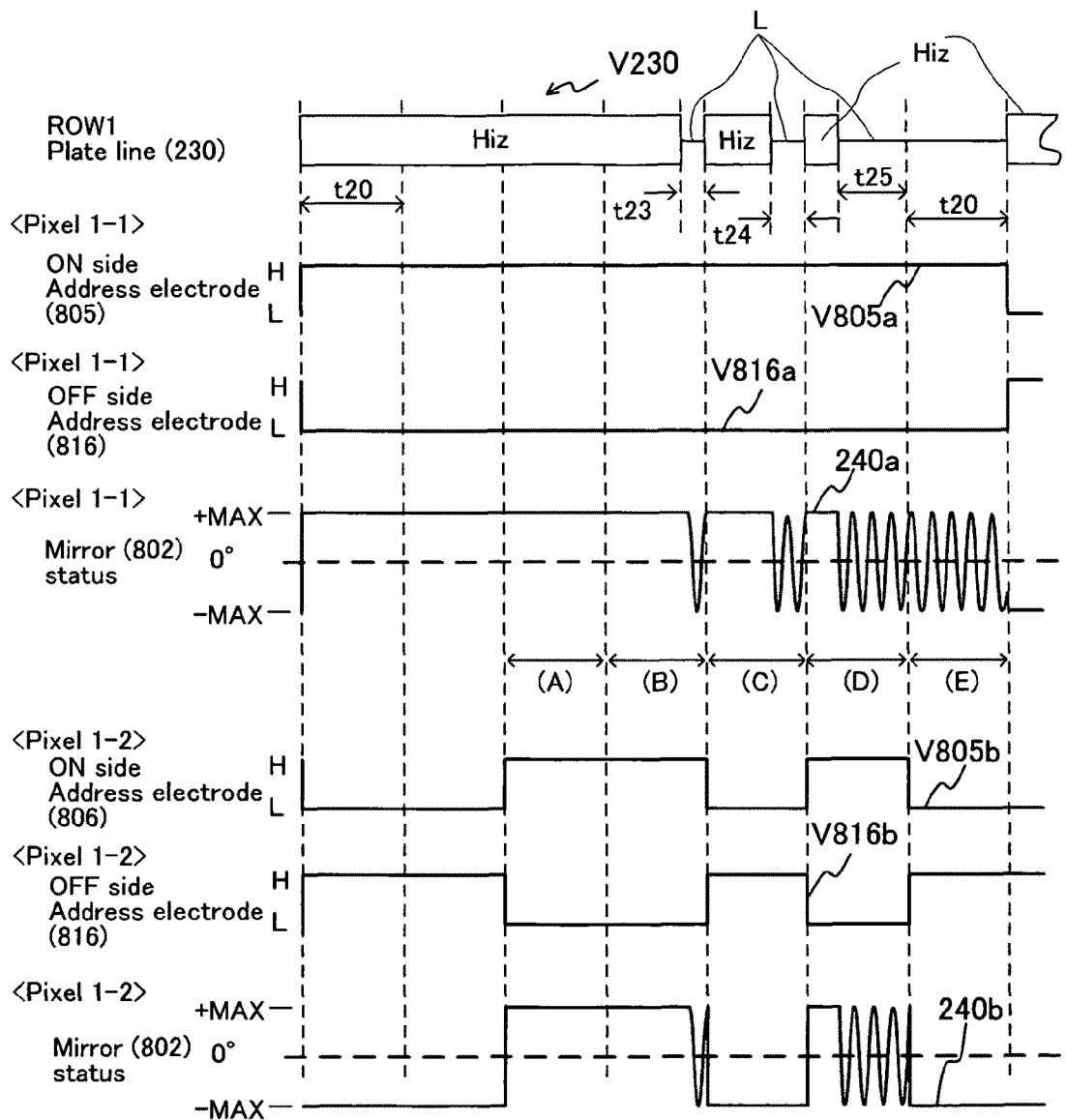
FIG. 15B is a timing chart showing yet another exemplary function of the circuit configuration of a mirror element according to the second embodiment.
Figure 15C:
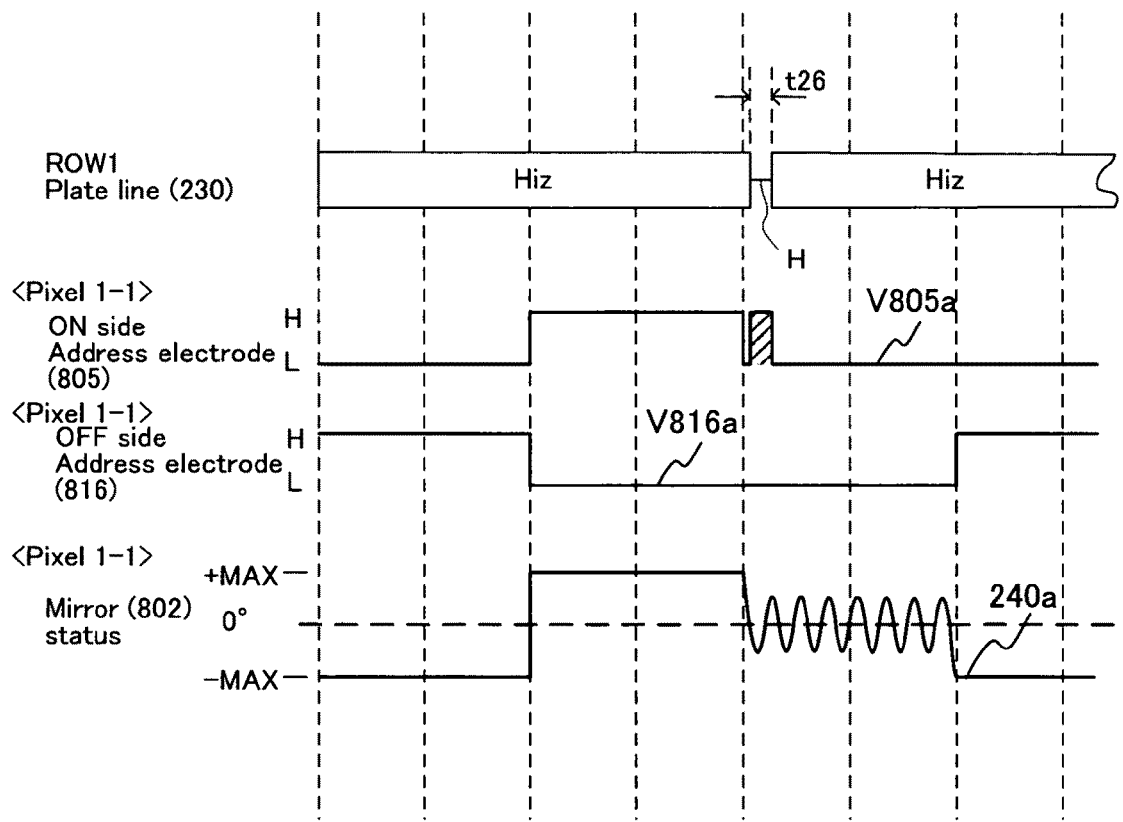
FIG. 15C is a timing chart showing yet another exemplary function of the circuit configuration of a mirror element according to the second embodiment.

FIGS. 15A through 15C are timing charts showing an exemplary function of the circuit configuration exemplified in FIG. 13.

FIG. 15A exemplifies the case of providing a period for setting the plate electrode potential V230 at H level every other time-slot during the ON/OFF control period, thereby adjusting the ON period of a mirror as in the case of FIGS. 14A through 14E. Incidentally, a plate line connected to a plate electrode is controlled in units of ROW lines. Therefore, a control using a plate electrode actually influences other mirror elements lined up on the same ROW line. FIG. 15A depicts the states of two mirror elements, i.e., pixel 1-1 and pixel 1-2, placed on the same ROW line, side by side.

As exemplified in FIG. 15A, if the ON periods of the mirror elements, i.e., the pixels 1-1 and 1-2, are shifted from each other by one time-slot, that is, if the OFF-side address electrode potential V816a and ON-side address electrode potential V805*a* (i.e., the potential of the first electrode) of the pixel 1-1 are changed over from (L, H) to (H, L) earlier than the OFF-side address electrode potential V816*b* and ON-side address electrode potential V805*b* of the pixel 1-2 are changed from (L, H) to (H, L) by one time-slot, the adjustment of the ON period using the plate electrode is carried out only for one mirror element. In FIG. 15A, the adjustment of the ON period using the plate electrode is carried out only for the mirror element shown as the pixel 1-1 with which the changeover from (L, H) to (H, L) and the timing of the plate electrode potential V230 (i.e., the potential of the second electrode) turning to H level are coincident. In the other mirror element shown as the pixel 1-2, a change in the plate electrode potential V230 affects the potential of the address electrode constituting a capacitor together with the plate electrode, the operation of the mirror, however, is not affected because the mirror is already maintained in the ON state.

As such, it is possible to carry out a selective adjustment using a plate electrode for individual mirror elements even for those which are lined up on the same ROW line.

FIG. 15B exemplifies the case of adjusting a period of the mirror 802 being in the oscillation state using a plate electrode in a shorter period than one time-slot.

In FIG. 15B, the plate electrode potential V230 is set at L level while the OFF-side address electrode potential and ON-side address electrode potential are maintained at (L, H) in a mirror element 800 in the ON state, and thereby the mirror 802 is shifted to the oscillation state. Note that the plate electrode potential V230 is always set at high impedance (Hiz) unless it is at L level.

Even though the ON-side address electrode potential is at H level, the setting of the plate electrode potential V230 at L level shuts off the electric field generated in the ON-side address electrode. Therefore, setting the plate electrode potential V230 at L level when the mirror is in the ON state, that is, when the potentials of the ON-side and OFF-side address electrodes are at (L, H), causes the mirror to be shifted to the oscillation state as a result of not affected by the ON side or OFF side. The use of the plate electrode as described above makes it possible to cause the mirror to be shifted to the oscillation state without a need to change the potentials of an address electrode.

That is, designating a period for setting the plate line 230 at L level to be less than one time-slot makes it possible to generate a light volume at less than 1 PWM and more than 1 OSC within one time-slot, thereby increasing the number of gray scale steps. Further, as shown in FIG. 15B, a plurality of time slots with different periods for setting the plate line 230 at L level is provided within one sub-frame, and thereby the number of gray scale steps can be further increased.

In the individual time slots (A), (B), (C), (D) and (E), the period in which the plate electrode potential V230 is controlled at L level are respectively, "0", period t23, period t24, period t25 and time slot t20 (where period t23<period t24<period t25<time slot t20).

Assuming the light volume of the time slot (A) is 1 PWM, the individual periods in which the plate electrode potential V230 is controlled at L level are respectively designated so that the light volumes of the other time slots (B), (C), (D) and (E) are respectively 0.8 PWM, 0.4 PWM, 0.2 PWM and 0.1 PWM. Incidentally, the light volume of 0.1 PWM is equal to that of 1 OSC in this case.

As exemplified in FIG. 15B, three steps of light volumes can be provided between 1 PWM and 1 OSC as the controllable light volumes within one time-slot, by controlling the timing for changing the plate electrode potential V230 from Hiz to L level. As a result, the combination of these enables the representation of a 10-time the steps of gray scale, which is translated as an increase of 4 bits in terms of the number of gray scale steps. Further, increasing the number of timings for changing the plate electrode potential V230 from Hiz to L level enables a further increase in the number of gray scale steps.

Alternatively, the number of the above described timings may be increased or decreased within sub-frames in line with the numbers of gray scale steps for respective colors. For example, in the case of blue with which the relative spectral sensitivity of human eye is low, only the time slots (A) and (B) may be used, and not the time slots (C), (D) and (E).

Note that the time slots of which the timing for changing the plate electrode potential V230 from Hiz to L level are different are provided within one sub-frame in FIG. 15B; alternatively, these time slots may be provided separately in different sub-frames.

Meanwhile, when the mirror is in the OFF state, that is, the potential of the address electrode is (H, L), even if the plate electrode potential V230 is changed to L level, the OFF state is continuously maintained because the electric field generated by the OFF-side address electrode (i.e., the drive electrode 816) is not affected.

FIG. 15C exemplifies the case of adjusting the amplitude of the mirror 802 in the oscillation state using the plate electrode, thereby attaining a higher number of gray scale steps.

The operation shown in FIG. 15C sets the plate electrode potential V230 (i.e., the potential of the second electrode) at H level for the period t26 after the elapse of a certain period of time when the mirror 802 is shifted to an oscillation state by changing the OFF-side address electrode potential and ON-side address electrode potential (i.e., the potential of the first electrode) from (L, H) to (L, L), thereby making it possible to decrease the amplitude of the mirror 802 in the oscillation state. Specifically, the plate electrode potential V230 is always set at high impedance (Hiz) unless it is at H level.

The reason is that an acceleration is generated in a direction opposite to the proceeding direction of the mirror 802 by setting the plate electrode potential V230 at H level when the mirror 802 is oscillating toward the OFF side from ON side. With this, the mirror 802 is decelerated and is shifted to an intermediate oscillation state with smaller amplitude. This operation makes it possible to generate a light volume different from that of the oscillation state with the maximum amplitude and attain a higher number of gray scale steps.

Figure 16A:
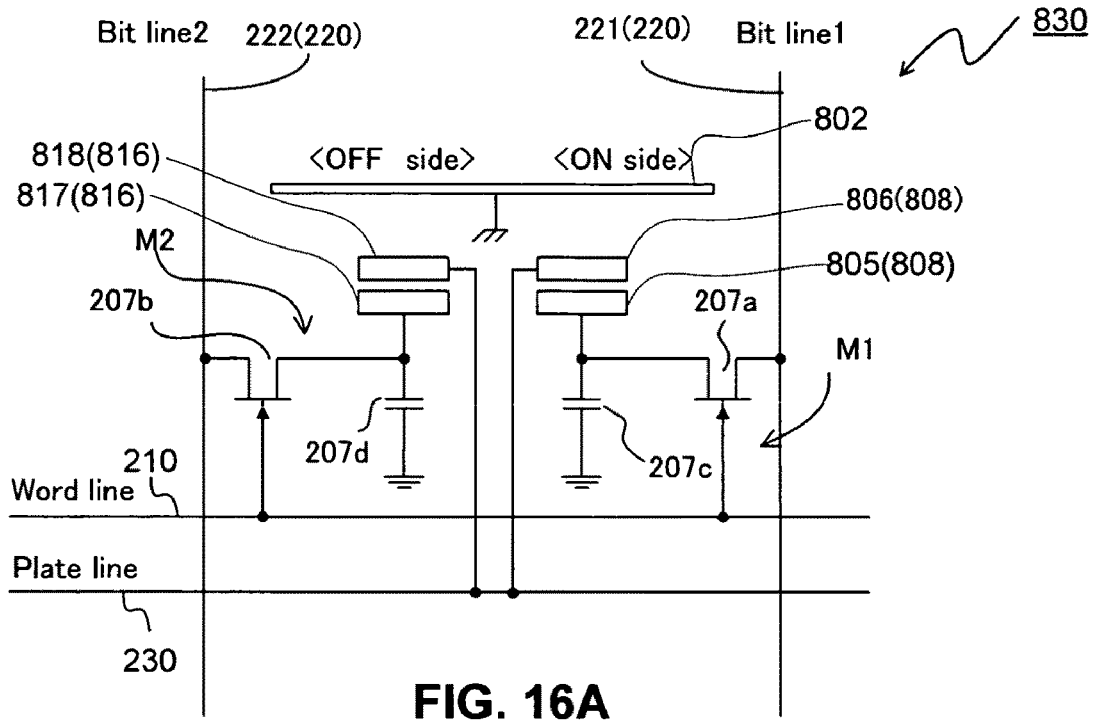
FIG. 16A is a conceptual diagram showing an exemplary circuit configuration of an exemplary modification of a mirror element according to the second embodiment.
Figure 16B:
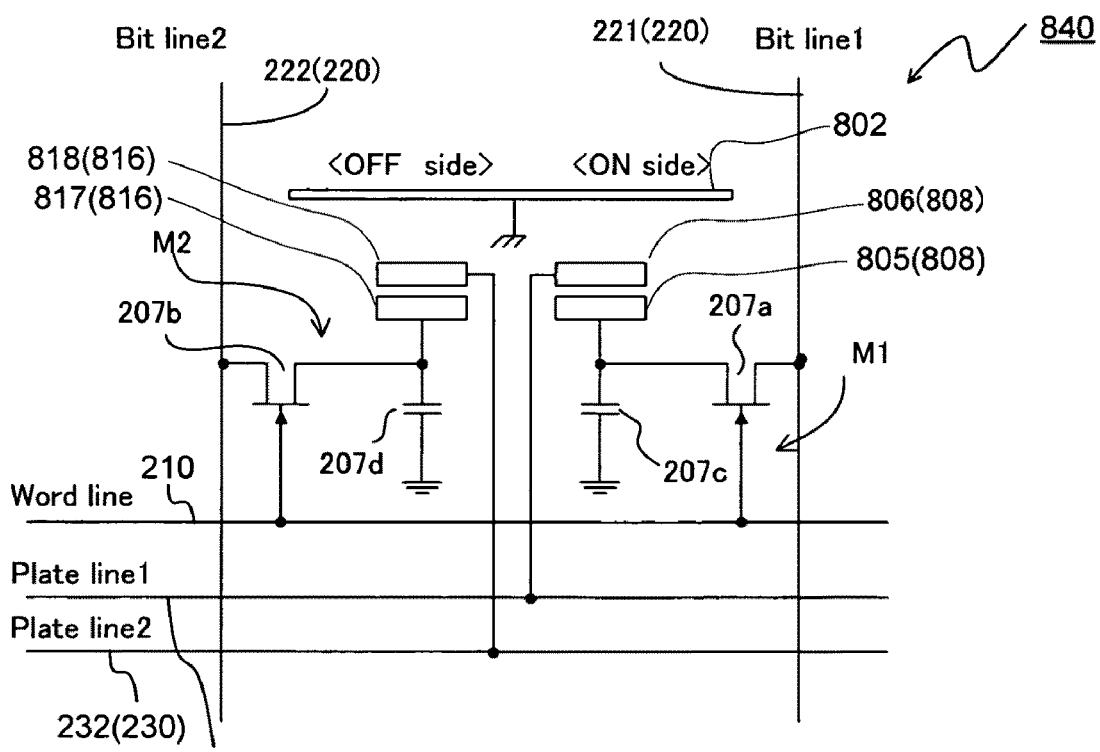
FIG. 16B is a conceptual diagram showing an exemplary circuit configuration of another exemplary modification of a mirror element according to the second embodiment.

FIGS. 16A and 16B are conceptual diagrams showing exemplary circuit configurations of exemplary modifications of a mirror element according to the present embodiment.

The mirror elements exemplified in FIGS. 16A and 16B are different from the mirror element 800 exemplified in FIG. 13 where both of the former have the structure of electrode produced by layering also the OFF-side drive electrodes.

The mirror element 830 exemplified in FIG. 16A is configured such that, of the OFF-side drive electrode 816, a lower electrode 817 is connected to an OFF capacitor 207*d* which is also connected to a bit line 222 by way of a gate transistor 207*b* that is constituted by an FET or the like. That is, the OFF-side lower electrode 817 is configured as an address electrode connected to a memory cell M2 that is constituted by the OFF capacitor 207*d* and gate transistor 207*b*. Meanwhile, of the OFF-side drive electrode 816, an upper electrode 818 is connected to the plate line 230 and is controlled independently from the memory cell M2. That is, the upper electrode 818 is configured as a plate electrode. As such, the ON-side upper electrode 806 and OFF-side upper electrode 818 share the plate line 230 in the mirror element 830.

A mirror element 840 exemplified in FIG. 16B is the same as the above described mirror 830 where the lower electrode 817 of a drive electrode 816 is configured as an address electrode and the upper electrode 818 is configured as a plate electrode. However, the mirror element 840 is different from the mirror element 830 where the former is configured such that the upper electrode 818 of the OFF-side drive electrode 816 is connected to a plate line that is different from the plate line to which the upper electrode 806 of the ON-side drive electrode 808 is connected. That is, the mirror element 840 shown in FIG. 16 is configured to connect the upper electrode 806 to the plate line 231 and, in contrast, connect the upper electrode 818 to the plate line 232, and therefore the individual upper electrodes are independently controllable.

The mirror elements exemplified in FIGS. 16A and 16B are also configured to use the plate electrode, as in the case of the above described mirror element 800, thereby making it possible to control the mirror in shorter period than one time-slot, and increasing the number of gray scale steps as a result.

As described above, the use of the drive electrode structured by layering the address electrode and plate electrode with the insulation layer intervening between them enables each electrode to freely utilize the area under the mirror. That is, a usable area is not limited in relation with other electrodes. This configuration makes it possible to increase a relative size of an individual electrode relative to the size of the mirror element and secure a sufficient magnitude of coulomb force at each respective electrode when the mirror element is further miniaturized. The configuration further makes it possible to attain a complex control using a plurality of electrodes (e.g., a control of an electric field generated at an address electrode by means of a plate electrode) without a need to change an access cycle to memory. In other words, the configuration enables a miniaturization of the apparatus while enhancing the definition of image and improving the gray scale representation thereof.

Specifically, the present embodiment exemplifies the case of layering the address electrode and plate electrode together; alternatively, two address electrodes may be layered together. In such a case, the two address electrodes may be connected to separate pieces of memory (i.e., first memory and second memory) and thereby multistep magnitude of coulomb force can be generated between the electrode and mirror. Such a configuration makes it possible to attain various controls of the operation of a mirror. This configuration also enables a miniaturization of the apparatus while enhancing the definition of image and improving the gray scale representation thereof.

Third Embodiment

Figure 17A:
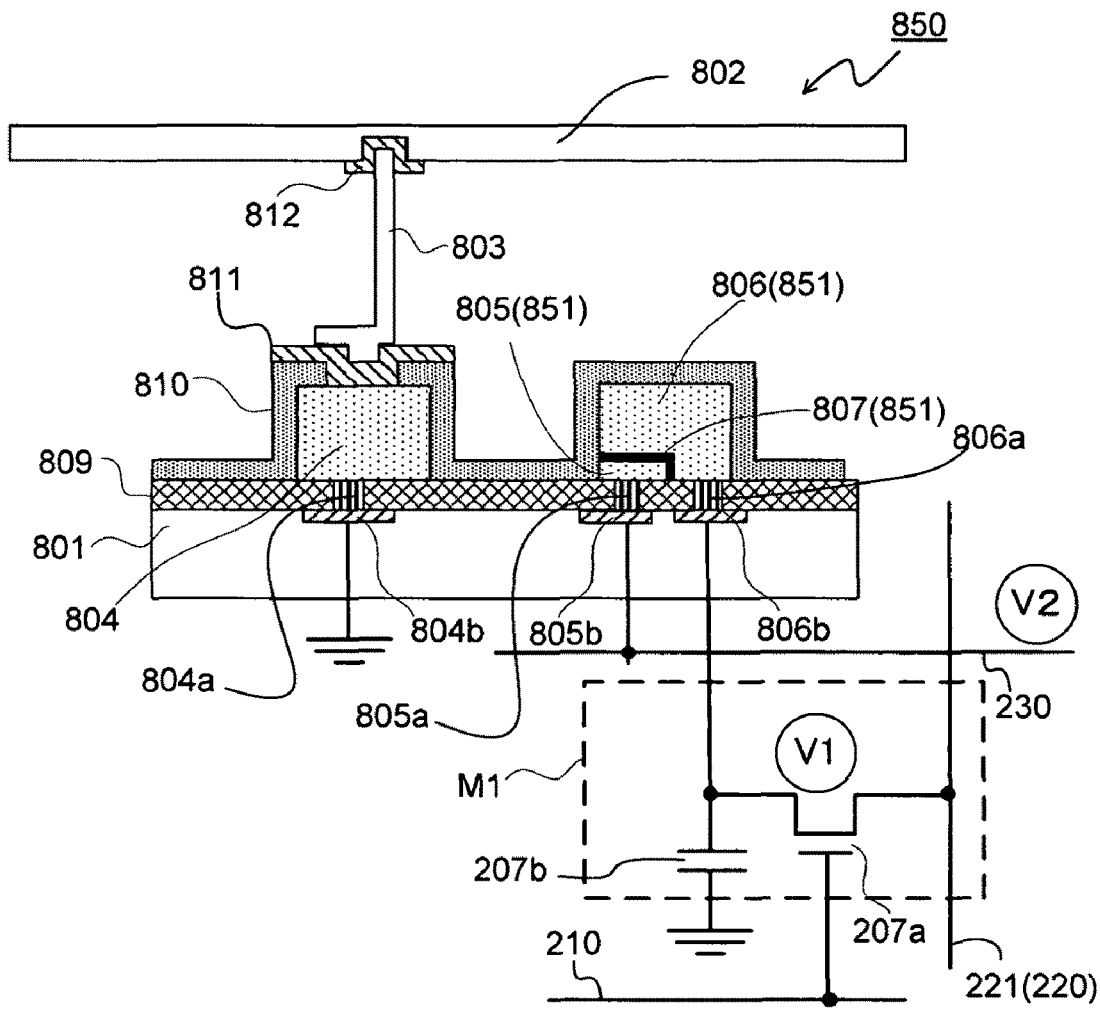
FIG. 17A is a conceptual diagram showing a cross-sectional configuration of a mirror element according to a third preferred embodiment.
Figure 17B:
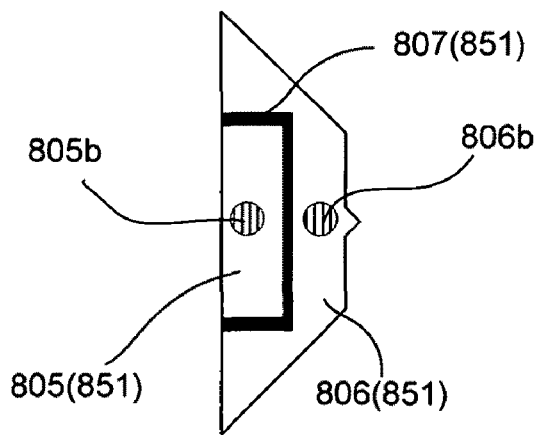
FIG. 17B is a bottom view diagram of a drive electrode included in a mirror element according to the third embodiment.
Figure 18:
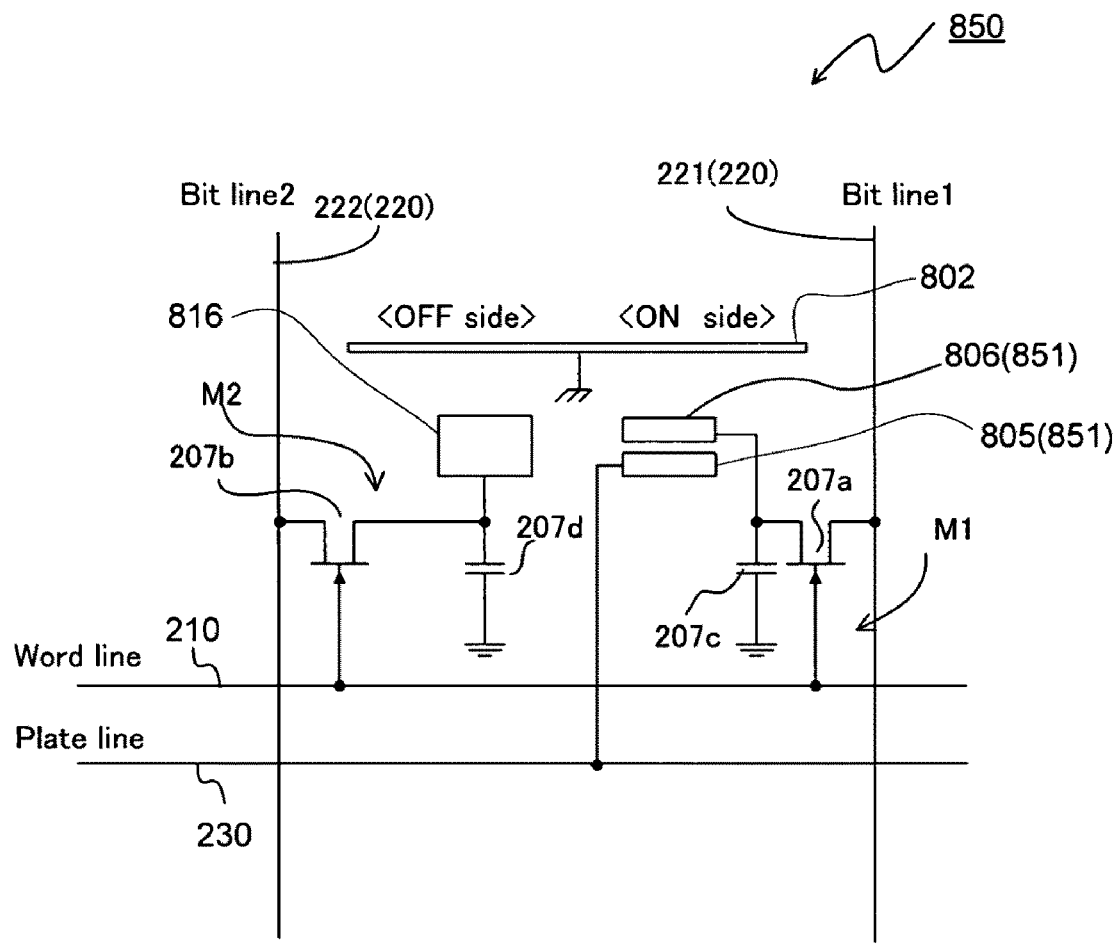
FIG. 18 is a conceptual diagram showing an exemplary circuit configuration of a mirror element according to the third embodiment.

Let it describe a mirror element according to the present preferred embodiment. FIG. 17A is a conceptual diagram showing a cross-sectional configuration of a mirror element according to the present embodiment. FIG. 17B is a bottom view diagram of a drive electrode included in the mirror element exemplified in FIG. 17A. FIG. 18 is a conceptual diagram showing an exemplary circuit configuration of a mirror element 850 according to the present embodiment.

The following is a description of the mirror element 850 with reference to FIGS. 17A, 17B and 18. The mirror element 850 is configured to include a substrate 801, a mirror 802 placed oppositely to the substrate 801, an elastic hinge 803 for supporting the mirror 802 so as to be deflectable, a hinge electrode 804 electrically connected to the mirror 802 and drive electrodes (i.e., a drive electrode 851 and a drive electrode 816) for driving the mirror 802 to the ON side and OFF side, respectively.

In contrast to the OFF-side drive electrode 816 having the structure of a single layer electrode, the ON-side drive electrode 851 is constituted by a plurality of regions (i.e., parts), in which a lower electrode 805 (i.e., a first electrode) and an upper electrode 806 (i.e., a second electrode) are layered together, with an insulation layer 807 (Insulator) intervening between the two electrodes.

The difference from the mirror element 800 exemplified in FIGS. 9A, 9B and 13 are that the present mirror element 850 comprises a plate electrode in which the lower electrode 805 of the ON-side drive electrode (i.e., the drive electrode 851) is connected to the plate line 230 and that the upper electrode 806 is an address electrode connected to the memory cell M1. Other configurations are similar to that of the above described mirror element 800. The following mainly describes the difference from the mirror element 800.

Specifically, the mirror element 850 may be configured to apply a doping process to a part of a protective layer (i.e., a semiconductor material layer) so that the part of the protective layer possesses electric conductivity.

Also the case of layering the address electrode and plate electrode upside down as described above enables a miniaturization of the apparatus while enhancing the definition of image and improving the gradation thereof.

The following is a description of the operation of the circuit configuration exemplified in FIG. 18. Likewise the cases of the first and second embodiments, the present embodiment is also configured to use a plate electrode in addition to the address electrode, thereby making it possible to attain an ON/OFF control and oscillation control in a shorter interval than one time-slot.

Even if a plate electrode is under an address electrode, the plate electrode and address electrode constitute a capacitor, and therefore the potential of the address electrode increases or decreases with the potential of the plate electrode.

With this, a mirror can be controlled with a strong electric field only when the mirror is in transition, while the mirror can be retained with a low field after the transition. A fast transition enables a short cycle time, that is, compatibility to an increased number of gray scale steps, while the retention of the mirror with a low field is effective to a countermeasure to stiction. In addition, the configuration also enables a conventional intermediate oscillation and a high gradation algorithm (i.e., a short-time retention of a mirror).

Figure 19A:
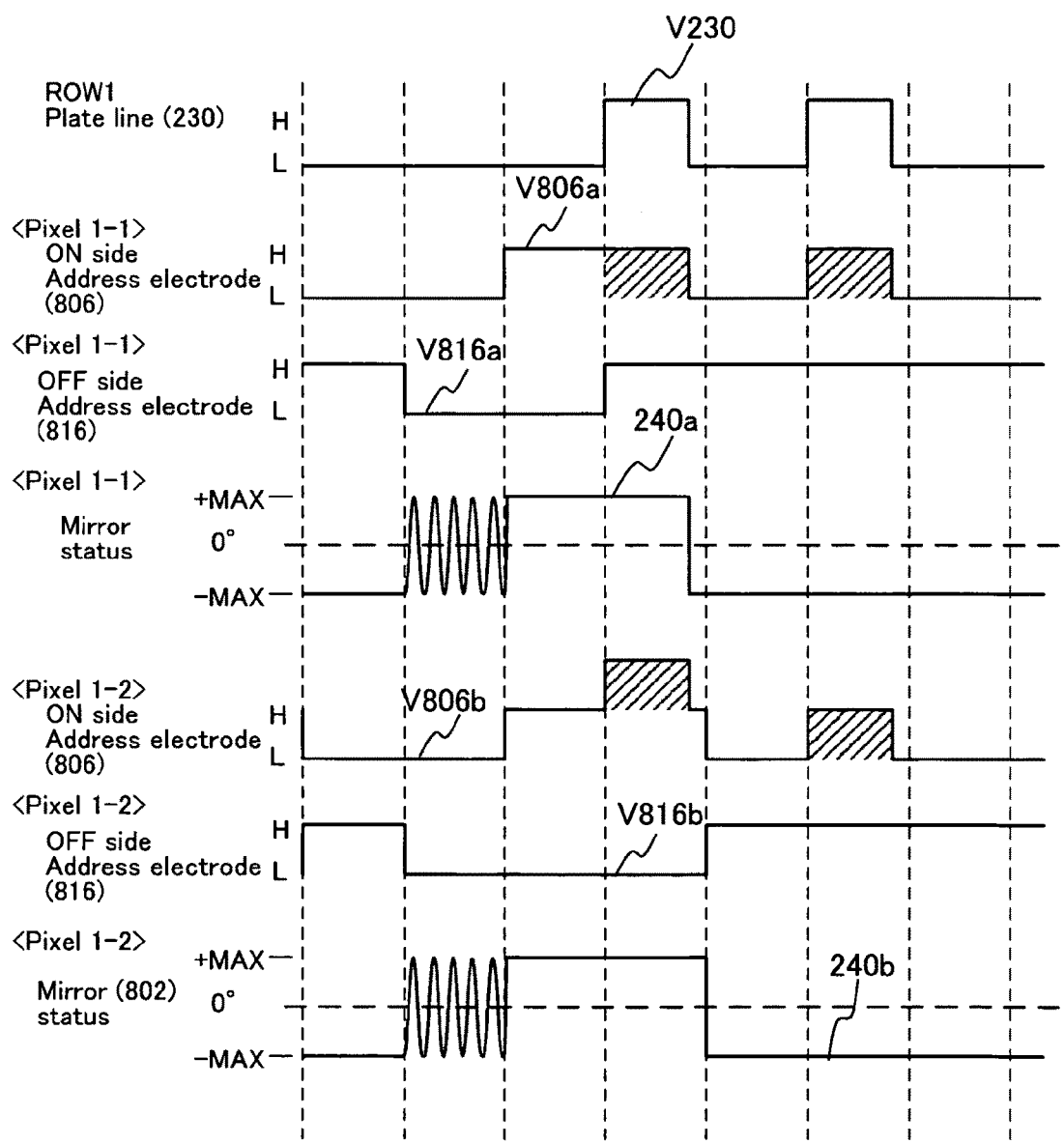
FIG. 19A is a timing chart showing an exemplary function of the circuit configuration of a mirror element according to the third embodiment.
Figure 19B:
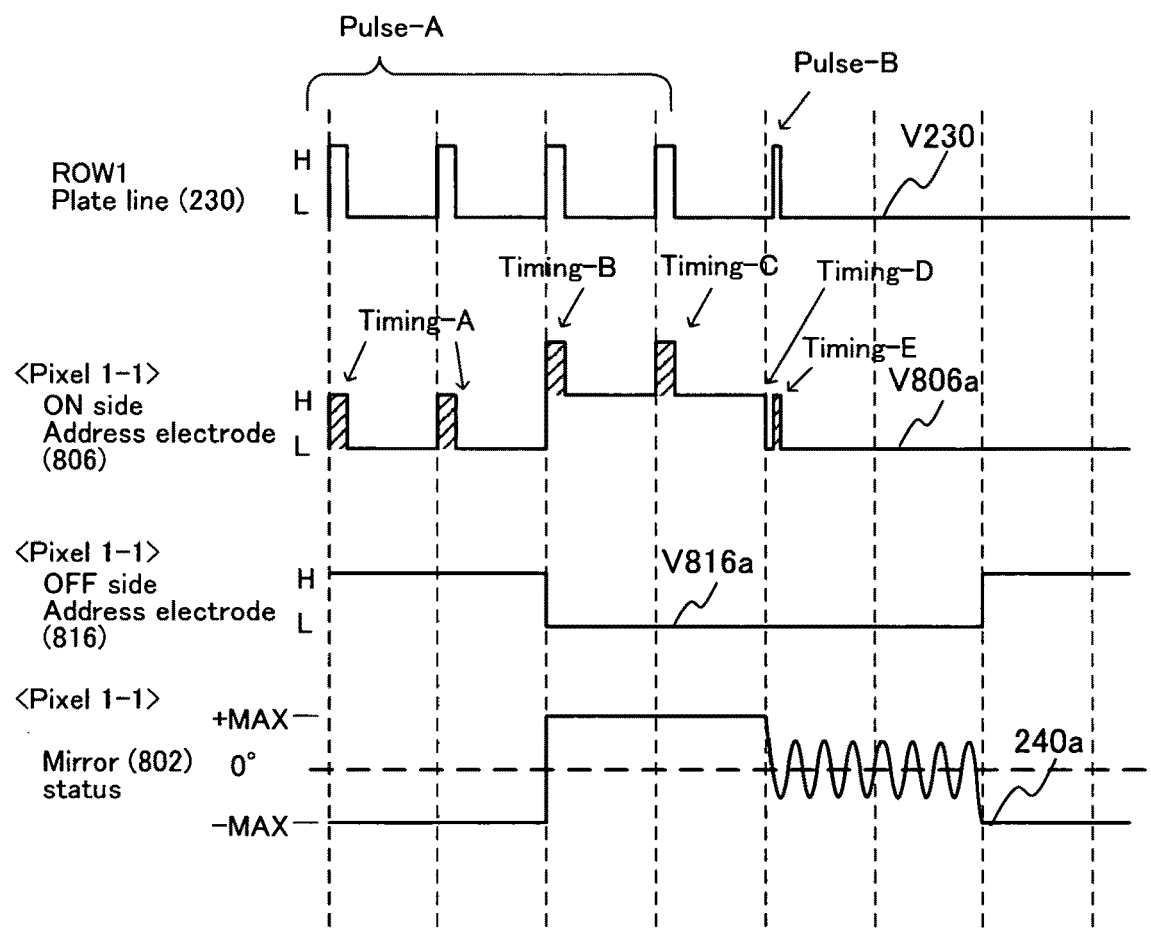
FIG. 19B is a timing chart showing another exemplary function of the circuit configuration of a mirror element according to the third embodiment.

The following is a description of an exemplary operation of the circuit configuration exemplified in FIG. 18 with reference to FIGS. 19A and 19B.

FIG. 19A is a timing chart showing an exemplary function of the circuit configuration exemplified in FIG. 18. FIG. 19A exemplifies the case of providing a period for setting a plate electrode potential V230 at H level in every other time slot during the period of ON/OFF control, thereby adjusting the ON period of a mirror.

As exemplified in FIG. 19A, if the ON period of pixel 1-1 is shifted from that of pixel 1-2 by one time-slot, that is, if the OFF-side address electrode potential V816a and ON-side address electrode potential V806a (i.e., the potential of the first electrode) of the pixel 1-1 are changed over from (L, H) to (H, L) earlier than the OFF-side address electrode potential V816b and ON-side address electrode potential V806b of the pixel 1-2 are changed from (L, H) to (H, L) by one time-slot, the adjustment of the ON period using the plate electrode (i.e., the lower electrode 805) is carried out only for one mirror element. In FIG. 19A, the adjustment of the ON period using the plate electrode (i.e., the lower electrode 805) is carried out only for the mirror element shown as the pixel 1-1 with which the changeover from (L, H) to (H, L) and the timing of the plate electrode potential V230 (i.e., the potential of the second electrode) turning to H level are coincident.

As such, it is possible to carry out a selective adjustment of the ON period using the plate electrode (i.e., the lower electrode 805) for individual mirror elements that are lined up on the same ROW line. This configuration makes it possible to express a desired gray scale in high grade for each mirror element.

Specifically, in FIG. 19A, the plate electrode potential V230 is controlled to be L level unless it is in H level. The reason is that the plate electrode is the lower electrode 805 and therefore the electric field of the address electrode is not shut off even if the potential is not set at high impedance (Hiz).

FIG. 19B is a timing chart showing an exemplary function of the circuit configuration exemplified in FIG. 18. FIG. 19B exemplifies the case of providing a period for setting the plate electrode potential V230 at H level for a certain period when each time-slot of an ON/OFF control period is started, thereby assisting the transition of a mirror. FIG. 19B also exemplifies the case of generating an intermediate oscillation by utilizing a plate electrode potential V230.

The plate electrode (i.e., the lower electrode 805) and the address electrode (i.e., upper electrode 806) are layered together with the insulation layer 807 intervening between them, and therefore a capacitor is constituted by them. Therefore, a change in the plate electrode potential V230 affects the address electrode.

In FIG. 19B, the plate electrode potential V230 is controlled at H level (by means of Pulse-A) for a certain period when each time-slot of the ON/OFF control period is started. When the mirror 802 is in the OFF state, however, it is sufficiently attracted to the OFF-side address electrode (i.e., the drive electrode 816), and therefore a change (at Timing-A) in the ON-side address electrode potential V806a caused by the change in the plate electrode potential V230 does not influence the state of the mirror 802. Also, when the mirror is maintained in the ON state, it is sufficiently attracted to the ON-side address electrode (i.e., the upper electrode 806), and therefore a change (at Timing-C) in the ON-side address electrode potential V806a caused by the change in the plate electrode potential V230 does not influence the state of the mirror 802.

In contrast, when the mirror 802 is changed from the OFF state to ON state, that is, when the OFF-side address electrode potential V816a and ON-side address electrode potential V806a (i.e., the potential of the first electrode) of the pixel 1-1 are changed from (H, L) to (L, H), a change (at Timing-B) in the ON-side address electrode potential V806a caused by the change in the plate electrode potential V230 (i.e., the potential of the second electrode) assists the mirror 802 shifting from the OFF state to ON state. As a result, a high speed shifting of the states of the mirror 802 is attained.

That is, the control for setting the plate electrode potential V230 at H level when each time slot of the ON/OFF control period is started effectively functions only when the mirror is changed from the OFF state to ON state, and therefore the control never ushers in an extraneous ill influence at any other timing.

In the meantime, maintaining the potential of an electrode at unnecessarily high potential in order to shift the mirror 802 to the ON state will cause a larger change in the potential when the mirror is shifted from the ON state to another state. This will contribute to stiction as already described for the first embodiment, ill affecting a high speed transition of the mirror.

In the case of the above described control, a high potential is set for the electrode in order to attract the mirror at the timing (i.e., Timing-B) of the mirror changing from the OFF state to ON state; the potential of the electrode can be decreased to a lowest necessary potential for maintaining the mirror at the timing (i.e., Timing-D) of the mirror shifting from the ON state to another state. Therefore, the above described control is effective also to a countermeasure to the stiction. Further, a voltage applied to the address electrode can be lowered, and therefore it is effective to reduce the power consumption.

Furthermore, in FIG. 19B, when the mirror 802 is shifted to an oscillation state by changing the OFF-side address electrode potential and ON-side address electrode potential (i.e., the potential of the first electrode) from (L, H) to (L, L), the plate electrode potential V230 (i.e., the potential of the second electrode) is temporarily set at H level (by means of Pulse-B) after the elapse of a certain period of time. This operation causes a change (at Timing-E) in the ON-side address electrode potential V806a due to the change in the plate electrode potential V230, reducing the amplitude of the mirror 802 in the oscillation state. This principle is the same as that described for FIG. 15C showing the second embodiment. This operation makes it possible to generate a light volume different from that generated in the oscillation state in the maximum amplitude, thereby increasing the number of gray scale steps.

Figure 20A:
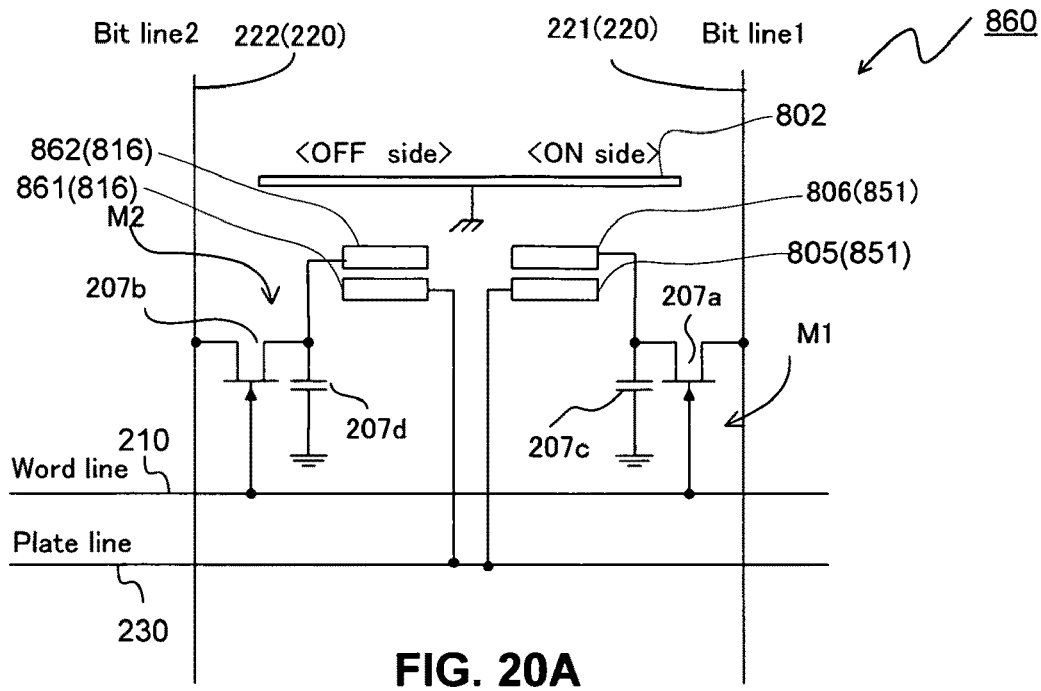
FIG. 20A is a conceptual diagram showing an exemplary circuit configuration of an exemplary modification of a mirror element according to the third embodiment.
Figure 20B:
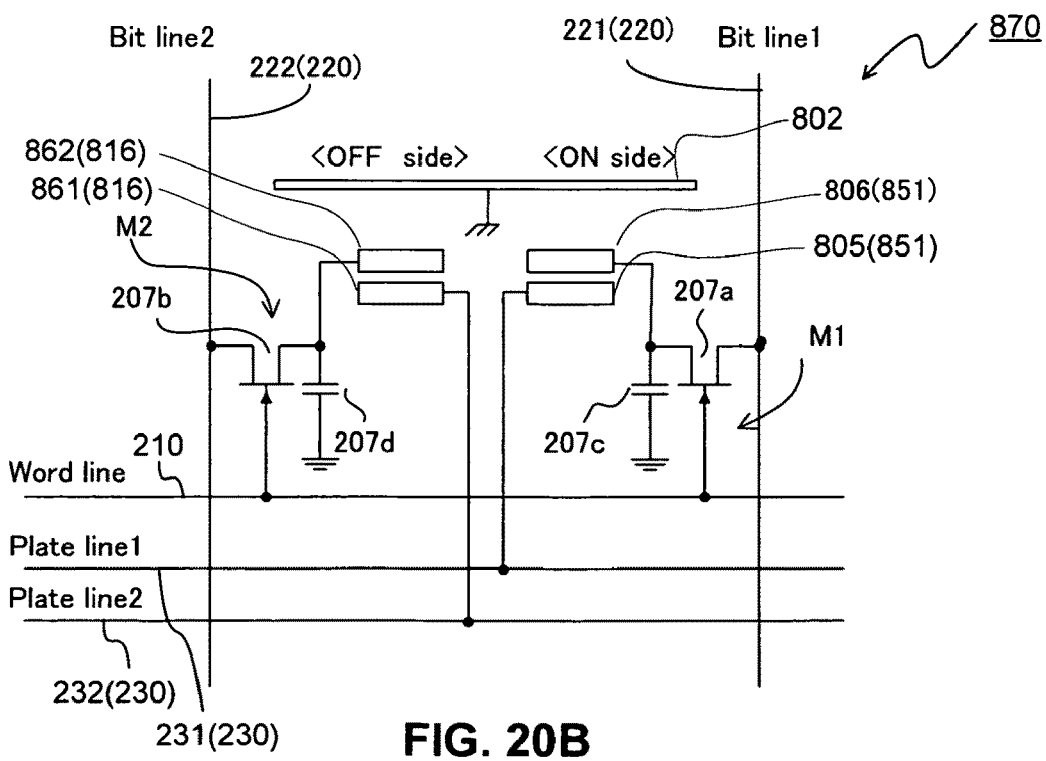
FIG. 20B is a conceptual diagram showing another exemplary circuit configuration of another exemplary modification of a mirror element according to the third embodiment.

FIGS. 20A and 20B are conceptual diagrams showing exemplary circuit configurations of exemplary modifications of a mirror element according to the present embodiment. The mirror elements exemplified in FIGS. 20A and 20B are different from the mirror element 850 exemplified in FIG. 18 where each of them comprises an electrode structure produced by layering also the OFF-side drive electrode.

The mirror element 860 exemplified in FIG. 20A is configured such that, of the OFF-side drive electrode 816, the upper electrode 862 is connected to an OFF capacitor 207d that is connected to a bit line 222 by way of a gate transistor 207b constituted by a field effect transistor (FET) or the like. That is, the OFF-side upper electrode 862 is configured as an address electrode connected to a memory cell M2 that is constituted by OFF capacitor 207d and gate transistor 207b. Meanwhile, of the OFF-side drive electrode 816, the lower electrode 861 is connected to a plate line 230, and is configured to be controlled independently of the memory cell M2. That is, the lower electrode 861 is configured as a plate electrode. As such, the ON-side lower electrode 805 and OFF-side lower electrode 861 share the plate line 230 in the mirror element 860.

The mirror element 870 exemplified in FIG. 20B is the same as the mirror element 860 where the upper electrode 862 of the drive electrode 816 is configured as an address electrode and the lower electrode 861 is configured as a plate electrode. The mirror element 870, however, is different from the mirror element 860 where the former is configured such that the lower electrode 861 of the OFF-side drive electrode 816 is connected to a plate line that is different from the plate line to which the lower electrode 805 of the ON-side drive electrode 808 is connected. That is, the mirror element 870 shown in FIG. 20B is configured such that the lower electrode 805 is connected to the plate line 231, while the lower electrode 861 is connected to the plate line 232, and thereby the respective lower electrodes can be independently controlled.

Likewise the case of the mirror element 850, each of the mirror elements exemplified in FIGS. 20A and 20B uses the plate electrode, thereby making it possible to control the mirror in a shorter period than one time-slot and attain an increased number of gray scale steps as a result.

Further, the equipping of the plate electrode as described above makes it possible to control a period of an oscillation state in shorter period than one time-slot even if the plate electrode is configured as a lower electrode. That is, although it is not possible to attain an oscillation control by shutting off the electric field generated by the address electrode of the above described mirror element 800 exemplified in FIG. 15B, yet it is possible to control a mirror, which is in the oscillation state, by controlling the OFF-side plate electrode so as to change from Hiz to H level. Therefore, a control approximately similar to the control shown in FIG. 15B can be attained, although there is the difference between the state transition from the ON state to oscillation state and the state transition from the oscillation state to OFF state (according to the present embodiment).

As described above, the present embodiment configured to change the layout of the plate electrode and address electrode also makes it possible to minimize the apparatus while enhancing the definition of an image and increasing the number of gray scale steps thereof.

Fourth Embodiment

Figure 21:
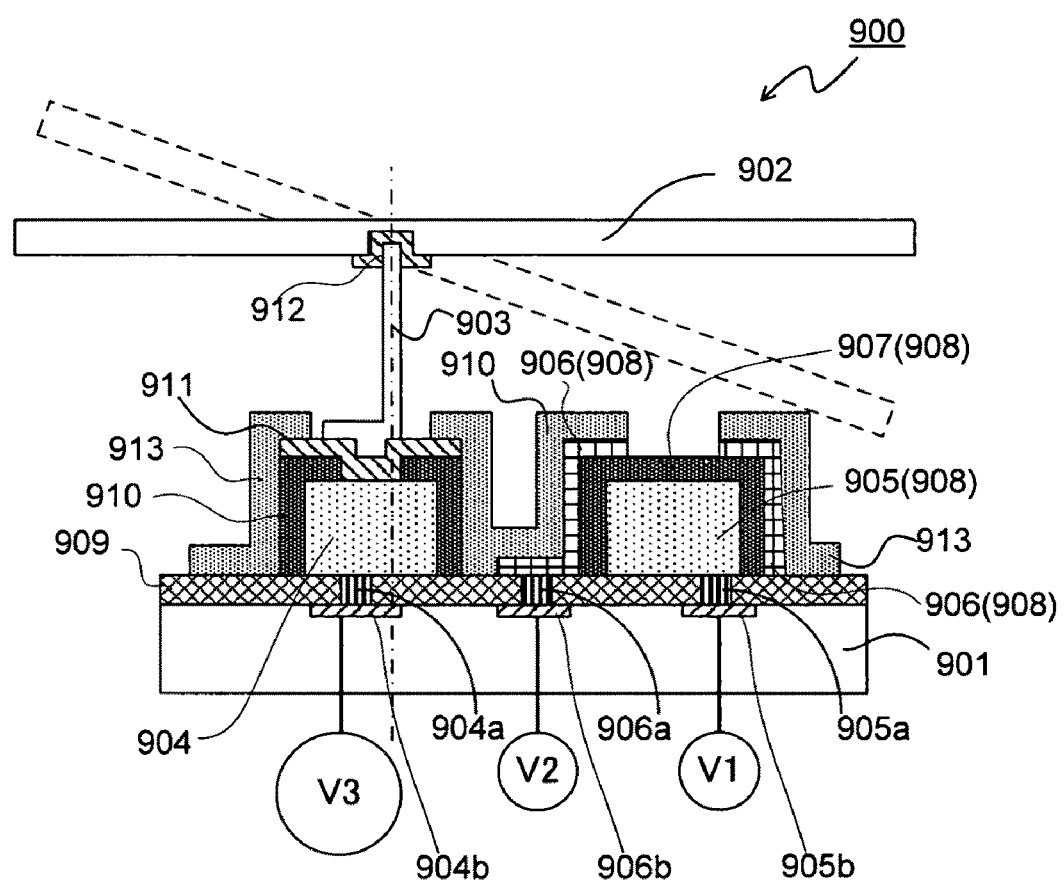
FIG. 21 is a conceptual diagram showing a cross-sectional configuration of a mirror element according to a fourth preferred embodiment.

Let it describe a mirror element according to the present embodiment. FIG. 21 is a conceptual diagram showing a cross-sectional configuration of a mirror element according to the present embodiment. FIGS. 22A, 22B, 22C and 22D are top view diagram of a mirror element according to the present embodiment.

The mirror element 900 according to the present embodiment and exemplified in FIG. 21 is similar to the mirror element 800 shown in FIG. 9A where the ON-side drive electrode is constituted by an upper electrode and by a lower electrode which are layered together with an insulation layer intervening between them, whereas the mirror element 900 is different from the mirror element 800 where a part of the lower electrode is not covered by the upper electrode in the mirror element 900. The following is a description, in detail, of the mirror element 900 with reference to FIG. 21 and FIGS. 22A through 22D.

The mirror element 900 is configured to include a substrate 901, a mirror 902 placed oppositely to the substrate 901, an elastic hinge 903 for supporting the mirror 902 so as to be deflectable, a hinge electrode 904 electrically connected to the mirror 902 and a drive electrode 908 for driving the mirror 902.

The drive electrode 908 is constituted by a plurality of regions (i.e., parts) and is configured to layer together a lower electrode 905 (i.e., a first electrode) and an upper electrode 906 (i.e., a second electrode) with an insulation layer 907 (Insulator) intervening between the two electrodes. In more specific, the upper electrode 906 is layered so that a part of the top surface of the insulation layer 907 covering the lower electrode 905 is exposed. That is, the upper electrode 906 has an opening part (i.e., a second opening part).

Specifically, FIG. 21 exemplifies only the structure on one side of the configuration of the mirror element 900 relative to the elastic hinge 903. Although not shown in the drawing, the mirror element 900 likewise includes, on the opposite side relative to the elastic hinge 903, a drive electrode 918 produced by layering together a lower electrode 915 and an upper electrode 916 with an insulation layer 917 intervening between them.

Incidentally, the mirror 902 abuts on the upper electrode (i.e., the second electrode) of a drive electrode (908 or 918) when the mirror 902 is driven by the drive electrode and is shifted to the ON state or OFF state. That is, the upper electrode (i.e., the second electrode) constitutes a stopper.

Individual electrodes are connected to respectively different drive circuits so as to enable application of respectively different voltages. For example, the hinge electrode 904 is connected to the GND and the potential is maintained at the GND potential. The lower electrodes 905 and 915 are connected to the plate line 230 and the potential is controlled at any of 0 volts, 5 volts and high impedance (i.e., a floating). The upper electrodes 906 and 916 are connected to memory and the potential is controlled at 0 volts or 5 volts.

The substrate 901 is equipped with a drive circuit for driving the mirror 902, the drive circuit including, for example, word line 210, bit line 220, plate line 230, GND, memory, wiring, et cetera. A first protective layer 909 is formed on the substrate 901 and the individual electrodes (i.e., the hinge electrode 904, lower electrode 905, and upper electrode 906) are placed on the first protective layer 909. The drive circuit and individual electrode are electrically connected together by way of a Via equipped in the first protective layer 909.

Figure 22A:
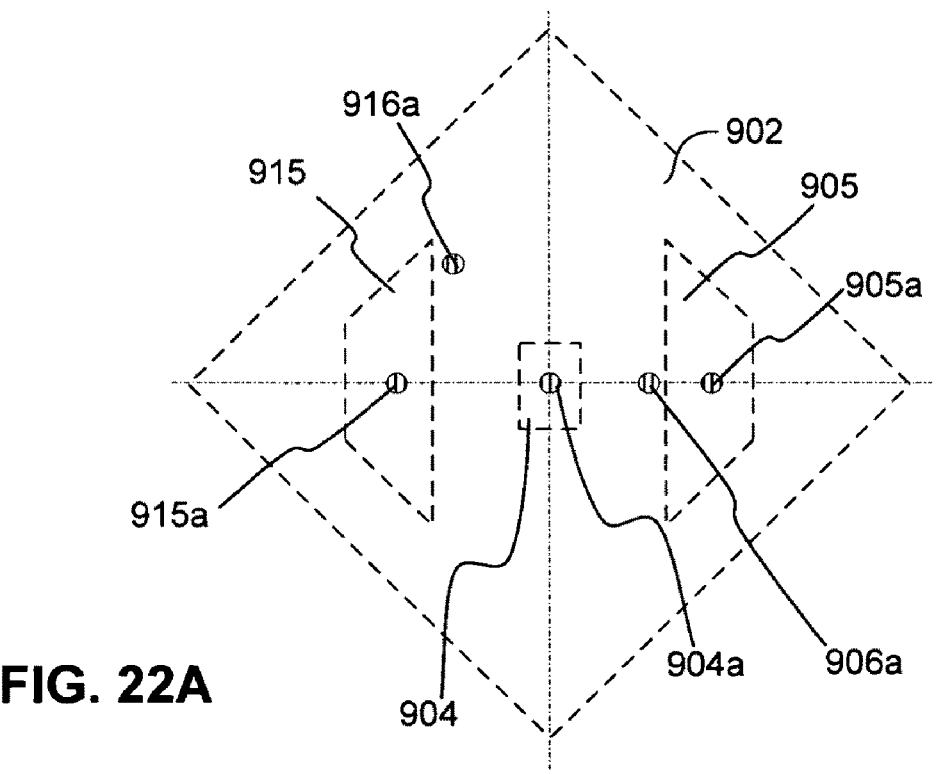
FIG. 22A is a top view diagram of a mirror element according to the fourth embodiment, with upper layers than a first protective layer removed.
Figure 22B:
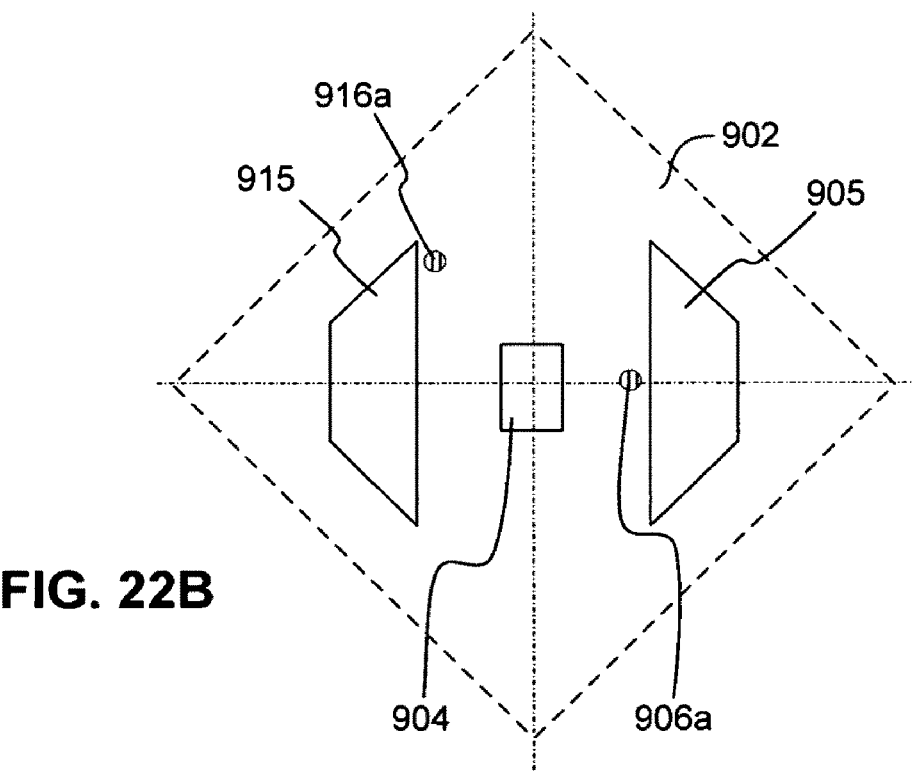
FIG. 22B is a top view diagram of a mirror element according to the fourth embodiment, in a state in which a hinge electrode and a lower electrode are added to the configuration of FIG. 22A.

FIG. 22A is a top view diagram of a mirror element, with upper layers than a first protective layer 909 removed. FIG. 22B is a top view diagram of a mirror element in a state in which a hinge electrode and a lower electrode are added to the configuration of FIG. 22A. Incidentally, FIG. 22A indicates the mirror 902, hinge electrode 904, lower electrode 905 on the ON side and lower electrode 915 on the OFF side with dotted lines. FIG. 22B indicates the mirror 902 with dotted lines.

As exemplified in FIGS. 22A and 22B, the hinge electrode 904, lower electrodes 905 and 915 are respectively connected to Vias 904a, 905a and 915a on the bottom faces of the respective electrodes.

Furthermore, the first protective layer 909 is equipped with Via 906a and Via 916a at asymmetrical positions (in terms of mirror symmetry).

Figure 22C:
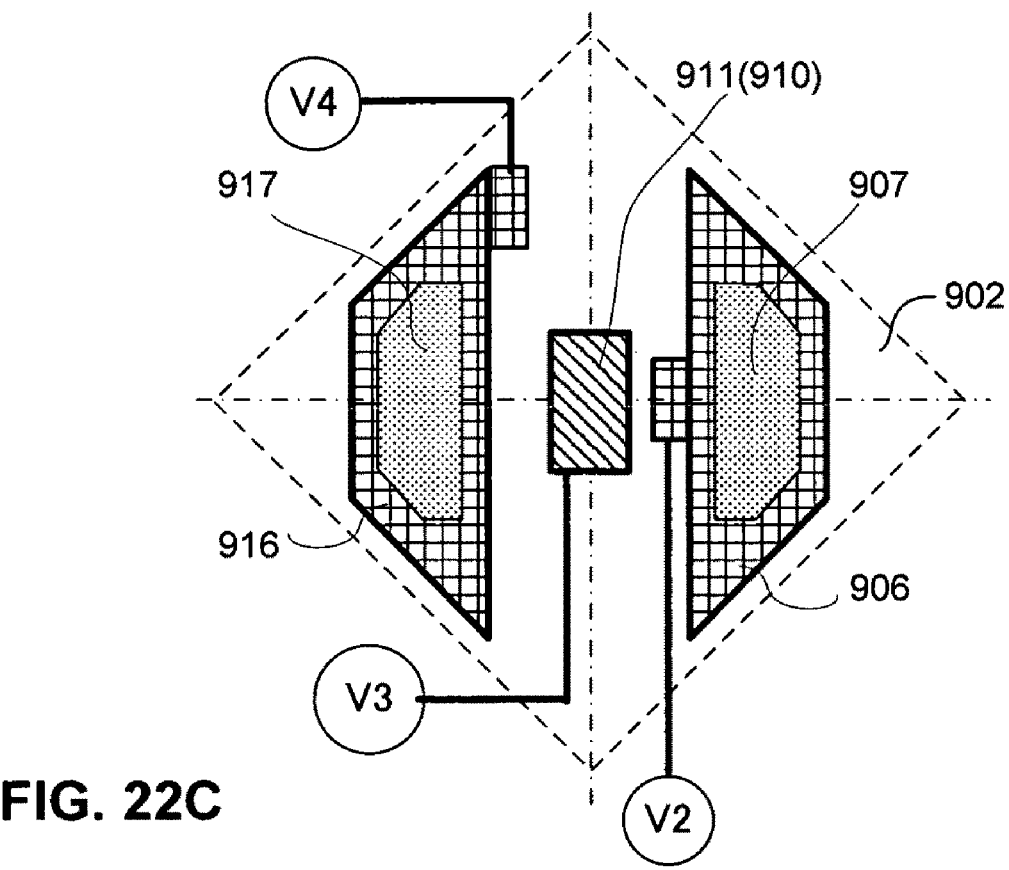
FIG. 22C is a top view diagram of a mirror element according to the fourth embodiment in a state in which a second protective layer and a barrier metal layer are added onto a hinge electrode and in which an insulation layer and an upper electrode are added onto a lower electrode, starting from the configuration shown in FIG. 22B.

FIG. 22C is a top view diagram of a mirror element in a state in which a second protective layer 910 and a barrier metal layer 911 are added onto a hinge electrode 904 and in which an insulation layer 907 (and 917) and an upper electrode 906 (and 916) are added onto a lower electrode 905 (and 915), starting from the configuration shown in FIG. 22B. Note that the upper electrode 906 (and 916) may be formed with a protrusion equipped in the part abutting on the mirror 902 as exemplified in FIG. 12A and others.

As exemplified in FIG. 22C, the upper electrodes (i.e., the upper electrode 906 and upper electrode 916) are layered together so that a part of each of the lower electrodes 905 and 915 (or the insulation layers 907 and 917 on the lower electrodes) is exposed. Further, the forms and drive voltages (V2 and V3) of the upper electrodes 906 and 916 may be configured to be different for the drive electrodes on the ON side and OFF side.

Figure 22D:
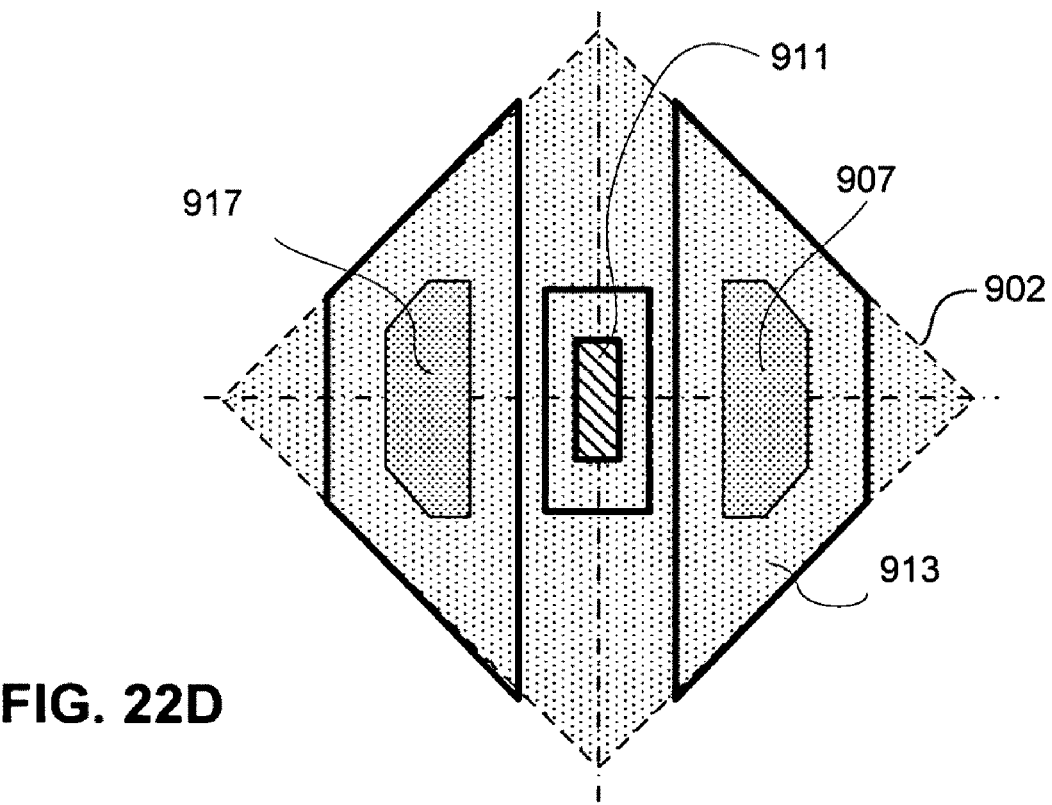
FIG. 22D is a top view diagram of a mirror element according to the fourth embodiment, in a state in which a third protective layer is added to the configuration of FIG. 22C.

FIG. 22D is a top view diagram of a mirror element in a state in which a third protective layer 913 (i.e., an insulation layer) is added to the configuration of FIG. 22C.

As exemplified in FIG. 22D, the third protective layer 913 (i.e., the insulation layer) is deposited so as to expose a part of the lower electrode in the same way as the upper electrode or so as to expose the barrier metal layer 911 on the hinge electrode 904. That is, the third protective layer 913 has an opening part (i.e., a first opening part). Meanwhile, the third protective layer 913 possesses a higher resistance value than the elastic hinge 903 does.

Incidentally, the materials of the individual constituent components are similar to those of the second embodiment. Further, the electrodes are electrically connected to the wiring (i.e., drive circuits) by way of Vias; alternatively, they may be electrically connected by configuring such that a part of the protective layer possesses electrical conductivity as exemplified in FIG. 11.

Furthermore, an anti-stiction layer may be formed on the surface of the mirror 902 and that of the upper electrode (i.e., the second electrode) (i.e., the stopper), although not shown in a drawing here).

Figure 23A:
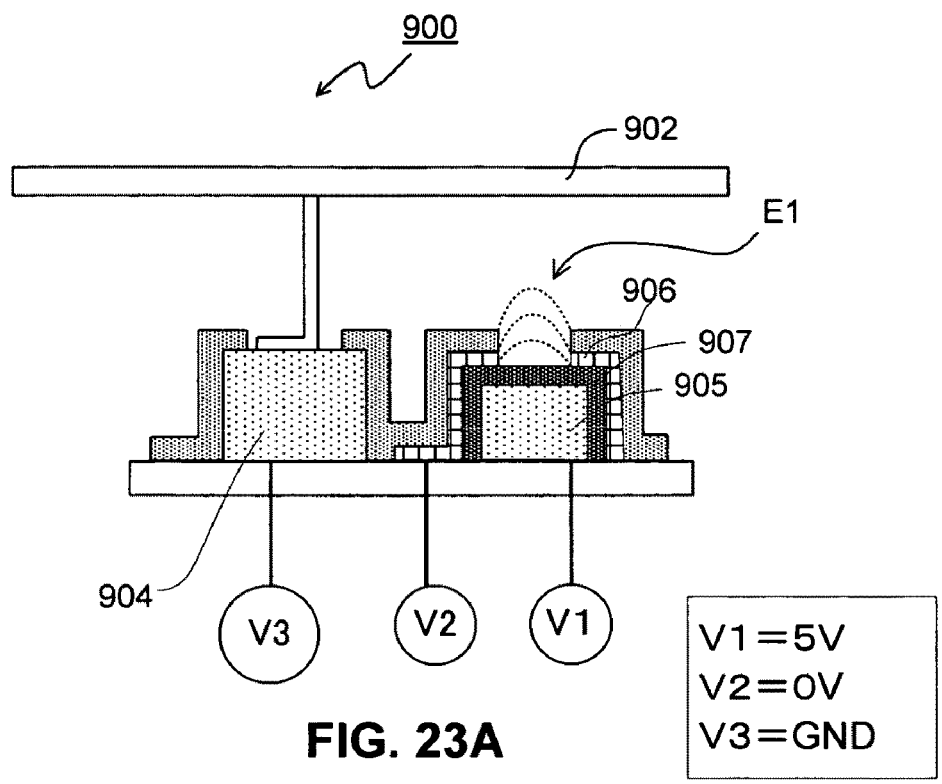
FIG. 23A is a diagram exemplifying a state of an electric field generated by a mirror element according to the fourth embodiment.
Figure 23B:
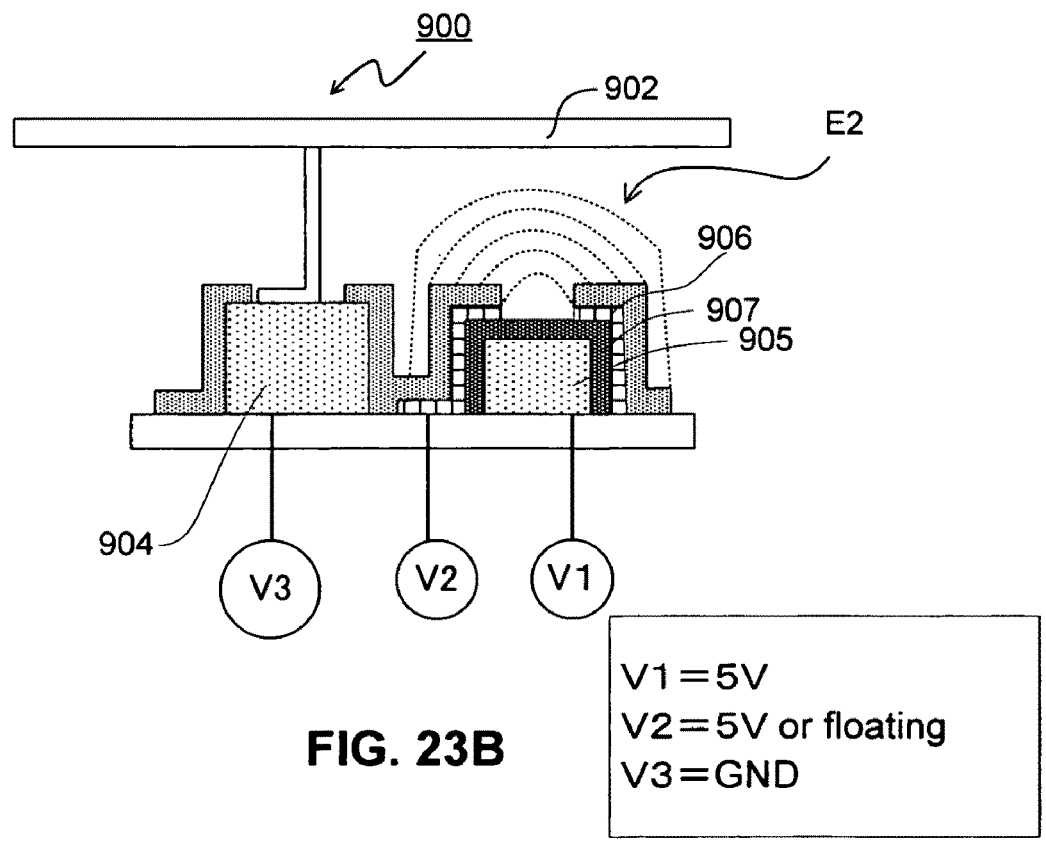
FIG. 23B is a diagram exemplifying another state of an electric field generated by a mirror element according to the fourth embodiment.

FIGS. 23A and 23B are diagrams each exemplifying a state of an electric field generated by the mirror element exemplified in FIG. 21. Note that FIGS. 23A and 23B depict the configuration of the mirror element 900 by simplifying it, and, further, omit the electric field in the vicinity of the mirror 902, of the electric field generated between the mirror 902 and electrode.

FIG. 23A exemplifies the state (and the region) of an electric field E1 generated when the potentials of the lower electrode 905, upper electrode 906 and hinge electrode 904 are 5 volts, 0 volts and GND potential, respectively. In this case, the electric field generated by the lower electrode 905 caused by the difference in potentials between itself and mirror cannot pass through the upper electrode 906 that is controlled at 0-volt potential. Therefore, the electric field generated by the lower electrode 905 acts on the mirror 902 only through the opening part equipped in a part of the upper electrode 906. Consequently, the electric field E1 acted on the mirror is actually a field with the range of the field generated by the lower electrode 905 narrowed down, resulting in generating weak coulomb force.

FIG. 23B exemplifies the state (and the region) of an electric field E2 generated when the potentials of the lower electrode 905, upper electrode 906 and hinge electrode 904 are 5 volts, 5 volts or floating, and GND potential, respectively.

First, when the potential of the upper electrode 906 is controlled at 5 volts, the lower electrode 905 and upper electrode 906 integrally form an electric field acting on the mirror 902 since the two electrodes constitute a capacitor, with the insulation layer intervening between them. This causes an electric field E2 to be generated from the entire surface of the drive electrode 908 (i.e., the lower electrode 905 and upper electrode 906) as exemplified in FIG. 23B and thereby stronger coulomb force is generated than in the configuration of FIG. 23A.

In contrast, when the potential of the upper electrode 906 is controlled at a floating, the upper electrode 906 does not shut off the electric field generated by the lower electrode 905. Therefore, the field generated by the lower electrode 905 is not materially weakened so that the field is generated from the entirety of the drive electrode 908. For this reason, the coulomb force of a magnitude that is larger than the case of the potential of the upper electrode 906 being controlled at 0 volts, and the magnitude that is smaller than the case of the potential of the upper electrode 906 being controlled at 5 volts, is acted on the mirror.

Furthermore, controlling only the upper electrode 906 at 5 volts makes it possible to generate a electric field with various levels of magnitude, although not shown in a drawing herein.

As described above, in the configuration obtained by layering the upper electrode 906 so as to expose a part of the lower electrode 905, that is, in the configuration obtained by layering the upper electrode 906 on a part of the lower electrode 905, the changeover of the potentials of each individual electrode makes it possible to change over the range (i.e., the regions) of the electric field generated between each respective electrode and mirror.

Therefore, this configuration makes it possible to control the coulomb force generated in the mirror in multiple levels of magnitude without a need to control the values of applied voltages in multiple steps, thereby attaining various controls for controlling the mirror.

The present embodiment also enables the miniaturization of the apparatus while enhancing the definition of an image and increasing the number of gray scale steps thereof.

Fifth Embodiment

Figure 24A:
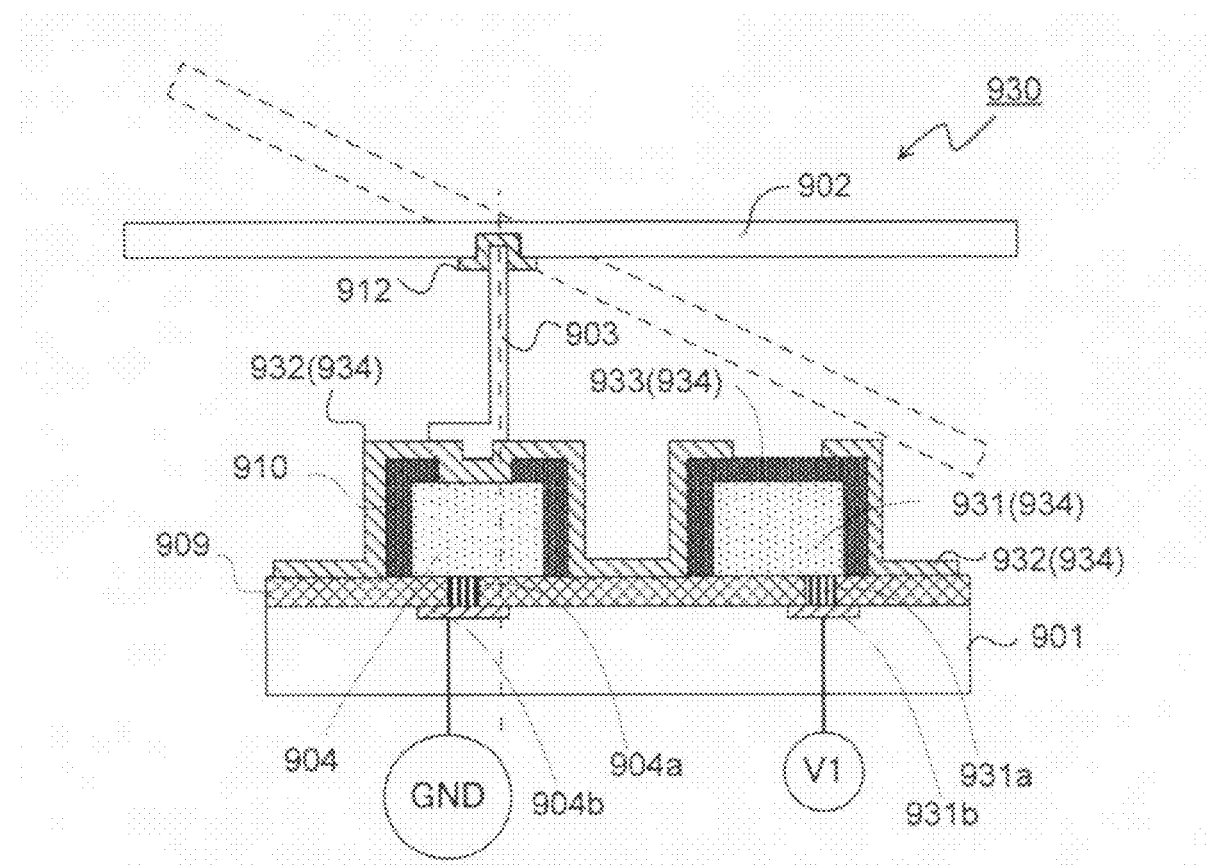
FIG. 24A is a conceptual diagram showing a cross-sectional configuration of a mirror element according to a fifth preferred embodiment.
Figure 24B:
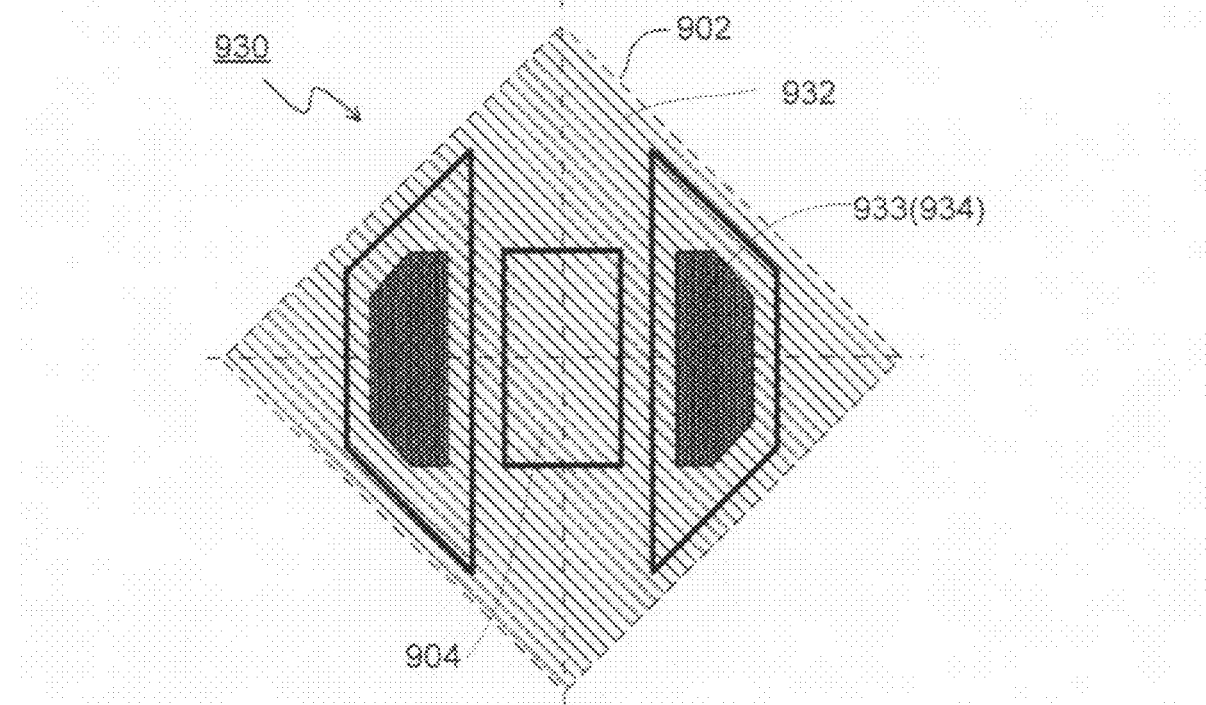
FIG. 24B is a top view diagram of a mirror element according to the fifth embodiment.

Let it describe a mirror element according to the present embodiment. FIG. 24A is a conceptual diagram showing a cross-sectional configuration of a mirror element according to the present embodiment. FIG. 24B is a top view diagram of the mirror element exemplified in FIG. 24A.

Incidentally, the mirror element 930 exemplified in FIG. 24A and according to the present fifth embodiment is similar to the mirror element 900 exemplified in FIG. 21 where the former is configured such that a drive electrode is constituted by a lower electrode (i.e., a first electrode) and an upper electrode (i.e., a second electrode) that are layered together with an insulation layer (i.e., a dielectric body layer) intervening between them and such that the upper electrode is layered so as to expose a part of the top surface of the insulation layer covering the lower electrode. However, the mirror element 930 is configured to electrically connect the upper electrode to the hinge electrode and is maintained at the GND potential, which is different from the mirror element 900. Note that the upper electrode may be formed as equipping a protrusion in the part abutting on the mirror 902 as exemplified in FIG. 12A and other figures.

The following is a description of the mirror element 930 with reference to FIGS. 24A and 24B.

The mirror element 930 is configured to include a substrate 901, a mirror 902 placed oppositely to the substrate 901, an elastic hinge 903 for supporting the mirror 902 so as to be deflectable, a hinge electrode 904 electrically connected to the mirror 902 and a drive electrode 934 for driving the mirror 902.

The drive electrode 934 is constituted by a plurality of regions (i.e., parts) and is configured to layer together a lower electrode 931 (i.e., a first electrode) and an upper electrode 932 (i.e., a second electrode) with an insulation layer 933 (Insulator) intervening between the two electrodes. In more specific, the upper electrode 932 is layered so that a part of the top surface of the insulation layer 933 covering the lower electrode 931 is exposed.

Specifically, FIG. 24A exemplifies the configuration of the mirror element 930 only for one side relative to the elastic hinge 903. The mirror element 930 is also configured similarly for the other side of the elastic hinge 903. Incidentally, the upper electrode 932 may be shared by the drive electrode on the left and right side thereof as exemplified in FIG. 24B. In the meantime, a photo-optical effect generated when an illumination light is incident to the substrate and the like can be prevented by layering (i.e., depositing) the upper electrode on the entirety of top surface of the substrate except for a part of top surface of the lower electrode 931 (and insulation layer 933) as exemplified in FIG. 24B.

The lower electrode 931 is an address electrode and is connected to memory by way of the Via 931a and wiring 931b. Further, the hinge electrode 904 is connected to the GND by way of the Via 904*a* and wiring 904*b*. With this, the potential of the hinge electrode 904 is maintained at the GND potential. Specifically, the mirror 902 abuts on the upper electrode (i.e., the second electrode) of a drive electrode when the mirror 902 is driven by the drive electrode and shifted to the ON state or OFF state. That is, the upper electrode (i.e., the second electrode) also constitutes a stopper.

The upper electrode 932 is connected to the lower electrode 931 by way of the insulation layer 933, and, in contrast, is directly connected to the hinge electrode 904. That is, the upper electrode 932 is connected to the GND (i.e., a drive circuit) by way of the hinge electrode 932, Via 904*a* and wiring 904*b*. This causes the potential of the upper electrode 932 to be maintained at the GND potential that is the same as the potential of the hinge electrode 904. Note that the hinge electrode 904 and upper electrode 932 may be made of respectively different materials or those containing different additives.

As described above, the mirror element 930 according to the present embodiment is configured to layer (i.e., deposit) the upper electrode 932 on a part of the lower electrode 931 and also to electrically connect the upper electrode 932 to the hinge electrode 904. Such a configuration causes the electric field generated by the lower electrode 931 to act on the mirror 902 from the opening part, in which the upper electrode 932 is not layered, while maintaining the upper electrode 932, on which the mirror 902 abuts, at the GND potential, thereby controlling the mirror 902.

Because the potential of the upper electrode 932 on which the mirror 902 abuts is maintained at constant, the potential of the abutted-on electrode (e.g., the upper electrode 932) does not change while the mirror is shifting from the ON state or OFF state. Therefore, a stiction phenomenon caused by a steep change of the potentials of an abutted-on electrode can be prevented, and a highly responsive, high speed operation of the mirror can be attained.

Although not shown in a drawing herein, an anti-stiction layer may further be formed on a surface of the mirror element and a surface of the upper electrode 932 (i.e., the second electrode) (i.e., the stopper). More specifically, an insulation layer may be formed between the mirror 902 and upper electrode 932 (i.e., the second electrode). The insulation layer possesses a higher resistance value than at least the resistance of the elastic hinge 903 does.

Note that it is certainly possible to obtain a similar effect by not connecting the upper electrode, which is maintained at the GND potential, to the hinge electrode. In such a case, however, a Via and a wiring need to be provided separately from the hinge electrode.

Meanwhile, the lower electrode 931 may be constituted by layering together an address electrode and a plate electrode with an insulation layer intervening between them. That is, the drive electrode 934 may be structured by layering three electrodes together. This configuration makes it possible to control the mirror in various manners using the address electrode and plate electrode while preventing stiction and maintaining a highly responsive, high speed operation of the mirror.

Figure 25:
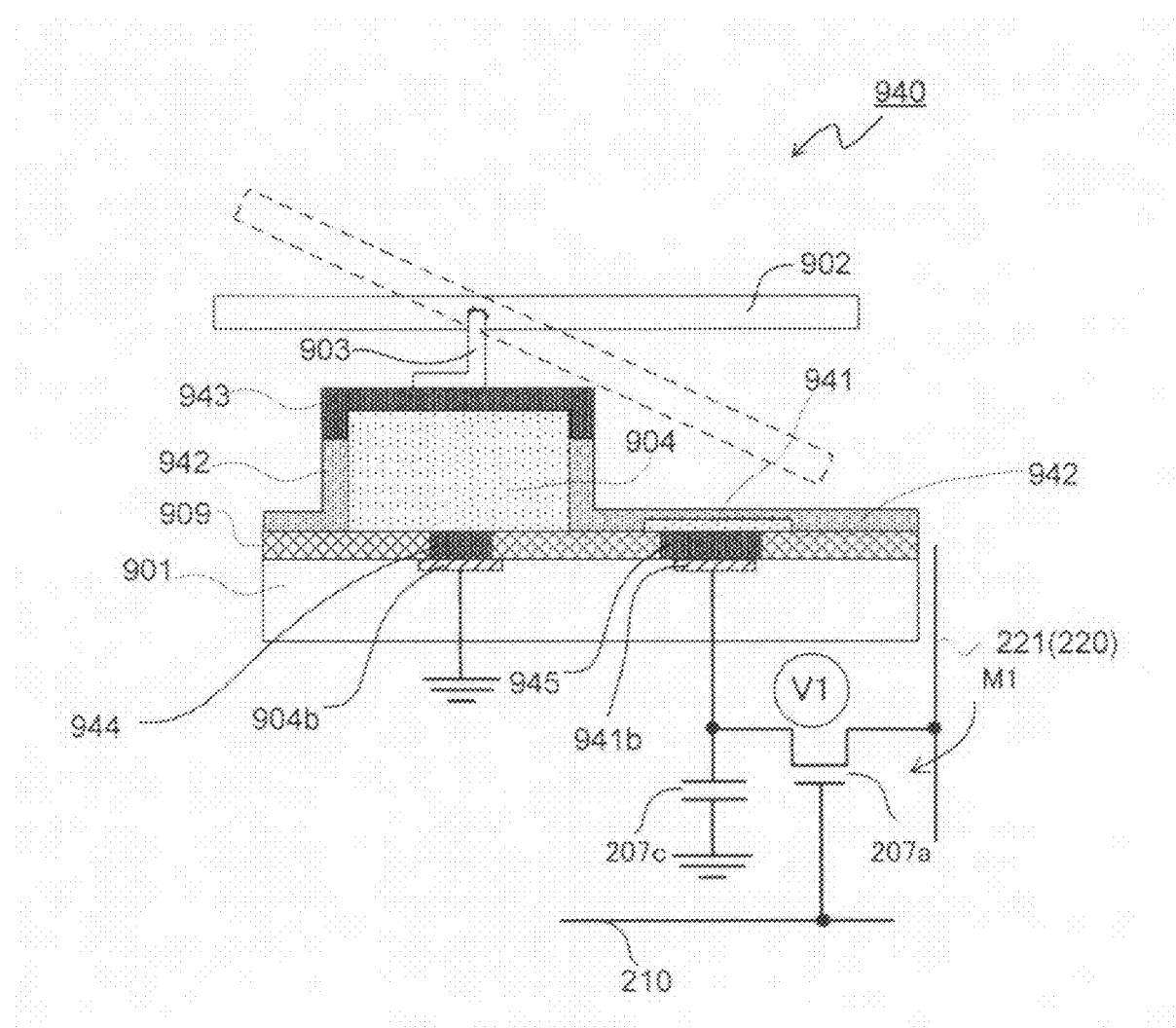
FIG. 25 is a conceptual diagram showing a cross-sectional configuration of a mirror element according to a sixth preferred embodiment.

As described above, also the present embodiment enables the miniaturization of the apparatus while enhancing the definition of an image and increasing the number of gray scale steps thereof Sixth Embodiment Let it describe a mirror element according to the present sixth embodiment. FIG. 25 is a conceptual diagram showing a cross-sectional configuration of a mirror element according to the present embodiment. The following is a description of the mirror element 940, in detail, with reference to FIG. 25.

The mirror element 940 is configured to include a substrate 901, a mirror 902 placed oppositely to the substrate 901, an elastic hinge 903 for supporting the mirror 902 so as to be deflectable, a hinge electrode 904 electrically connected to the mirror 902 and a drive electrode 941 for driving the mirror 902.

A first protective layer 909 is formed on the substrate 901 and individual electrodes (i.e., the hinge electrode 904 and drive electrode 941) are placed on the first protective layer 909. Further, a second protective layer 942 is formed on the surfaces of the hinge electrode 904 and drive electrode 941. The material of the first protective layer 909 and second protective layer 942 is desired to be a material such as silicon and silicon carbide (SiC).

The drive circuit and each electrode are electrically connected together by way of a doping region equipped in the first protective layer 909. In specific, the hinge electrode 904 is electrically connected to a wiring 904*b* by way of a doping region 944. More specifically, the drive electrode 941 is electrically connected to a wiring 941*b* by way of a doping region 945.

Furthermore, the wiring 904*b* is connected to the GND of the drive circuit. Therefore, the potential of the hinge electrode 904 is maintained at the GND potential. On the other hand, the wiring 941*b* is connected to memory M1 constituted by a gate transistor 207*a* and by a capacitor 207*c*. Therefore, the drive electrode 941 is an address electrode, and is controlled in accordance with the presence or absence of data written to the memory M1 through a word line 210 and a bit line 220 (i.e., a first bit line 221), that is, controlled by the charging or discharging of electric charge to and from the capacitor 207*c*.

Further, the hinge electrode 904 and elastic hinge 903 are electrically connected together by means of a doping region 943 equipped in the second protective layer 942. With this configuration, the mirror 902 is maintained at the same potential as that of the hinge electrode 904 and doping region 943.

Incidentally, the doping regions 943, 944 and 945 are formed in the method described above for the second embodiment.

Furthermore, the hinge electrode 904 is formed higher than the drive electrode 941 as exemplified in FIG. 25. This configuration causes the mirror 902 to abut on the second protective layer 942 formed on the hinge electrode 904 when the mirror 902 is driven by a drive electrode and shifted to the ON state or OFF state. The doping region 943 equipped in the second protective layer 942 is formed on the entire top surface of the hinge electrode 904 and therefore, strictly noting, the mirror 902 actually abuts on the doping region 943 of the second protective layer 942.

Although not shown in a drawing here, an anti-stiction layer may further be formed on the respective surfaces of the mirror 902 and hinge electrode 904. Further, an insulation layer may be formed between the mirror 902 and hinge electrode 904. The insulation layer possesses a higher resistance value than at least the elastic hinge 903 does. This configuration causes the mirror 902 to abut on the hinge electrode 904 with the insulation layer intervening between them.

As described above, in the mirror element according to the present embodiment, the hinge electrode 904 and second protective layer 942 function as stoppers. The doping region 943 of the second protective layer 942 on which the mirror 902 abuts is electrically connected to the hinge electrode 904 and thereby the potential is maintained at constant. Therefore, the potential of the abutted-on region (i.e., the doping region 943) is not changed while the mirror 902 is shifting from the ON state or OFF state. As a result, a stiction phenomenon can be prevented as in the case of the fifth embodiment and a highly responsive, high speed operation of the mirror is attained.

Further, the hinge electrode 904 is positioned closer to the deflecting center of the mirror 902 than the drive electrode is. Therefore, even if a force functioning as retaining the mirror is generated, contradicting the control, due to stiction, yet its moment is small, and therefore the influence of the stiction can be suppressed to relative small.

Specifically, here, the drive electrode 941 is configured as a single electrode; alternatively, a layered drive electrode may be used as in the case of other embodiments. This configuration makes it possible to attain various controls of a mirror using the plate electrode and address electrode under an environment with a small influence of stiction.

Furthermore, a similar effect can be obtained by configuring the doping region 943 using a barrier metal.

As described above, also the present embodiment enables the miniaturization of the apparatus while enhancing the definition of an image and increasing the number of gray scale steps thereof.

Note that the present invention comprehends the following contents of disclosure:

Embodiment 1

An image projection system implemented with a micro-electromechanical system (MEMS) device supported on a substrate functioning a spatial light modulator (SLM), wherein the MEMS further comprising:

a drive circuit disposed on the substrate;

a deflectable hinge extended from the substrate for supporting a movable electrode disposed above the substrate;

an elastic hinge for supporting the movable electrode;

a stationary electrode disposed on the substrate and is connected to the drive circuit, wherein the stationary electrode comprises a first electrode, a second electrode and an insulation layer, wherein the first electrode and second electrode are layered with the insulation layer intervening between the two electrodes.

Additional Embodiment 2

The MEMS device according to the additional embodiment 1, wherein the stationary electrode further comprises a protective layer on the surface of the stationary electrode.

Additional Embodiment 3

The MEMS device according to the additional embodiment 1, wherein the first electrode and second electrode are respectively connected to the drive circuits which are different from each other.

Additional Embodiment 4

The MEMS device according to the additional embodiment 1, wherein the drive circuit comprises memory, wherein at least either of the first and second electrodes is connected to the memory.

Additional Embodiment 5

The MEMS device according to the additional embodiment 1, wherein at least either of the first electrode and second electrode is connected to the ground (GND) of the drive circuit.

Additional Embodiment 6

The MEMS device according to the additional embodiment 1, wherein the insulation layer is made of a material containing silicon (Si).

Additional Embodiment 7

The MEMS device according to the additional embodiment 1, wherein the elastic hinge is made of a material containing silicon (Si), the material to which a doping is applied with the group III or V material.

Additional Embodiment 8

The MEMS device according to the additional embodiment 1, wherein at least either of the first electrode and second electrode is a hinge electrode electrically connected to the movable electrode and elastic hinge.

Additional Embodiment 9

The MEMS device according to the additional embodiment 2, wherein the protective layer comprises an opening part.

Additional Embodiment 10

The MEMS device according to the additional embodiment 2, wherein the electrical resistance of the protective layer is higher than that of the elastic hinge.

Additional Embodiment 11

The MEMS device according to the additional embodiment 2, wherein the protective layer is further covered with a stiction protection layer.

Additional Embodiment 12

The MEMS device according to the additional embodiment 2, wherein the protective layer is made of a material containing silicon (Si).

Additional Embodiment 13

A micro-electromechanical system (MEMS) device, comprising:

a substrate comprising a drive circuit;

a movable electrode placed oppositely to the substrate;

an elastic hinge for supporting the movable electrode;

a stationary electrode which is connected to the drive circuit and comprising a first electrode and a second electrode for driving the movable electrode, wherein the first electrode causes the movable electrode to be generated in the movable electrode with the intervention of the second electrode.

Additional Embodiment 14

The MEMS device according to the additional embodiment 13, wherein at least a part of the first electrode is layered and so is at least a part of the second electrode.

Additional Embodiment 15

The MEMS device according to the additional embodiment 13, comprising an insulation layer between the first electrode and second electrode.

Additional Embodiment 16

The MEMS device according to the additional embodiment 13, wherein either of the first electrode and second electrode is controlled to be electrically floating.

Additional Embodiment 17

The MEMS device according to the additional embodiment 13, wherein the first electrode and second electrode are connected to the drive circuits which are different from each other.

Additional Embodiment 18

The MEMS device according to the additional embodiment 13, wherein the drive circuit comprises memory, wherein at least either of the first and second electrodes is connected to the memory.

Additional Embodiment 19

A mirror device, comprising:
a substrate comprising a drive circuit;
a plurality of mirrors placed oppositely to the substrate; and
a plurality of drive electrodes, each of which corresponds to the mirror and which drives it, wherein each of the plurality of drive electrodes is constituted by at least two parts, that is, a mirror-side electrode unit placed on the mirror side and a substrate-side electrode unit placed on the substrate side, wherein the mirror-side electrode unit and substrate-side electrode unit are respectively connected to the drive circuits which are different from each other.

Additional Embodiment 20

The mirror device according to the additional embodiment 19, wherein at least a part of the mirror-side electrode unit is layered and so is at least a part of the substrate-side electrode unit.

Additional Embodiment 21

The mirror device according to the additional embodiment 19, comprising a dielectric body layer between the mirror-side electrode unit and substrate-side electrode unit.

Additional Embodiment 22

The mirror device according to the additional embodiment 19, wherein the drive circuit to which the mirror-side electrode unit is connected comprises a piece of different memory for each of the drive electrodes, wherein the mirror-side electrode unit is connected to the memory which is corresponding the mirror-side electrode unit, wherein the substrate-side electrode unit is connected to the drive circuit which is commonly connected through a plurality of the drive electrodes.

Additional Embodiment 23

The mirror device according to the additional embodiment 19, wherein the drive circuit comprises first memory and second memory, wherein the mirror-side electrode unit is connected to the first memory, and the substrate-side electrode unit is connected to the second memory.

Additional Embodiment 24

The mirror device according to the additional embodiment 19, wherein the drive circuit comprises a capacitor, wherein at least either of the mirror-side electrode unit and substrate-side electrode unit is connected to the capacitor.

Additional Embodiment 25

A micro-electromechanical system (MEMS) device, comprising:
a substrate comprising a wiring layer of a drive circuit;
an upper electrode placed on the substrate;
a Via layer in which a Via connecting the wiring layer to the upper electrode is placed; and
a lower electrode placed adjacently to the upper electrode, wherein
the lower electrode is formed in the Via layer, and
an insulation layer is comprised between the upper electrode and lower electrode.

Additional Embodiment 26

The MEMS device according to the additional embodiment 25, wherein the material of the lower electrode is the same as that of the Via.

Additional Embodiment 27

The MEMS device according to the additional embodiment 25, wherein the material or additive of the upper electrode is different from the material or additive of the lower electrode.

Additional Embodiment 28

A mirror device, comprising:
a substrate comprising a drive circuit;
a mirror placed oppositely to the substrate;
a hinge electrode electrically connected to the mirror; and
a drive electrode which is constituted by a plurality of regions and which drives the mirror, wherein
the hinge electrode is connected to at least one of the regions of the drive electrode.

Additional Embodiment 29

The mirror device according to the additional embodiment 28, wherein the mirror abuts on the region connected to the hinge electrode.

Additional Embodiment 30

The mirror device according to the additional embodiment 28, wherein the region connected to the hinge electrode is controlled at the same potential as that of the hinge electrode.

Additional Embodiment 31

The mirror device according to the additional embodiment 28, wherein the region connected to the hinge electrode is maintained at a constant potential.

Additional Embodiment 32

The mirror device according to the additional embodiment 28, wherein the hinge electrode is connected to the ground (GND).

Additional Embodiment 33

The mirror device according to the additional embodiment 28, wherein the drive electrode includes an insulation layer between the plurality of regions.

Additional Embodiment 34

The mirror device according to the additional embodiment 29, wherein the region on which the mirror is abutted is further covered with a protective layer.

Additional Embodiment 35

The mirror device according to the additional embodiment 29, wherein the region on which the mirror is abutted is further covered with an anti-stiction layer.

Additional Embodiment 36

A mirror device, comprising:
a substrate;
a mirror placed oppositely to the substrate;
a hinge for supporting the mirror so as to be deflectable; and
a drive electrode which is placed on the substrate and which drives the mirror, wherein
the drive electrode comprises an insulation layer, and a first electrode and a second electrode which are layered with the insulation layer intervening between the two electrodes, wherein
the first electrode is connected to memory, and
the second electrode is connected to a plate line.

Additional Embodiment 37

The mirror device according to the additional embodiment 36, wherein a plurality of the second electrodes used for controlling the mirrors which are respectively different is connected commonly to the plate line.

Additional Embodiment 38

The mirror device according to the additional embodiment 36, wherein the first electrode and second electrode constitute a capacitor between themselves.

Additional Embodiment 39

The mirror device according to the additional embodiment 38, wherein the capacitance of the capacitor is smaller than that of a capacitor constituting the memory.

Additional Embodiment 40

A mirror device, comprising:
a substrate comprising a first drive circuit and a second drive circuit;
a mirror placed oppositely to the substrate;
a hinge for supporting the mirror so as to be deflectable; and
a drive electrode which is placed on the substrate and which drives the mirror, wherein
the drive electrode comprises an insulation layer, and a first electrode and a second electrode which are layered with the insulation layer intervening between the two electrodes, wherein
the first drive circuit causes the potential of the first electrode to be changed to a plurality of predetermined potentials including at least H level and L level, and
the second drive circuit causes the potential of the second electrode to be changed to high impedance and predetermined potentials including at least H level and L level repeatedly in a predetermined pattern.

Additional Embodiment 41

The mirror device according to the additional embodiment 40, wherein one of the predetermined potentials of the second drive circuit is the same as the potential of the mirror.

Additional Embodiment 42

The mirror device according to the additional embodiment 40, wherein a period in which the potential of the second electrode is at the predetermined potentials of the second drive circuit is shorter than a minimum period in which the potentials of the first electrode change.

Additional Embodiment 43

The mirror device according to the additional embodiment 40, wherein the second drive circuit changes the potentials of the second electrode to the H level at or after a predefined period of time has elapsed since the potentials of the first electrode changed from the H level to L level.

Additional Embodiment 44

The mirror device according to the additional embodiment 40, wherein the second drive circuit changes the potentials of the second electrode to the H level synchronously with a timing at which the potentials of the first electrode changes from the L level to H level.

Additional Embodiment 45

The mirror device according to the additional embodiment 40, wherein the second drive circuit changes the potentials of the second electrode to the H level for a certain period of time after the potentials of the first electrode change from the H level to L level.

Additional Embodiment 46

A mirror device, comprising:
a substrate comprising a first drive circuit and a second drive circuit;
a mirror placed oppositely to the substrate;
a hinge for supporting the mirror so as to be deflectable; and
a drive electrode which is placed on the substrate and which drives the mirror, wherein
the drive electrode comprises an insulation layer, and a first electrode and a second electrode which are layered with the insulation layer intervening between the two electrodes, wherein
an electric fields formed by the first electrode controlled by the first drive circuit are changed by changing the potentials of the second electrode using the second drive circuit, and thereby the mirror is controlled.

Additional Embodiment 47

The mirror device according to the additional embodiment 46, wherein the second drive circuit changes over the potentials of the second electrode between high impedance and a predetermined potential, thereby changing the electric fields.

Additional Embodiment 48

The mirror device according to the additional embodiment 46, wherein a change in the electric field is the shutting-off of the electric field or the releasing of the shutoff thereof.

Additional Embodiment 49

The mirror device according to the additional embodiment 46, wherein a change in the electric field is a change in the region of the electric field.

Additional Embodiment 50

The mirror device according to the additional embodiment 46, wherein a change in the electric field occurs in accordance with the deflection state of the mirror.

Additional Embodiment 51

The mirror device according to the additional embodiment 48, wherein shutting off the electric field causes the mirror which is a stationary to start oscillating.

Additional Embodiment 52

The mirror device according to the additional embodiment 48, wherein releasing the shutting-off of the electric field causes the amplitude of the mirror, which is oscillating, to be reduced.

Additional Embodiment 53

The mirror device according to the additional embodiment 49, wherein a change in the region of the electric field does not affect the deflection state of the mirror which is stationary.

What is claimed is:

1. An image display system implemented with a spatial light modulator (SLM) having a plurality of pixel elements wherein each of the pixel elements comprising:
an electrode having a structure body includes a first electrically conductive layer and a second electrically conductive layer;
the structure body further includes a semiconductor layer disposed adjacently to the first electric conductive layer and second electric conductive layer wherein the semiconductor layer further comprising a doped conductive area for electrically connecting the first electric conductive layer and second electric conductive layer; and
at least one of the first and second conductive layer is a metal layer covered by the semiconductor layer.

2. The image display system according to claim 1, wherein:
the doped conductive area of the semiconductor layer further having a dopant concentration equal to or greater than $10^{16}/cm^3$.

3. The image display system according to claim 1, wherein:
the doped conductive area of the semiconductor layer further having a resistance equal to or less than 1 giga-ohms.

4. The image display system according to claim 1, wherein:
the semiconductor layer further comprises an annealed semiconductor layer annealed by applying an annealing temperature below an aluminum melting temperature.

5. The image display system according to claim 1 wherein:
the semiconductor layer further comprises an annealed semiconductor layer annealed by applying an annealing temperature between 400° C. and 450° C.

6. The image display system according to claim 1, wherein:
the doped conductive area of the semiconductor layer further having a same or greater area than a contact area between said semiconductor layer and said first and second electrical conductive layers.

7. The image display system according to claim 1, wherein:
the first electric conductive layer further comprises a movable body and said first and second conductive layers are controlled by a voltage applied to the semiconductor layer.

8. The image display system according to claim 7, further comprising:
a drive electrode for applying a voltage for driving the movable body.

9. The image display system according to claim 7, wherein:
the movable body comprises a reflection surface for reflecting electromagnetic waves projected thereon.

10. The image display system according to claim 9, wherein:
the reflection surface comprises an optimized reflection surface for reflecting a visible light.

11. The image display system according to claim 1 wherein:
the plurality of pixel elements are configured as a pixel array.

12. The image display system according to claim 1, wherein:
each of the pixel elements further comprising a deflectable mirror and the electrode further comprises a drive electrode for applying a voltage to control the micromirror.

13. An image display system implemented with a spatial light modulator (SLM) having a plurality of pixel elements wherein each of the pixel elements comprising:
an electrode having a structure body includes a first electrically conductive layer and a second electrically conductive layer;
the structure body further includes a semiconductor layer disposed adjacently to the first electric conductive layer and second electric conductive layer wherein the semiconductor layer further comprising a doped conductive area for electrically connecting the first electric conductive layer and second electric conductive layer; and at least one of the first electric conductive layer and second electric conductive layer is composed with a material containing aluminum, and the semiconductor layer further comprises an annealed semiconductor layer annealed by using a gas containing hydrogen.

14. An image display system implemented with a spatial light modulator (SLM) having a plurality of pixel elements wherein each of the pixel elements comprising:

an electrode having a structure body includes a first electrically conductive layer and a second electrically conductive layer;

the structure body further includes a semiconductor layer disposed adjacently to the first electric conductive layer and second electric conductive layer wherein the semiconductor layer further comprising a doped conductive area for electrically connecting the first electric conductive layer and second electric conductive layer; and the doped conductive area of the semiconductor layer further comprises multiple sub-doped conductive areas on said semiconductor layer.

15. An image display system implemented with a spatial light modulator (SLM) having a plurality of pixel elements wherein each of the pixel elements comprising:

an electrode having a structure body includes a first electrically conductive layer and a second electrically conductive layer;

the structure body further includes a semiconductor layer disposed adjacently to the first electric conductive layer and second electric conductive layer wherein the semiconductor layer further comprising a doped conductive area for electrically connecting the first electric conductive layer and second electric conductive layer;

an electric conductive movable body, and a second semiconductor layer disposed adjacently to the first electric conductive layer and the conductive movable body and the second semiconductor layer further comprises a second doped conductive area for electrically connecting the first electric conductive layer and the conductive movable body.

16. The image display system according to claim 15, wherein:

the semiconductor layer, the first electrically conductive layer and the second semiconductor layer are applied a voltage to control the movable body and the second electric conductive layer.

17. The image display system according to claim 15, further comprising:

a drive electrode for applying a voltage for driving the conductive movable body.

18. The image display system according to claim 15, wherein:

the conductive movable body comprises a reflection surface for reflecting electromagnetic waves projected thereon.

19. The image display system according to claim 18, wherein:

the reflection surface comprises an optimized reflection surface for reflecting a visible light.

20. The image display system according to claim 15, comprising:

the plurality of pixel elements are configured as a pixel array.

21. The image display system according to claim 15, wherein:

the second semiconductor layer and the semiconductor material layer are composed of a same semiconductor material.

22. An image display system implemented with a mirror device comprising:

a plurality of micromirrors each supported on a deflectable hinge electrically connected to the micromirror;

a hinge electrode for applying a voltage to the hinge and the micromirror electrically connected to the hinge;

a drive electrode for applying a second voltage independent from the voltage applied to of the hinge electrode;

a drive circuit for controlling the hinge electrode and the drive electrode; and a semiconductor layer comprising a doped conductive area for electrically connecting the hinge and hinge electrode, hinge electrode and drive circuit, or the drive electrode and drive circuit.

* * * * *